US006934704B2

(12) United States Patent
Okada et al.

(10) Patent No.: US 6,934,704 B2
(45) Date of Patent: Aug. 23, 2005

(54) AUTOMATIC MANHOUR SETTING SYSTEM AND METHOD, DISTRIBUTED CLIENT/SERVER SYSTEM, AND COMPUTER PROGRAM STORAGE MEDIUM

(75) Inventors: Atsushi Okada, Tokyo (JP); Takashi Hirashima, Kanagawa (JP); Yoshinori Sawamura, Kanagawa (JP); Tomoyuki Sonekawa, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 277 days.

(21) Appl. No.: 09/753,726

(22) Filed: Jan. 3, 2001

(65) Prior Publication Data

US 2002/0059225 A1 May 16, 2002

(30) Foreign Application Priority Data

Jan. 6, 2000 (JP) ........................................ 2000-001076

(51) Int. Cl.[7] ................................................ G06F 17/30

(52) U.S. Cl. ................................ 707/6; 707/1; 707/10; 705/8; 705/9; 700/102; 700/111

(58) Field of Search ................................ 707/1, 2, 3, 4, 707/5, 6, 10, 101, 104.1; 700/102, 111; 705/8, 9, 11

(56) References Cited

U.S. PATENT DOCUMENTS

| | | | | | |
|---|---|---|---|---|---|
| 4,845,634 | A | | 7/1989 | Vitek et al. | 364/468 |
| 4,961,148 | A | | 10/1990 | Holda et al. | 364/468 |
| 5,010,486 | A | | 4/1991 | Suzuki et al. | |
| 5,023,800 | A | | 6/1991 | Carver et al. | 364/474.24 |
| 5,177,688 | A | | 1/1993 | Rentschler et al. | |
| 5,615,138 | A | | 3/1997 | Tanaka et al. | |
| 5,767,848 | A | * | 6/1998 | Matsuzaki et al. | 345/751 |
| 5,771,043 | A | | 6/1998 | Nigawara et al. | 345/419 |
| 5,884,247 | A | | 3/1999 | Christy | 704/7 |
| 5,930,460 | A | * | 7/1999 | Noumaru et al. | 700/245 |
| 5,980,084 | A | | 11/1999 | Jones et al. | 364/468.01 |
| 6,163,785 | A | | 12/2000 | Carbonell et al. | 707/530 |
| 6,173,253 | B1 | | 1/2001 | Abe et al. | 704/10 |
| 6,208,956 | B1 | | 3/2001 | Motoyama | 704/2 |
| 6,223,092 | B1 | | 4/2001 | Miyakawa et al. | 700/103 |
| 6,240,328 | B1 | | 5/2001 | LaLonde et al. | 700/95 |
| 6,249,715 | B1 | | 6/2001 | Yuri et al. | |
| 6,385,621 | B1 | * | 5/2002 | Frisina | 707/104.1 |
| 6,453,209 | B1 | | 9/2002 | Hill et al. | 700/95 |
| 6,490,569 | B1 | * | 12/2002 | Grune et al. | 705/400 |
| 2003/0023611 | A1 | | 1/2003 | Benjamin et al. | 707/101 |

FOREIGN PATENT DOCUMENTS

| | | |
|---|---|---|
| DE | 196 32 499 A1 | 3/1997 |
| JP | 8-305748 | 11/1996 |

OTHER PUBLICATIONS

German Patent Office Communication for Application No. 101 00 274.2-53.

(Continued)

*Primary Examiner*—Jean M. Corrielus
(74) *Attorney, Agent, or Firm*—Morgan & Finnegan, LLP

(57) ABSTRACT

An automatic manhour setting system has a standard manhour database designed to be readable, in which a number of pairs each constituted by a work standard described by a standardized standard expression and a manhour corresponding to the work standard are registered in advance. For each target work standard to which a manhour is to be given, the system matches the expression of the target work standard with the standard expressions of the work standards in the standard manhour database, sets the standard manhour of the matching work standard in the database as the manhour of the target work standard, and outputs the set manhour file.

37 Claims, 97 Drawing Sheets

OTHER PUBLICATIONS

Translation of German Patent Office Communication for Application No. 101 00 274.2–53 (Item AA).

German Patent Office Communication for counterpart Application No. 101 00 275.2–53.

Translation of German Patent Office Communication for Application No. 101 00 275.2–53 (Item CC).

English Abstract of German Patent Publication 196 32 499 A1 (Item A).

English Abstract of Japanese Publication 8–305748 (Item B).

He et al., "On a system of understanding illustrative diagrams in an assembly manual", Proceedings of the 3rd international conference on Industrial and engineering applications of artificial intelligence and expert systems, 1990, pp. 350–356.

Driskill et al., "Interactive Design, Analysis, and Illustration of Assemblies", Proceeding of the 1995 symposium on the interactive 3D graphics, 1995, pp. 27–33.

English Translation of German Patent Publication 196 32 499 A1.

* cited by examiner

| WORK STANDARD 01 CREATION | | | | | | _ □ × |
|---|---|---|---|---|---|---|
| APPLIED | | | | | | |

| PART NUMBER | PART NAME | QUANTITY | PART NUMBER | PART NAME | QUANTITY |
|---|---|---|---|---|---|
| 303 | 304 | 305 | | | |

| TOOL / TREATMENT DEVICE / AUXILIARY MATERIAL | | QUANTITY | CHECK ETC. |
|---|---|---|---|
| 306 | | 307 | 308 |

| No. | WORK PROCEDURE | NOTE / STANDARD ETC. |
|---|---|---|
| | 310 | |

| REVISION NUMBER | CONTENTS OF REVISION | DATE | PERSON IN CHARGE | APPROVE |
|---|---|---|---|---|
| 01 | CREATED | 1997/09/25 | | |

| WORK NAME |
|---|
| MANAGEMENT NO. |

STRUCTURE OF MASTER FILE

FIG. 15

| | | |
|---|---|---|
| 00 | ※ | |
| 01 | DO zzzz SUCH THAT xxxx AT wwww POSITION BECOMES yyyy | |
| 02 | WIND AV CORD | |
| 03 | CONFIRM 100V SYSTEM | |
| 04 | SET CRG HOLDER | |
| | | |
| | | |

F I G. 22
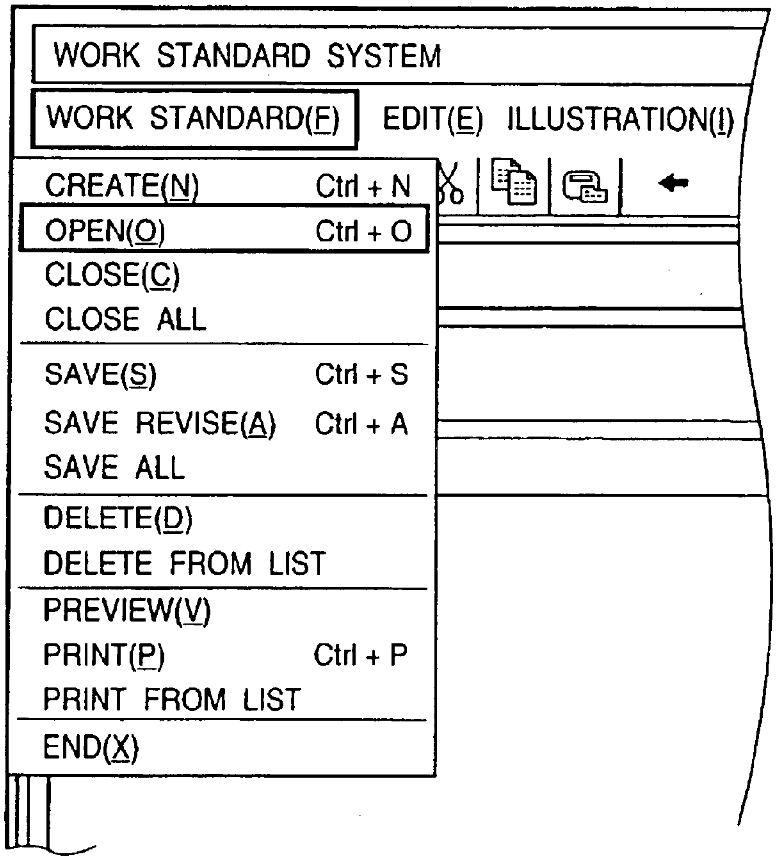

WORK STANDARD SYSTEM

⦿ LATEST REVISION NUMBER  ○ ALL

| MANAGEMENT NO. | REVISION NUMBER | WORK NAME | DATE OF REGISTRATION |
|---|---|---|---|
| SO-04-01(4)-E | 01 | SET ASFu | 1997/09/13 |
| SO-01-01(3)-E | 01 | SET BASE TRAY | 1997/09/01 |
| SO-01-03-E | 01 | SET BASE TRAY | 1997/09/01 |
| SO-01-04-E | 01 | SET BASE TRAY | 1997/09/01 |
| SO-06-01-E | 01 | WIRING | 1997/09/01 |
| SO-06-02-E | 01 | WIRING | 1997/09/01 |
| SO-06-03-E | 01 | WIRING | 1997/09/01 |
| SO-07-01(2)-E | 01 | GREASING | 1997/09/01 |
| SO-08-01-E | 01 | SET RAIL | 1997/09/01 |

[ OK ]  [ CANCEL ]

2301

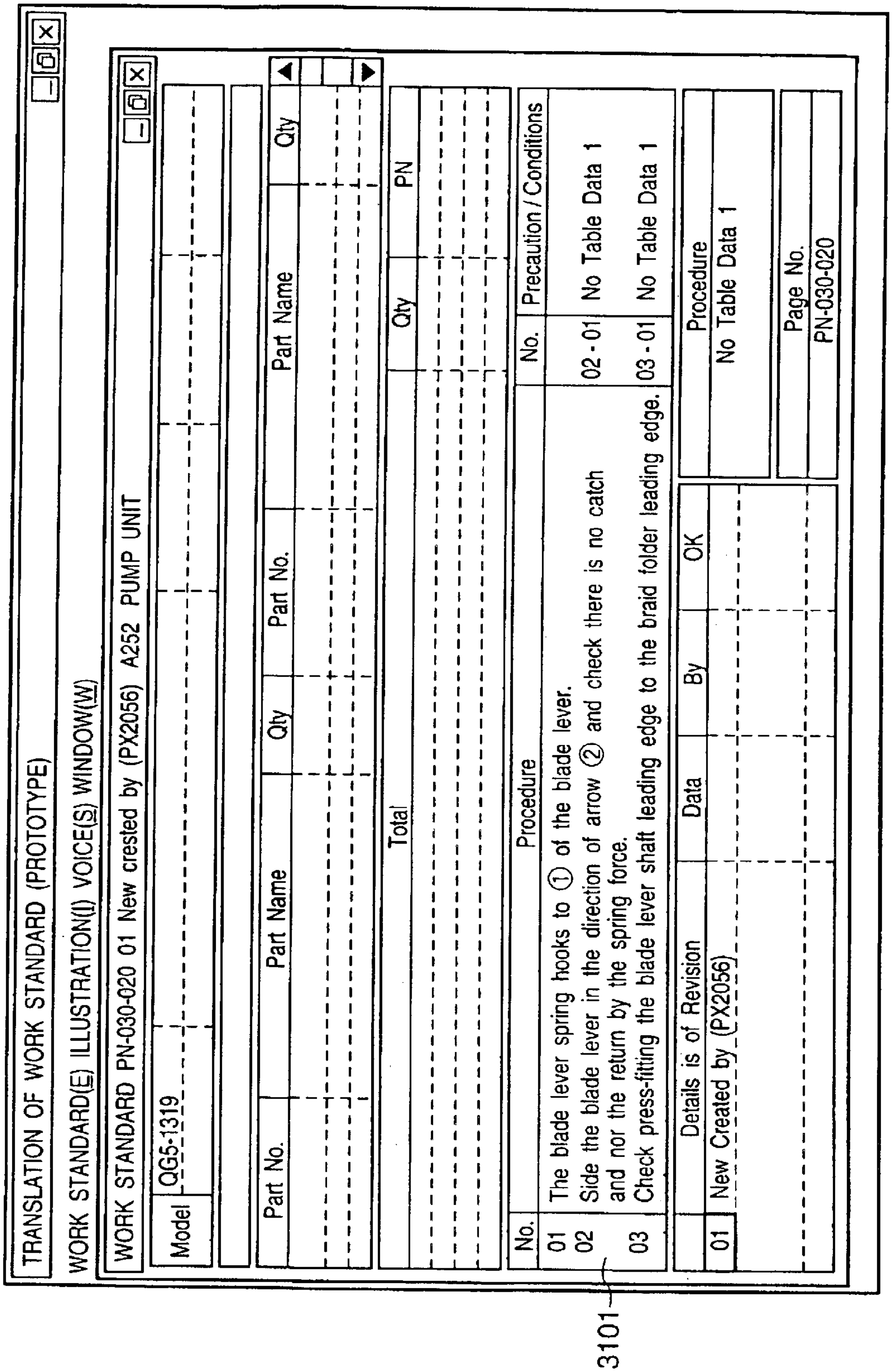

FIG. 31

TRANSLATION OF WORK STANDARD (PROTOTYPE)

WORK STANDARD(E) ILLUSTRATION(I) VOICE(S) WINDOW(W)

WORK STANDARD PN-030-020 01 New crested by (PX2056) A252 PUMP UNIT

Model: QG5-1319

| Part No. | Part Name | Qty | Part No. | Part Name | Qty |
|---|---|---|---|---|---|
| | | | | | |
| | | | | | |
| | Total | | | PN | |

| No. | Procedure | Precaution / Conditions |
|---|---|---|
| 01 | The blade lever spring hooks to ① of the blade lever. | |
| 02 | Side the blade lever in the direction of arrow ② and check there is no catch and nor the return by the spring force. | 02-01 No Table Data 1 |
| 03 | Check press-fitting the blade lever shaft leading edge to the braid folder leading edge. | 03-01 No Table Data 1 |

| Details is of Revision | Data | By | OK | Procedure |
|---|---|---|---|---|
| 01 | New Created by (PX2056) | | | | No Table Data 1 |
| | | | | | Page No. PN-030-020 |

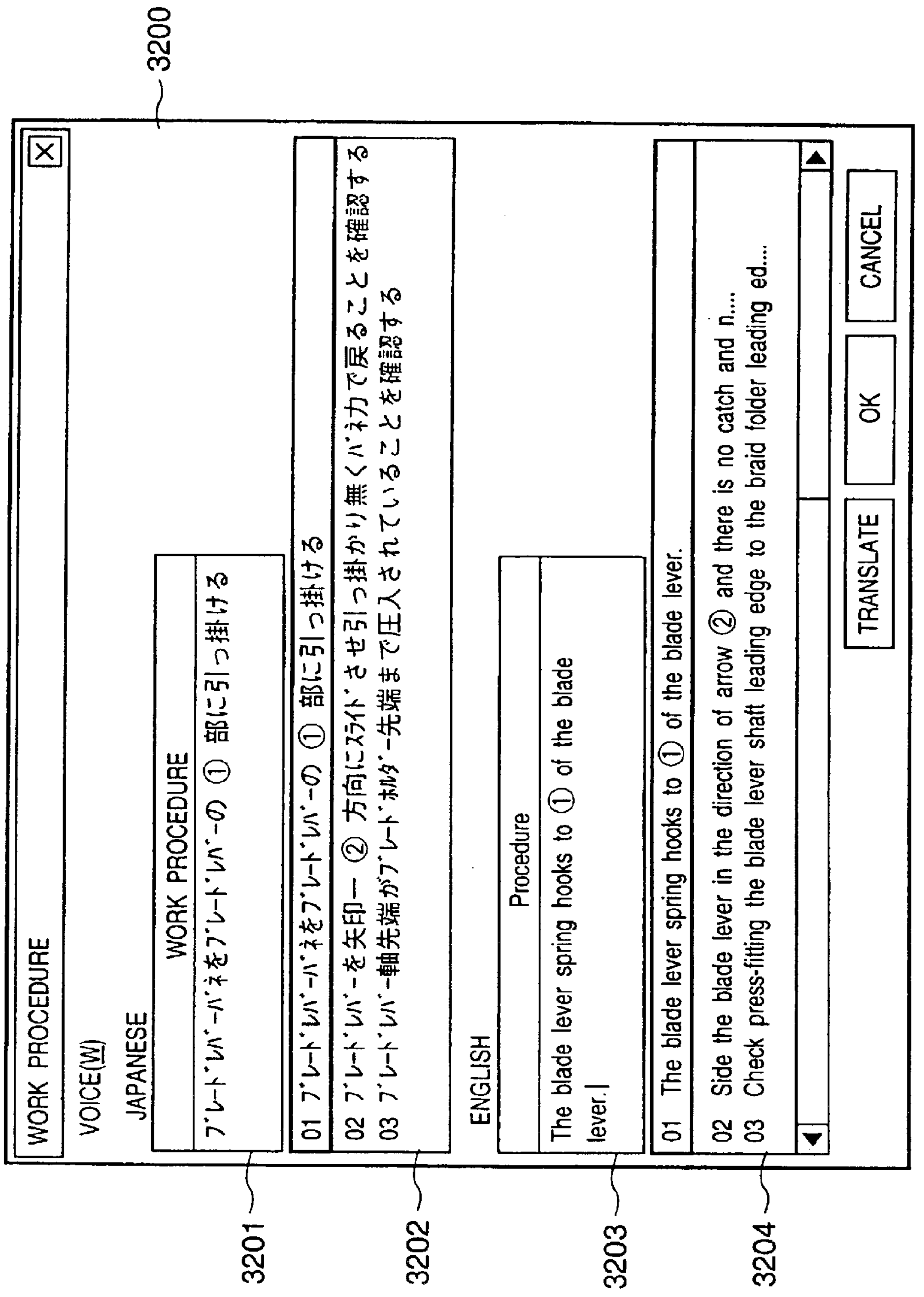

FIG. 32

WORK PROCEDURE

VOICE(W)

JAPANESE

| WORK PROCEDURE |
|---|
| ブレードレバーそをブレードレバーの ① 部に引っ掛ける |

— 3201

| 01 | ブレードレバーそをブレードレバーの ① 部に引っ掛ける |
| 02 | ブレードレバーを矢印ー ② 方向にスライドさせ引っ掛かり無くバネ力で戻ることを確認する |
| 03 | ブレードレバー軸先端がブレードホルダー先端まで圧入されていることを確認する |

— 3202

ENGLISH

| Procedure |
|---|
| The blade lever spring hooks to ① of the blade lever. |

— 3203

| 01 | The blade lever spring hooks to ① of the blade lever. |
| 02 | Side the blade lever in the direction of arrow ② and there is no catch and n..... |
| 03 | Check press-fitting the blade lever shaft leading edge to the braid folder leading ed..... |

— 3204

[TRANSLATE]  [OK]  [CANCEL]

| No. | ELEMENT WORK NAME | FREQUENCY | | MANHOUR | CS | SET CONDITION |
|---|---|---|---|---|---|---|
| | | | | | | |
| | | | | | | |
| | | | | | | |

FIG. 38

STANDARD MATERIAL DATA

| COMMENT 1 | OBJECT | COMMENT 2 | VERB | SET CONDITION DATA |
|---|---|---|---|---|
| | | | | |
| | | | | |
| | | | | |

EDITING OF ELEMENT WORK

FILE(F) EDIT(E) VIEW(V) ANALYZE(A) ANALYSIS MATERIAL(B) CS(S) END(X)

UNIT WORK NAME : SEPARATION ROLLER ATTACHMENT

| No. | ELEMENT WORK NAME | FREQUENCY | | MANHOUR | CS | SET CONDITION |
|---|---|---|---|---|---|---|
| 1 | (SET LOAD SPRING IN TREATMENT DEVICE FOR ATTACHING LOAD SPRING) | 1 | 1 | | | |
| 2 | (TURN ON SW OF TREATMENT DEVICE) | 1 | 1 | | | |
| 3 | (SET SEPARATION ROLLER SHAFT IN TREATMENT DEVICE FOR ATTACHING LOAD SPRING) | 1 | 1 | | | |
| 4 | (TURN OFF SW OF TREAMENT DEVICE) | 1 | 1 | | | |
| 5 | (DETACH SEPARATION ROLLER SHAFT FROM TREAMENT DEVICE) | 1 | 1 | | | |

DATA LOAD

• ELEMENT WORK NAME

| No | COMMENT 1 | OBJECT | COMMENT 2 | VERB |
|---|---|---|---|---|
| 1 | | LOAD SPRING | IN TREATMENT DEVICE FOR ATTACHING LOAD SPRING | SET |
| 2 | OF TREATMENT DEVICE | SW | | TURN ON |
| 3 | | SEPARATION ROLLER | IN TREATMENT DEVICE FOR ATTACHING LOAD SPRING | SET |
| 4 | OF TREATMENT DEVICE | SW | | TURN OFF |
| 5 | | SEPARATION ROLLER | FROM TREATMENT DEVICE | DETACH |

SEARCH KEYWORD (KW)

| No. | COMMENT 1 | OBJECT | COMMENT 2 | VERB | MANHOUR STANDARD MATERIAL | TIME VALUE |
|---|---|---|---|---|---|---|
| 1 | * | SPRING | TO * | SET | SPG3 T133/M11/0 | 41RU |
| 2 | * | * | TO * | SET | ASHED T11222/T1111 | 37RU |
| 3 | * | * | FROM * | DETACH | PUMQ T2111/T111111 | 16RU |
| 4 | * | E-RING | * | SET | RIN2 T11211/SO | 76RU |
| 5 | * | CONNECTOR | * | INSERT | CONN T11211/SO | 41RU |
| 6 | * | * | * | SCREW TIGHTLY | SCR6 M211/1 | 23RU |

EDITING OF ELEMENT WORK

FILE(F) EDIT(E) VIEW(V) ANALYZE(A) ANALYSIS MATERIAL(B) CS(S) END(X)

UNIT WORK NAME : SEPARATION ROLLER ATTACHMENT

| No. | ELEMENT WORK NAME | FREQUENCY | | MANHOUR | CS | SET CONDITION |
|---|---|---|---|---|---|---|
| 1 | (SET LOAD SPRING IN TREATMENT DEVICE FOR ATTACHING LOAD SPRING) | 1 | 1 | 41 | SPG3 | T133/M11/0 |
| 2 | (TURN ON SW OF TREATMENT DEVICE) | 1 | 1 | 8 | | /GET:-50E/M:-10E |
| 3 | (SET SEPARATION ROLLER SHAFT IN TREATMENT DEVICE FOR ATTACHING LOAD SPRING) | 1 | 1 | 37 | ASHD | T11222/T1111 |
| 4 | (TURN OFF SW OF TREAMENT DEVICE) | 1 | 1 | 8 | | /GET:-50E/M:-10E |
| 5 | (DETACH SEPARATION ROLLER SHAFT FROM TREAMENT DEVICE) | 1 | 1 | 16 | PUMB | T2111/T111111 |

MATCH

| No. | COMMENT 1 | OBJECT | COMMENT 2 | VERB | VERB PATTERN | TIME VALUE |
|---|---|---|---|---|---|---|
| 1 | TREATMENT DEVICE | SW | | TURN ON | /GET:-50E/M:-10E | 8RU |
| 2 | TREATMENT DEVICE | SW | | TURN OFF | /GET:-50E/M:-10E | 8RU |
| 3 | | READING OPERATION UNIT | | CLOSE | /GET:-50E/M:-50E | 10RU |
| 4 | | CRG DOOR | | CLOSE | /GET:-50E/M:-50E | 10RU |
| 5 | | READING OPERATION UNIT | | CLOSE | /GET:-50E/M:-50E | 10RU |
| 6 | | POWER CODE | | PULL OUT | /GET:-50Egr2/M:-10E | 16RU |
| 7 | | POWER CODE FOR MEASUREMENT | | PULL OUT | /GET:-50Egr2/M:-10E | 16RU |

EDITING OF ELEMENT WORK

FILE(F) EDIT(E) VIEW(V) ANALYZE(A) ANALYSIS MATERIAL(B) CS(S) END(X)

UNIT WORK NAME : SEPARATION ROLLER ATTACHMENT

| No. | ELEMENT WORK NAME | FREQUENCY | | MANHOUR | CS | SET CONDITION |
|---|---|---|---|---|---|---|
| 1 | (SET LOAD SPRING IN TREATMENT DEVICE FOR ATTACHING LOAD SPRING) | 1 | 1 | 41 | SPG3 | T133 / M11 / 0 |
| 2 | (TURN ON SW OF TREATMENT DEVICE) | 1 | 1 | 8 | | /GET:-50E/M:-10E |
| 3 | (SET SEPARATION ROLLER SHAFT IN TREATMENT DEVICE FOR ATTACHING LOAD SPRING) | 1 | 1 | 37 | ASHD | T11222 / T1111 |
| 4 | (TURN OFF SW OF TREAMENT DEVICE) | 1 | 1 | 8 | | /GET:-50E/M:-10E |
| 5 | (DETACH SEPARATION ROLLER SHAFT FROM TREAMENT DEVICE) | 1 | 1 | 16 | PUMB | T2111 / T111111 |
| | | | | | | |
| | | | | | | |
| | | | | | | |
| | | | | | | |

| | WORK STANDARD | PRODUCT SYMBOL | PRODUCT NUMBER | NAME | PREVIOUS LOAD DATE |
|---|---|---|---|---|---|
| | XXXX | BL-OLD | XX | XXXX | XXX |
| | | | | SET IN 1996 | |

● ALL  ○ DESIGNATE : 1 ▶

PRODUCT NUMBER : 
NAME :

OK
CANCEL
SELECT

PRODUCT NUMBER
0 - CLOCK
XXXXXX
xyz - test
test - 01
tesr - AMI

XXXXXXX

| S | PROVISIONAL MANAGEMENT NO. | PRODUCTION MANAGEMENT NO. | TOTAL | WORK NAME | COMPONENT SYMBOL | PREVIOUS LOAD DATE | LOADER |
|---|---|---|---|---|---|---|---|
| ▲ | | | | | | | |
| | | | | | | | |

BJC · 4200 → BJ · 970909

FILE(F) EDIT(E) EXECUTE(S) VIEW(V)

XXXXXXXX

< SET MANHOUR >

| | PRODUCT SYMBOL | NAME | PREVIOUS UPDATE DATE |
|---|---|---|---|
| ▲ | BJ - 970909 | XXXXX | 1997/09/22 10:17:30 |
| | BJ - STAND | | 1997/09/12 15:09:09 |
| | BJ - test | TEST 01 Standard | 1997/09/18 10:38:14 |
| | BJ250 | 250 TESTS | 1997/09/17 17:58:59 |
| | ST01 | STAND PRODUCT | 1997/09/12 16:02:34 |
| | STAND01 | | 1997/09/19 15:46:04 |

SELECTION OF PRODUCT

FILE(F)   EDIT(E)

SET MANHOUR     EXTRACT DATA     CREATE HOST TRANSFER     ANALYZE DATA     END

5201

SELECTION OF COMPONENT

FILE(F)  EDIT(E)

PRODUCT SYMBOL : BJ-4200    NAME : BJ-4200

| COMPONENT SYMBOL | NAME | PREVIOUS UPDATE DATE |
|---|---|---|
| ▲ BK | XXXXX | 1997/09/22 11:09:59 |
| CH | CHECK PROCESS | 1997/09/12 11:09:59 |
| KO | PACKAGE | 1997/09/18 11:21:07 |

NEXT | DOWNLOAD | UPLOAD | BACK UP | LIST | CANCEL ACCESS FLAG | END

5301

SELECTION OF MODEL

FILE(F) EDIT(E) VIEW(V)

PRODUCT NUMBER : BJ - 970909    NAME : 97 - 09 - 09 LOAD
COMPONENT SYMBOL : CH    NAME :

| SET MODEL SYMBOL | QUANTITY | NAME | PREVIOUS PUBLICATION DATE |
|---|---|---|---|
| ▲ A250 IIQ | | | |
| BJC - 4200LX | | | |
| BJC - 4200 SYSTEM | | | |
| BJC - 420J | | | |
| BJC - 420J(BLACK) | | XXXXX | |
| BJC - 4300 | | | 1997/09/09 10:46:33 |
| BJC - 430J | | | |

[NEXT]  [REGISTER PUBLICATION]  [LOOK PUBLICATION]  [DISPLAY SAME MODEL]  [END]

5401

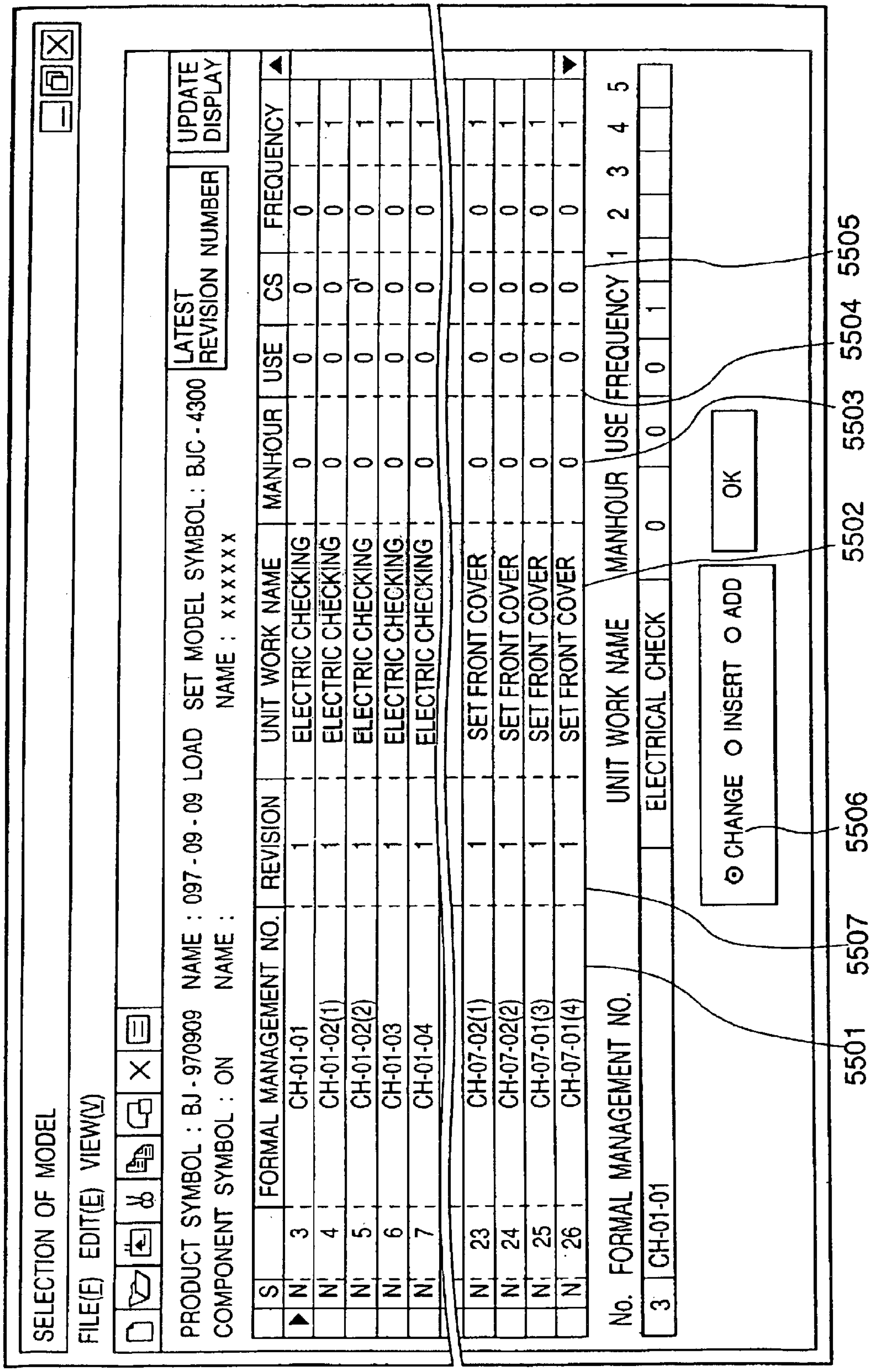

FIG. 55

| S | FORMAL MANAGEMENT NO. | REVISION | UNIT WORK NAME | MANHOUR | USE | CS | FREQUENCY |
|---|---|---|---|---|---|---|---|
| N° 3 ▲ | CH-01-01 | 1 | ELECTRIC CHECKING | 0 | 0 | 0 | 1 |
| N° 4 | CH-01-02(1) | 1 | ELECTRIC CHECKING | 0 | 0 | 0 | 1 |
| N° 5 | CH-01-02(2) | 1 | ELECTRIC CHECKING | 0 | 0 | 0 | 1 |
| N° 6 | CH-01-03 | 1 | ELECTRIC CHECKING | 0 | 0 | 0 | 1 |
| N° 7 | CH-01-04 | 1 | ELECTRIC CHECKING | 0 | 0 | 0 | 1 |
| N° 23 | CH-07-02(1) | 1 | SET FRONT COVER | 0 | 0 | 0 | 1 |
| N° 24 | CH-07-02(2) | 1 | SET FRONT COVER | 0 | 0 | 0 | 1 |
| N° 25 | CH-07-01(3) | 1 | SET FRONT COVER | 0 | 0 | 0 | 1 |
| N° 26 | CH-07-01(4) | 1 | SET FRONT COVER | 0 | 0 | 0 | 1 |

PRODUCT SYMBOL : BJ-970909  NAME : 097-09-09 LOAD  SET MODEL SYMBOL : BJC-4300  LATEST REVISION NUMBER
COMPONENT SYMBOL : ON  NAME :  NAME : xxxxx

| No. | FORMAL MANAGEMENT NO. | UNIT WORK NAME | MANHOUR | USE | FREQUENCY 1 2 3 4 5 |
|---|---|---|---|---|---|
| 3 | CH-01-01 | ELECTRICAL CHECK | 0 | 0 | 1 |

⦿ CHANGE  ○ INSERT  ○ ADD      OK 5501, 5502, 5503, 5504, 5505, 5506, 5507

| NO. | ELEMENT WORK NAME | REVISION | MANHOUR | US | CS |
|---|---|---|---|---|---|
| 1 | SET DOUBLE GEAR TO OPPOSITE SIDE OF AXIS IN ORDER OF SMALL GEAR DIAMETER | 1 | 0 | 0 | 0 |
| ▲ | * | | | | |

FORMAL MANAGEMENT NO. PU-03-01　UNIT WORK NAME : MOTOR ATTACHMENT　TOTAL MANHOUR : 0

NEXT UNIT WORK

SET CONDITION

COMMENT 1 : TO OPPOSITE SIDE OF AXIS — 5601

OBJECT : DOUBLE GEAR — 5602

COMMENT 2 : IN ORDER OF SMALL GEAR DIAMETER — 5603

— 5605

VERB : SET — 5604

FIG. 57

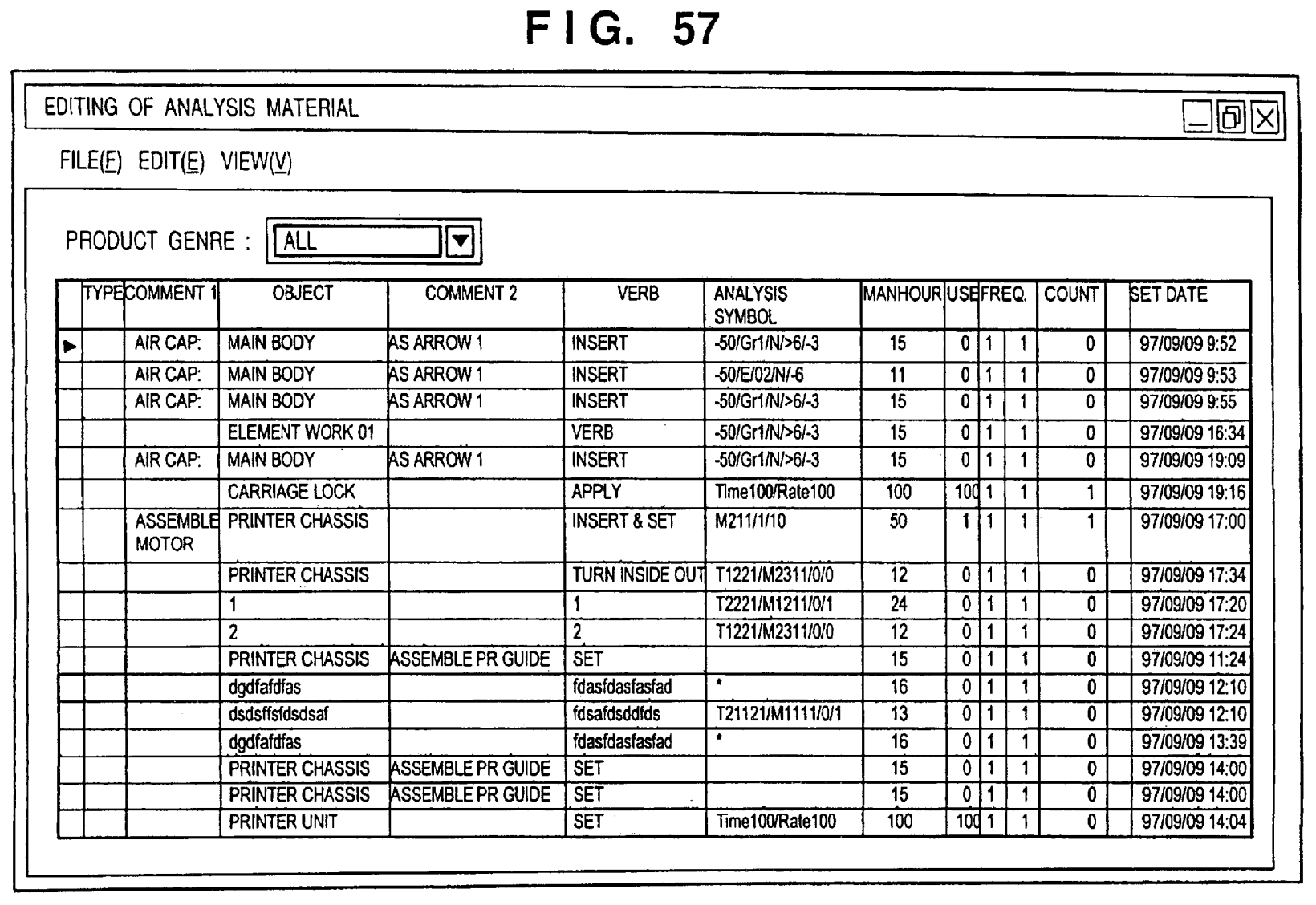

EDITING OF ANALYSIS MATERIAL

FILE(F) EDIT(E) VIEW(V)

PRODUCT GENRE : ALL

| | TYPE | COMMENT 1 | OBJECT | COMMENT 2 | VERB | ANALYSIS SYMBOL | MANHOUR | USE | FREQ. | | COUNT | SET DATE |
|---|---|---|---|---|---|---|---|---|---|---|---|---|
| ▶ | | AIR CAP: | MAIN BODY | AS ARROW 1 | INSERT | -50/Gr1/N/>6/-3 | 15 | 0 | 1 | 1 | 0 | 97/09/09 9:52 |
| | | AIR CAP: | MAIN BODY | AS ARROW 1 | INSERT | -50/E/02/N/-6 | 11 | 0 | 1 | 1 | 0 | 97/09/09 9:53 |
| | | AIR CAP: | MAIN BODY | AS ARROW 1 | INSERT | -50/Gr1/N/>6/-3 | 15 | 0 | 1 | 1 | 0 | 97/09/09 9:55 |
| | | | ELEMENT WORK 01 | | VERB | -50/Gr1/N/>6/-3 | 15 | 0 | 1 | 1 | 0 | 97/09/09 16:34 |
| | | AIR CAP: | MAIN BODY | AS ARROW 1 | INSERT | -50/Gr1/N/>6/-3 | 15 | 0 | 1 | 1 | 0 | 97/09/09 19:09 |
| | | | CARRIAGE LOCK | | APPLY | Time100/Rate100 | 100 | 100 | 1 | 1 | 1 | 97/09/09 19:16 |
| | | ASSEMBLE MOTOR | PRINTER CHASSIS | | INSERT & SET | M211/1/10 | 50 | 1 | 1 | 1 | 1 | 97/09/09 17:00 |
| | | | PRINTER CHASSIS | | TURN INSIDE OUT | T1221/M2311/0/0 | 12 | 0 | 1 | 1 | 0 | 97/09/09 17:34 |
| | | | 1 | | 1 | T2221/M1211/0/1 | 24 | 0 | 1 | 1 | 0 | 97/09/09 17:20 |
| | | | 2 | | 2 | T1221/M2311/0/0 | 12 | 0 | 1 | 1 | 0 | 97/09/09 17:24 |
| | | | PRINTER CHASSIS | ASSEMBLE PR GUIDE | SET | | 15 | 0 | 1 | 1 | 0 | 97/09/09 11:24 |
| | | | dgdfafdfas | | fdasfdasfasfad | * | 16 | 0 | 1 | 1 | 0 | 97/09/09 12:10 |
| | | | dsdsffsfdsdsaf | | fdsafdsddfds | T21121/M1111/0/1 | 13 | 0 | 1 | 1 | 0 | 97/09/09 12:10 |
| | | | dgdfafdfas | | fdasfdasfasfad | * | 16 | 0 | 1 | 1 | 0 | 97/09/09 13:39 |
| | | | PRINTER CHASSIS | ASSEMBLE PR GUIDE | SET | | 15 | 0 | 1 | 1 | 0 | 97/09/09 14:00 |
| | | | PRINTER CHASSIS | ASSEMBLE PR GUIDE | SET | | 15 | 0 | 1 | 1 | 0 | 97/09/09 14:00 |
| | | | PRINTER UNIT | | SET | Time100/Rate100 | 100 | 100 | 1 | 1 | 0 | 97/09/09 14:04 |

| NO. | CONTENTS OF OPERATION | WF/OS | SET CONDITION | MANHOUR | USE | REMARKS |
|---|---|---|---|---|---|---|
| 1 | XXXXXX | PU | -60/Gr1/N/>6/-3 | 15 | 0 | |
| ▲ | * | | | | | |

1 SET MAIN BODY TO PREDETERMINED POSITION

TOTAL SIMO VALUE: 0   TOTAL MANHOUR VALUE: 15   SIMO   NEXT ELEMENT WORK 5801  5802  5803  5804  5805

OPERATION ANALYSIS

5901 — 1. PU  6. DSY  11. PU  16. DSY
2. GET  7. R  12. GET  17. R
3. M  8. UMAC  13. M
4. MA  9. MP  14. MA
5. ASY  10. BODY  15. ASY

SELECT — 5902     CANCEL

☐ SIMO

F I G. 62
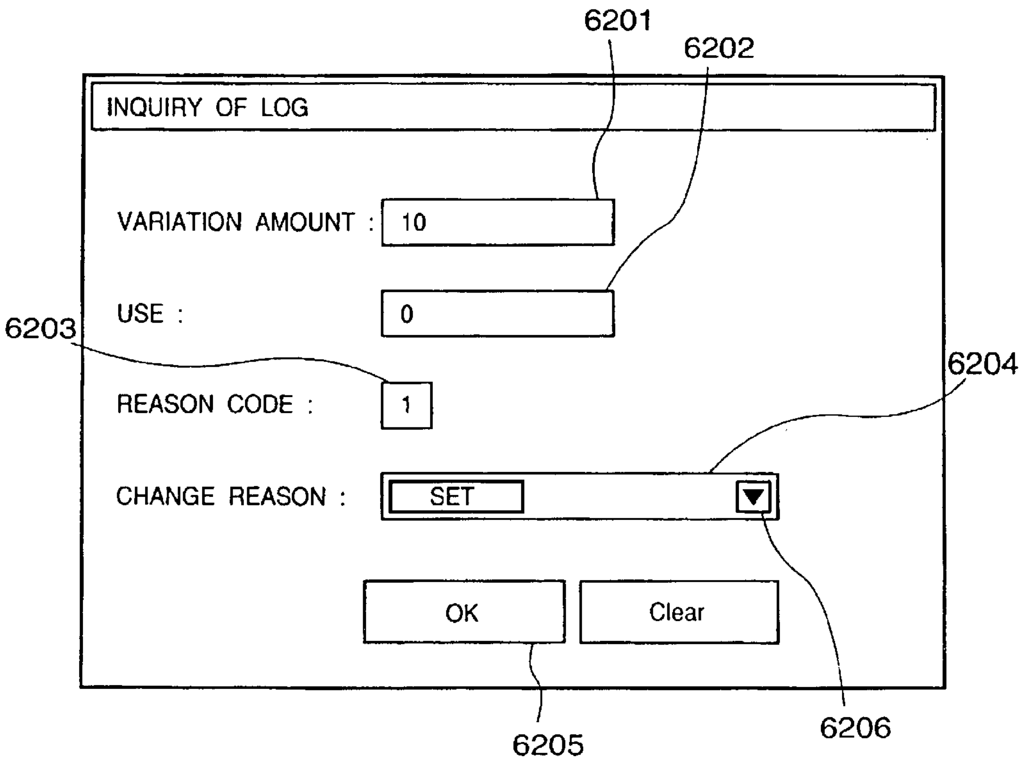

CORRECTION OF CHANGE LOG

DATE: 1997 09 22  ○ =  ○ FROM
               ⊙ BEFORE  ○ ~       [SEARCH]

| NO. | UNIT WORK NAME | CODE | CHANGE REASON | NEW MANHOUR | (NEW) MANUAL | (NEW) USE | PREVIOUS MANHOUR | (PREVIOUS) MANUAL | (PREVIOUS) USE | CHANGE DATE |
|---|---|---|---|---|---|---|---|---|---|---|
| ▲ CH-01-01 | ELECTRICAL CHECK | 1 | SET | 10 | 10 | 0 | 0 | 0 | 0 | 1997/09/22 14.30.00 |

← 6301          6302 →

REASON CODE [1]   CHANGE REASON [SET ▶]

[OK]   [CIr]   [END]

FILE(F) EDIT(E) INPUT(I) TOOL(O)

MODEL  GP55

UNIT

| STANDARD NO. | WORK NAME | MANHOUR |
|---|---|---|
| 0001 | STICK HANDY CUT TAPE | 134 |
| 0002 | SET LABELS ON MAIN BODY | 550 |
| 0003 | WEIMAN REMOVAL | 270 |
| 0004 | ASSEMBLE OUTER CASE | 365 |
| 0005 | FIT TOP PAD | 268 |
| 0006 | STICK LARGE-SIDE ORDER LABEL | 117 |

SIMPLE DIVISION / PARALLEL DIVISION

FIG. 68

SIMPLE DIVISION

FILE(F) EDIT(E)

St 1

| | | |
|---|---|---|
| 0001 | STICK HANDY CUT TAPE | 134 |
| 0002 | SET LABELS ON MAIN BODY | 550 |
| 0003 | WEIMAN REMOVAL | 270 |

St 2

| | | |
|---|---|---|
| 0004 | ASSEMBLE OUTER CASE | 365 |
| 0005 | FIT TOP PAD | 268 |
| 0006 | STICK LARGE-SIDE ORDER LABEL | 117 |

⋮

PARALLEL DIVISION

PLAN 2
St 1
| 1 |
| 2 |
| 8 |

St 2
| 3 |
| 4 |
| 5 |

PLAN 1
St 1
| 1 | STICK HANDY CUT TAPE | 99 |
| 2 | SET LABELS ON MAIN BODY | 78 |
| 3 | WEIMAN REMOVAL | 134 |

St 2
| 4 | ASSEMBLE OUTER CASE | 732 |
| 5 | FIT TOP PAD | 268 |
| 6 | STICK LARGE-SIDE ORDER LABEL | 117 |

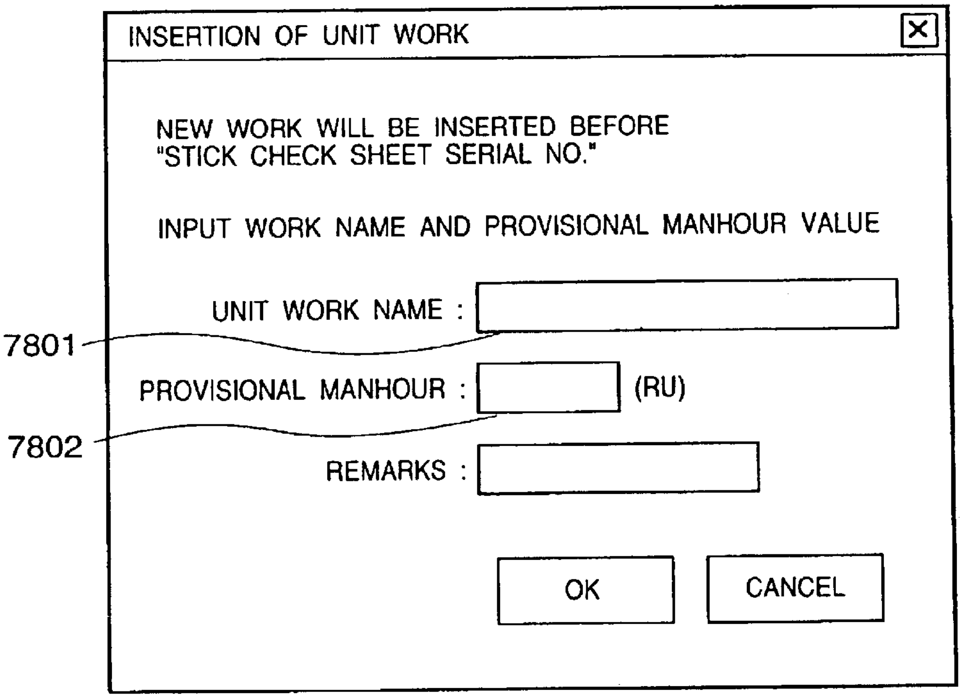

FIG. 78

```
┌─────────────────────────────────────────────────┐
│ INSERTION OF UNIT WORK                     [X]  │
│                                                 │
│   NEW WORK WILL BE INSERTED BEFORE              │
│   "STICK CHECK SHEET SERIAL NO."                │
│                                                 │
│   INPUT WORK NAME AND PROVISIONAL MANHOUR VALUE │
│                                                 │
│   UNIT WORK NAME : [                         ]  │
│                                                 │
│   PROVISIONAL MANHOUR : [        ] (RU)         │
│                                                 │
│   REMARKS : [              ]                    │
│                                                 │
│                      [   OK   ]  [ CANCEL ]     │
└─────────────────────────────────────────────────┘
```

7801 — UNIT WORK NAME
7802 — PROVISIONAL MANHOUR

STATION 1

| WORK NAME | MANHOUR |
|---|---|
| A1 | 10 |
| A2 | 20 |
| A3 | 12 |
| A4 | 50 |

STATION 2

| WORK NAME | MANHOUR |
|---|---|
| B1 | 10 |
| B2 | 25 |
| B3 | 11 |
| B4 | 8 |

STATION 1

| WORK NAME | MANHOUR |
|---|---|
| A1 | 10 |
| A2 | 20 |
| A3 | 12 |
| A4 - 1 | 25 |
| A4 - 2 | 25 |

MANHOUR IN STATION = 92

STATION 2

| WORK NAME | MANHOUR |
|---|---|
| B1 | 10 |
| B2 | 25 |
| B3 | 11 |
| B4 | 8 |
| | |

MANHOUR IN STATION = 54

STATION 1

| WORK NAME | MANHOUR |
|---|---|
| A1 | 10 |
| A2 | 20 |
| A3 | 12 |
| A4 - 1 | 25 |

MANHOUR IN STATION = 77

STATION 2

| WORK NAME | MANHOUR |
|---|---|
| A4 - 2 | 25 |
| B1 | 10 |
| B2 | 25 |
| B3 | 11 |

MANHOUR IN STATION = 79

STATION 1

STATION 2

FIG. 89

| DIRECTORY NAME | IMAGE DATA | OPERATION (VERB) | PARAMETER 1 | PARAMETER 2 | PARAMETER 3 |
|---|---|---|---|---|---|
| xxxxxx1 | SCREW | SCREW | SCREW CLOCKWISE | DISTANCE MOVEMENT 10mm | TORQUE 10Kg.M |
| xxxxxx2 | SCREW | SCREW | SCREW CLOCKWISE | DISTANCE MOVEMENT 20mm | TORQUE 20Kg.M |
| xxxxxx3 | SCREW | SCREW | SCREW CLOCKWISE | DISTANCE MOVEMENT 20mm | TORQUE 30Kg.M |
| ... | ... | ... | ... | ... | ... |
| yyyyyy1 | ROTATE | ROTATE | CLOCKWISE | DISTANCE MOVEMENT 20mm | |
| yyyyyy2 | ROTATE | ROTATE | COUNTERCLOCKWISE | DISTANCE MOVEMENT 20mm | |
| ... | ... | ... | ... | ... | ... |
| zzzzzz1 | OPEN | OPEN | OPEN UPWARD | DISTANCE MOVEMENT 30mm | WEIGHT 100g |
| zzzzzz2 | OPEN | OPEN | OPEN DOWNWARD | DISTANCE MOVEMENT 40mm | WEIGHT 200g |
| ... | ... | ... | ... | ... | ... |

$N_{ST}$: THE NUMBER OF STATIONS
$n_i$ : i STATION PARALLEL NUMBER
$n_0$ : TOTAL ACCUMULATED PARALLEL SUM NUMBER $N_{ST}$ : THE NUMBER OF STATIONS
$T_i$ : i STATION MANHOUR
TA : STATION MANHOUR AVERAGE VALUE
$T_A = WF / N_{ST}$
To : TOTAL ACCUMULATED MANHOUR
$n_i$ : i STATION PARALLEL NUMBER
$n_o$ : TOTAL ACCUMULATED PARALLEL SUM NUMBER

AUTOMATIC MANHOUR SETTING SYSTEM AND METHOD, DISTRIBUTED CLIENT/ SERVER SYSTEM, AND COMPUTER PROGRAM STORAGE MEDIUM

FIELD OF THE INVENTION

The present invention relates to an automatic manhour setting method and system for automatically setting manhours for an enormous number of work standards representing works in, e.g., an assembly workshop, a distributed client/server system, and a computer program storage medium.

BACKGROUND OF THE INVENTION

To assembly a product from parts, an enormous number of parts are required. The larger the number of parts becomes, the more enormous and complex the works become.

Conventionally, an experienced chief of the workshop, who knows the enormous number of complex works well, manually arranges the works, calculates the manhour, and assigns operators in units of manhours.

However, this manual composing operation accompanies poor maintenance because it is not only time-consuming but also difficult to correct and can be understood only by the creator.

SUMMARY OF THE INVENTION

The present invention has been made to solve the above problem, and has as its object to propose automatic manhour setting system and method capable of automatically giving manhours to an enormous number of work standards, a distributed client/server system, and a computer program storage medium.

In order to achieve the above object, an automatic manhour setting system according to the present invention is characterized by having the following arrangement.

More specifically, there is provided an automatic manhour setting system (2801) for giving manhour data to work standard data converted into computer data, characterized by comprising:

a standard manhour database (2805) designed to be readable, in which a number of pairs each constituted by a work standard described by a standardized standard expression and a manhour corresponding to the work standard are registered in advance;

setting means for, for each of target work standards to which manhours are to be given, matching an expression of the target work standard with the standard expressions of the work standards in the standard manhour database and setting a standard manhour of a matching work standard in the database as a manhour of the target work standard; and manhour file means for storing a set manhour file.

According to a standard manhour setting system of a preferred aspect of the present invention, the target work standard to which the manhour is to be given is described by an operation phrase representing an operation of a work, an object phrase representing a target of the operation, and a comment phrase representing auxiliary information related to the operation and/or object, and each of the work standards in the database is also described by an operation phrase, object phrase, and comment phrase. This is because a work is most simply and exactly expressed by an operation phrase, object phrase, and comment phrase.

According to still another preferred aspect of the present invention, for the target work standard to which the manhour is to be given, a first comment related to an object of an operation, an object phrase representing the object of the operation, a second comment related to the operation, and an operation phrase representing the operation of the work are described in a predetermined order, and for each of the work standards in the database, a first comment, object phrase, second comment, and operation phrase are also described in the predetermined order.

There are various kinds of searching methods. If complete matching is used, for example, preferably, search based on complete matching between the expression of the target work standard and the standard expression of the work standard in the standard manhour database is preferentially executed.

The search based on complete matching is not always successful. Hence, search based on partial matching is preferably used for the target work standard for which the search based on complete matching to the standard expression of the work standard in the standard manhour database fails.

According to still another preferred aspect of the present invention, when the search of the expression of the target work standard in the standard manhour database fails, the setting means executes search in a second manhour database whose degree of standardization is lower than that of the standard manhour database.

The standard manhour database includes work standards recognized as standards, while the second manhour database whose degree of standardization is lower includes, e.g., work standards which are barely used in the past.

The search efficiency can be increased using a wild card symbol. Hence, the expression included in the target work standard preferably includes an expression by a wild card.

Assume that the wild card symbol is used for the search, as described above. In this case, when a plurality of standard work standards which match a work standard including an expression including a wild card symbol are present, candidates are preferably displayed in a descending order of the degrees of matching to cause the user to select one candidate.

According to still another preferred aspect of the present invention, the system is characterized in that standard manhour data in the standard manhour database contains a manhour value and data related to a set condition when the manhour value is set.

For the "set condition" the system is characterized in that the condition data is referred to by a directory in a memory space of the automatic manhour setting system, and the setting means sets a directory value of the searched set condition data of the work standard as the manhour of the target work standard.

According to still another preferred aspect of the present invention, the system comprises analysis means for analyzing the work standard to assign the manhour when no matching is obtained by searching the second manhour database.

A system having no second manhour database preferably comprises analysis means for analyzing the work standard to assign the manhour when no matching is obtained by searching the standard manhour database.

According to still another preferred aspect of the present invention, the analysis means uses a creation tool with the same reference as that in creating contents of the standard manhour database. When the tools are united, the user interfaces are also united, and the output forms are also united.

The analysis means may use a creation tool with the same reference as that in creating contents of the second manhour database.

According to still another preferred aspect of the present invention, the system comprises download means for downloading a plurality of work standard data to which manhours are to be given.

For the download user interface, the standard manhour setting system is characterized in that the plurality of downloadable work standard are stored in an external database, and the download means comprises means for downloading directories of the downloadable work standards from the external database and displaying the directories, and selection means for selecting an arbitrary one of the displayed directories, thereby selecting the target work standard to which the manhour is to be given.

The system is characterized in that the external database stores the downloadable work standards having a hierarchical structure according to the degree of assembly, the download means downloads upper directories to the manhour setting system together with the directories of the downloadable work standards, the display means displays the downloaded work standard directories and upper directories together, and the selection means can designate whether one of the displayed work standard directories or upper directories is selected. With this arrangement, the user can select a plurality of work standards at once in accordance with a composition revision watchdog according to the his/her purpose.

The above object can also be achieved by a distributed client/server database system comprising a server including the above-described storage means and a plurality of clients each having input means.

The above object can also be achieved by a work standard creation method corresponding to each of the above-described system configurations or a computer program storage medium for realizing the method by a computer system.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 15 is a view for explaining an example of a plurality of input work procedures;

FIG. 22 is a view showing a menu window for opening a work to be edited in editing the work standard;

FIG. 31 is a view for explaining a state wherein the work standard to be translated and an English equivalent are displayed on opposite sides;

FIG. 32 is a view for explaining a state wherein the work standard to be translated and an English equivalent are displayed on opposite sides;

FIG. 37 is a view for explaining the data structure of a manhour setting file 3601;

FIG. 38 is a view for explaining the data structure of a standard data file 2804;

FIG. 41 is a view for explaining the outline of data load in the standard manhour setting system 2801;

FIG. 43 is a view for explaining the second route for setting the manhour on the basis of data from an operation pattern data file;

FIG. 44 is a view showing a manhour setting file 3601;

FIG. 55 is a view for explaining the dialog for selecting a "work" to be edited;

FIG. 57 is a view for explaining the analysis material editing window;

FIG. 62 is a view for explaining a window for inquiring the change reason for the manhour of a specific work;

FIG. 68 is a view for explaining the work contents of stations divided by simple division;

FIG. 78 is a view for explaining a user interface window in adding a work in the standard manhour setting system 2801;

FIG. 89 is a view for explaining a state wherein operations of each of a plurality of works, and images and parameters corresponding to the respective operations are related to each other and stored;

DETAILED DESCRIPTION OF THE PREFERRED EMBODIMENT

An embodiment in which the present invention is applied to a printer manufacturing process will be described below in detail with reference to the accompanying drawings.

Figure 28:
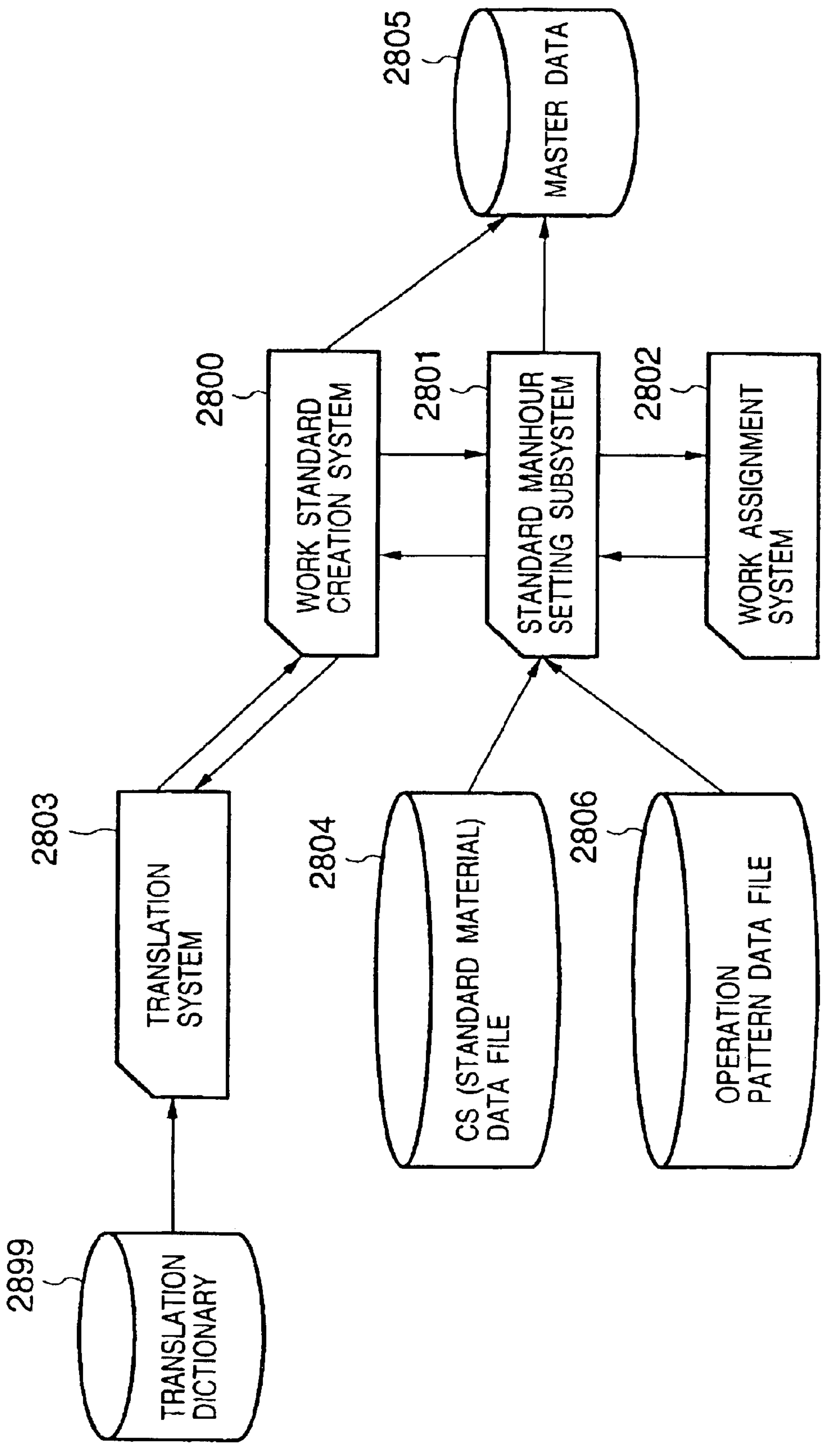
FIG. 28 is a view for explaining positioning of a translation subsystem in the work standard creation system.

The overall system to be described in this embodiment is called an "assembly standard information management system". As shown in FIG. 28, this assembly standard information management system comprises three subsystems:

work standard creation subsystem 2800,
standard manhour setting subsystem 2801, and
work assignment subsystem 2802

In the following explanation, these subsystems will be referred to as the work standard creation system 2800, standard manhour setting system 2801, and work assignment system 2802, respectively, for the descriptive convenience.

The work standard creation system 2800 creates (defines) a work standard (work standard data) for the standard manhour setting subsystem 2801 and work assignment subsystem 2802. In the work standard creation system 2800, the user is required to understand, for each work to be executed in the manufacturing process, a "verb" representing an operation of the work, an "object" that describes the target of the work, and some "comments" and also have knowledge for the manufacturing process enough to sequentially describe the flow of the series of works.

The standard manhour setting system 2801 determines the standard manhour for the work standard created by the work standard creation system 2800.

The work assignment system 2802 determines composition (work composition) using the work standard created by the work standard creation system 2800.

<Overall Arrangement>

Figure 1:
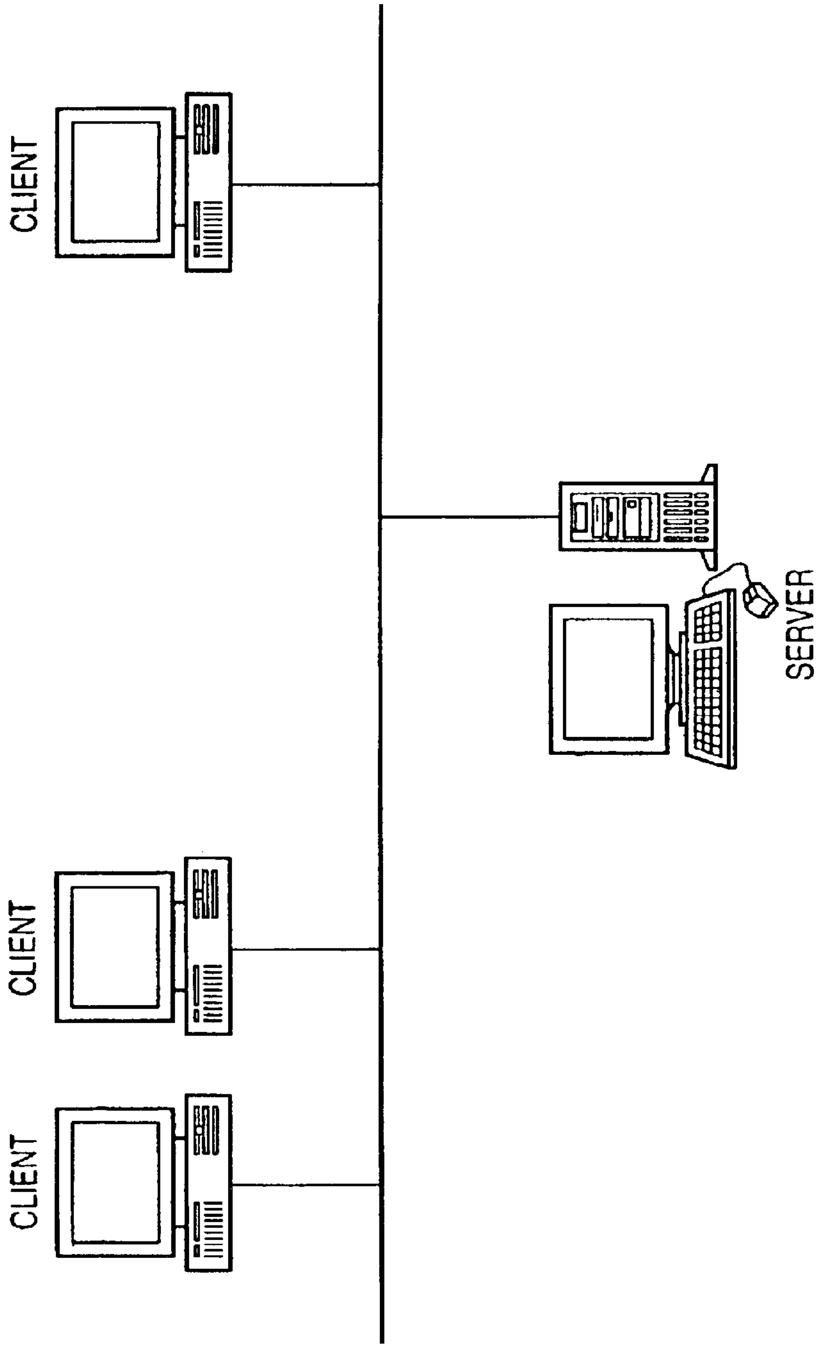
FIG. 1 is a view showing the hardware configuration of an assembly standard information management system according to an embodiment.

FIG. 1 shows the hardware configuration of the assembly standard information management system. As shown in FIG. 1, this assembly standard information management system has a plurality of clients and one server (or a plurality of servers). The computer system of each client (to be referred to as a client system hereinafter) has, e.g., OS: Windows95/98,
DB connection software: ODBC driver for Oracle,
communication network software: SQL-Net for Oracle,
work standard creation system application program,
standard manhour setting system application program, and
work assignment system application program.

On the other hand, the server-side computer has a system configuration comprised of OS: Windows-NT server, and
database: Oracle WorkGroup Server On the assembly standard information management system constructed by a plurality of clients and one or a plurality of servers, three application programs or the "work standard creation system 2800", "standard manhour setting system 2801", and "work assignment system 2802" simultaneously or independently run in the so-called client/server environment.

Current computer hardware capable of realizing the general client/server environment can be applied to each of the internal hardware configurations of the server and clients of the assembly standard information management system, and a detailed description thereof will be omitted in this embodiment.

<Work Standard Creation System 2800>

The work standard creation system 2800 defines/creates master data to be used by the standard manhour setting system 2801 and work assignment system 2802.

A "work standard" represents a certain work unit in the manufacturing process. One work process (to be referred to as a process hereinafter) is formed from a plurality of work standards (or one work standard in some cases). To manufacture products of a model, a plurality of processes are defined for the products of the model, and one or a plurality of work standards are defined for each process, as shown in FIG. 2.

Figure 2:
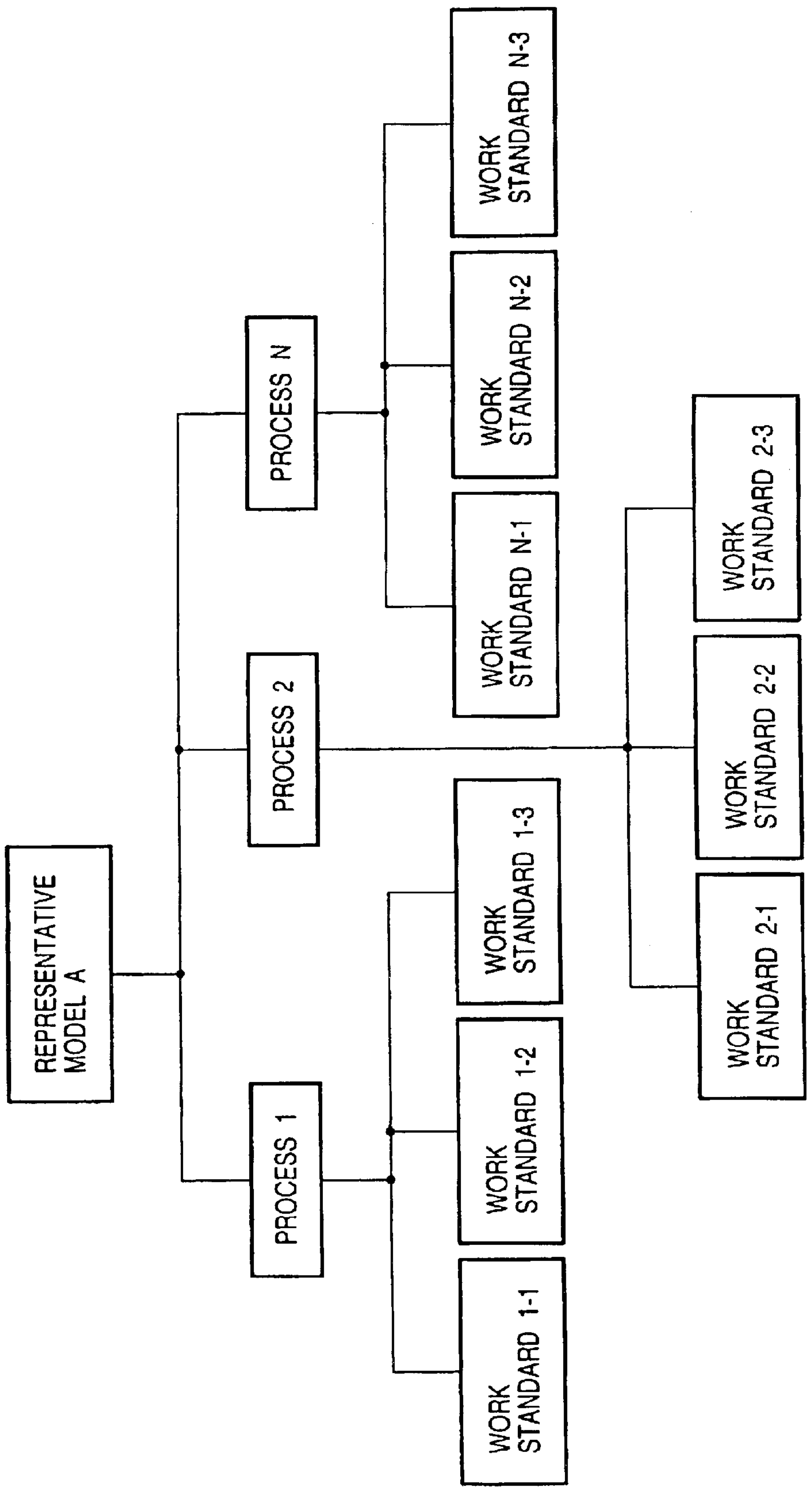
FIG. 2 is a view showing the relation structure of a representative model record, process (arrangement) record, and work standard record.
Figure 3:
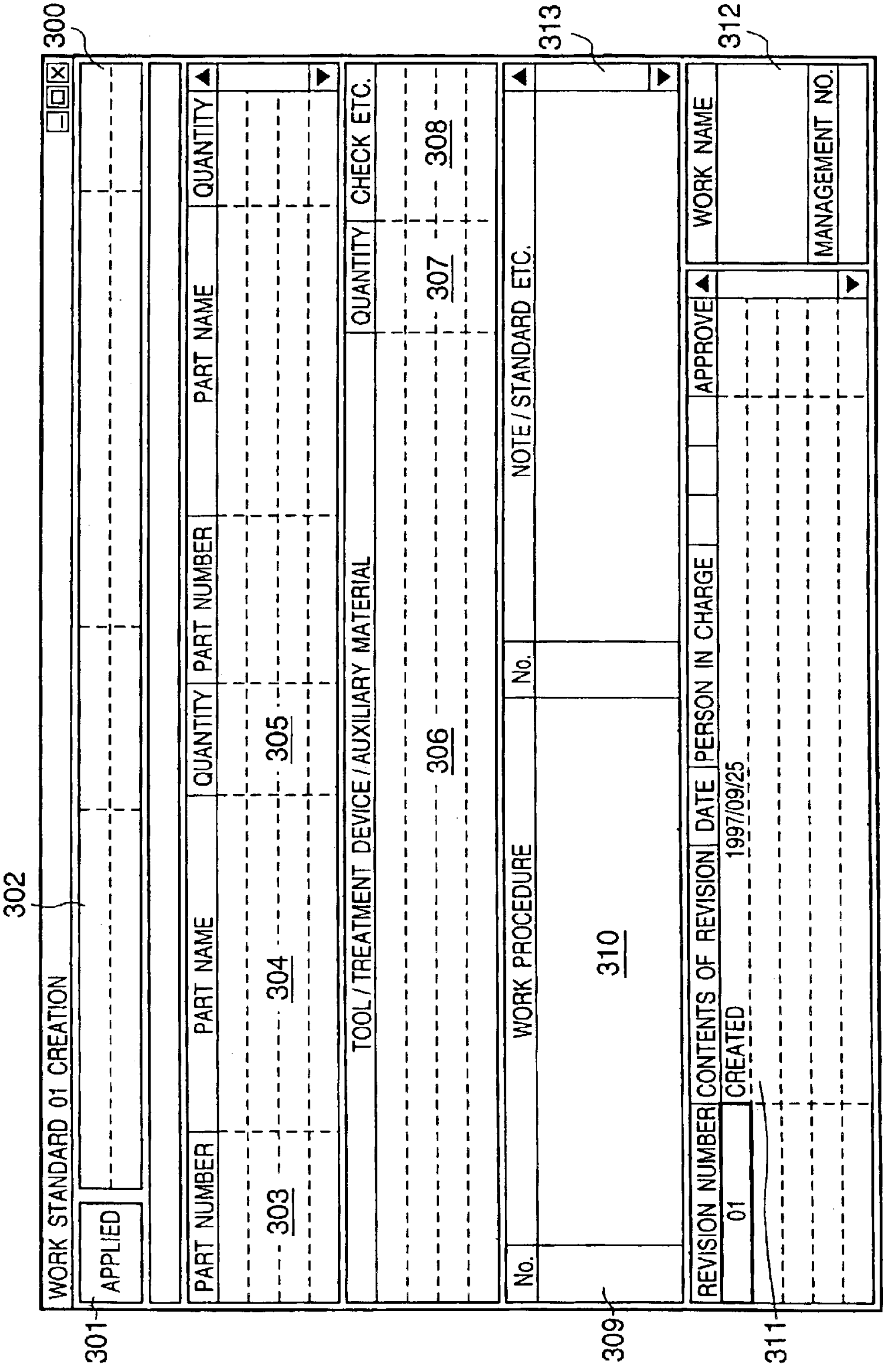
FIG. 3 is a view for explaining a window in which work standard data is to be input in the work standard system.

Referring to FIG. 2, process 1, process 2, . . . , process N are defined for a representative model A. A plurality of "work standards" can be defined for each process. Each work standard is input through an input window (either from the client terminal or the server terminal) as shown in FIG. 3.

As will be described later, in this embodiment, the basic work unit is called a "work standard" that is the base of work in the assembly process. However, the "assembly standard information management system" of this embodiment is finally a system for managing assembly of products in the factory and therefore is preferably capable of management not at the work standard level but at the product level.

As will be described later, one work is assigned one identifier (or directory). Sets of a plurality of work standards are classified using a hierarchical structure including "target model", "representative model" as the upper level thereof, and "genre" as the further upper level (e.g., a genre such as "printer" or "camera"). More specifically, the CRT window (display window) of the terminal displays menus:

"create" menu, and
master maintenance

When the user selects the "create" menu in this display window, a dialog box for inputting the name of "representative model" and the name of "process" appears on the screen of the display unit. In this window, the user inputs the name of "representative model" and the name of "process". For example, assume that the input name of "representative model" is "BJC-4200", and the input name of "process" for the model "BJC-4200" is "total assembly". The application program will create a record "total assembly" under a record "BJC-4200" and create a plurality of work standard records under the record "total assembly".

The main menu of the application program includes "work standard", "edit", . . . , and the pull-down menu of the "work standard" menu-includes "file new (N)".

The input window shown in FIG. 3 is displayed when the "file new (N)" is selected. That is, this application program allows the user to define a certain work of the representative model "BJC-4200" through the input window shown in FIG. 3. The user inputs the name of the work in a "work name" field 312.

In addition to the "work name" field 312, a window 300 shown in FIG. 3 has

- a field 302 to which the name of an "applied model" is to be input,
- an input field related to parts to be used in this "work" ("part number" field 303, "part name" field 304, and "quantity" field 305),
- an input field related to tools to be used in this "work" ("tool/treatment device/auxiliary material" field 306, "quantity" field 307, and "check etc." field 308),
- a field related to work standards as characteristic input items of this application program ("number" field 309, "work standard" field 310, and "note" field 313), and
- a field 311 to which information related to a later revision/change of this "work" is input.

Figure 4:
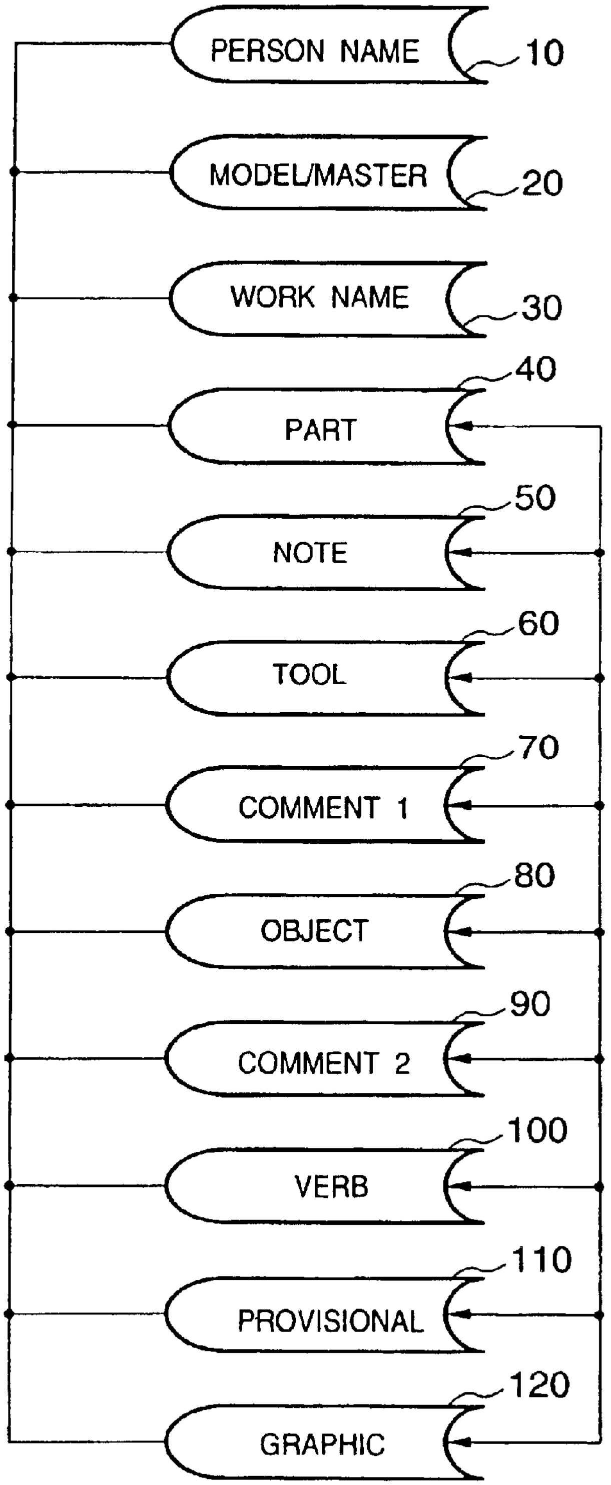
FIG. 4 is a view showing the linkage between master data files in the work standard system.

FIG. 4 shows files opened by this application program, which form a master data file group. Each master file will be described later.

Figure 5:
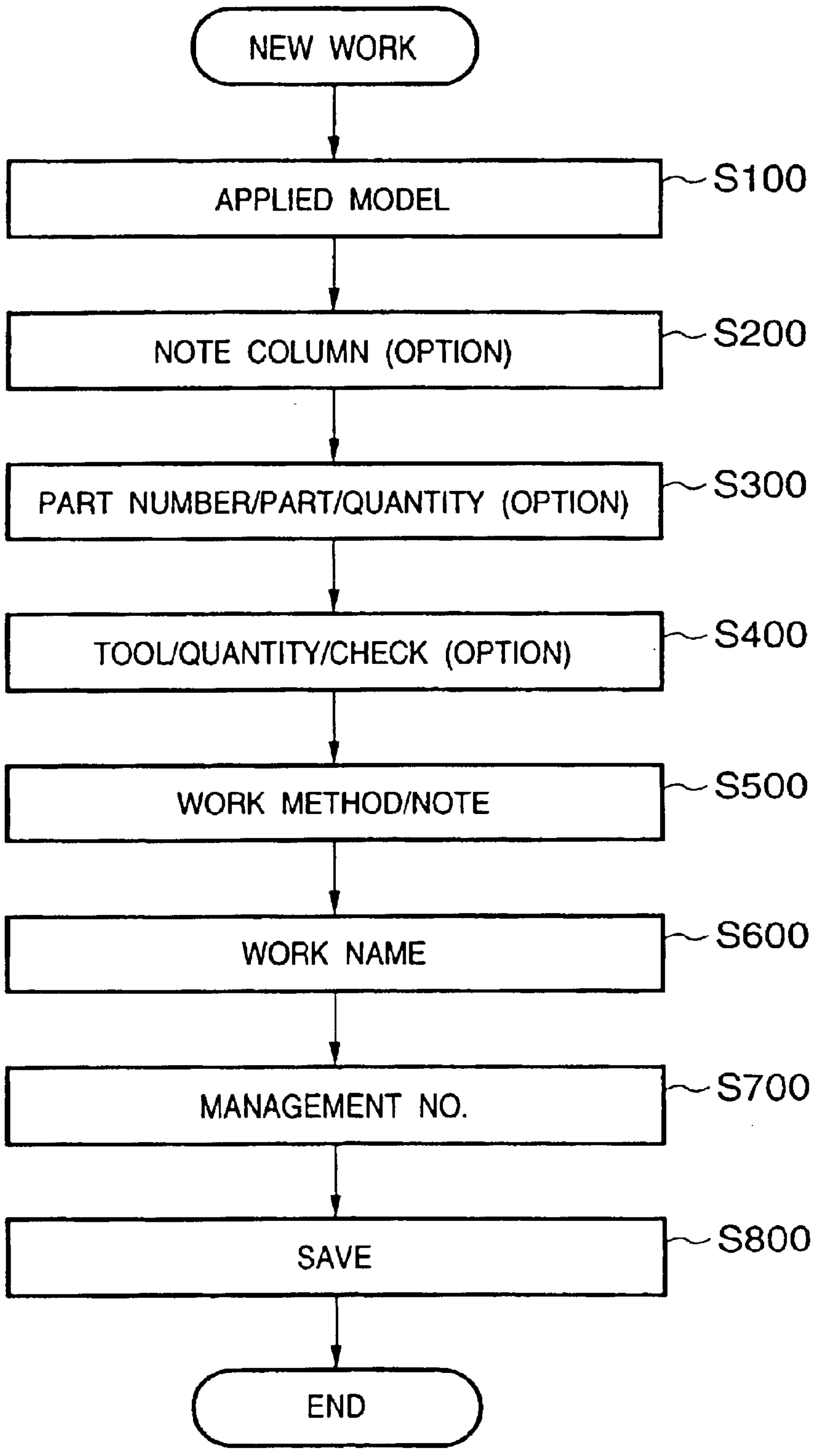
FIG. 5 is a flow chart for explaining the procedure of inputting work standard data.

FIG. 5 is a flow chart for explaining the input procedure for the input window shown in FIG. 3.

First, an input to the "applied model" field 302 is done in step S100 shown in FIG. 5.

Figure 6:
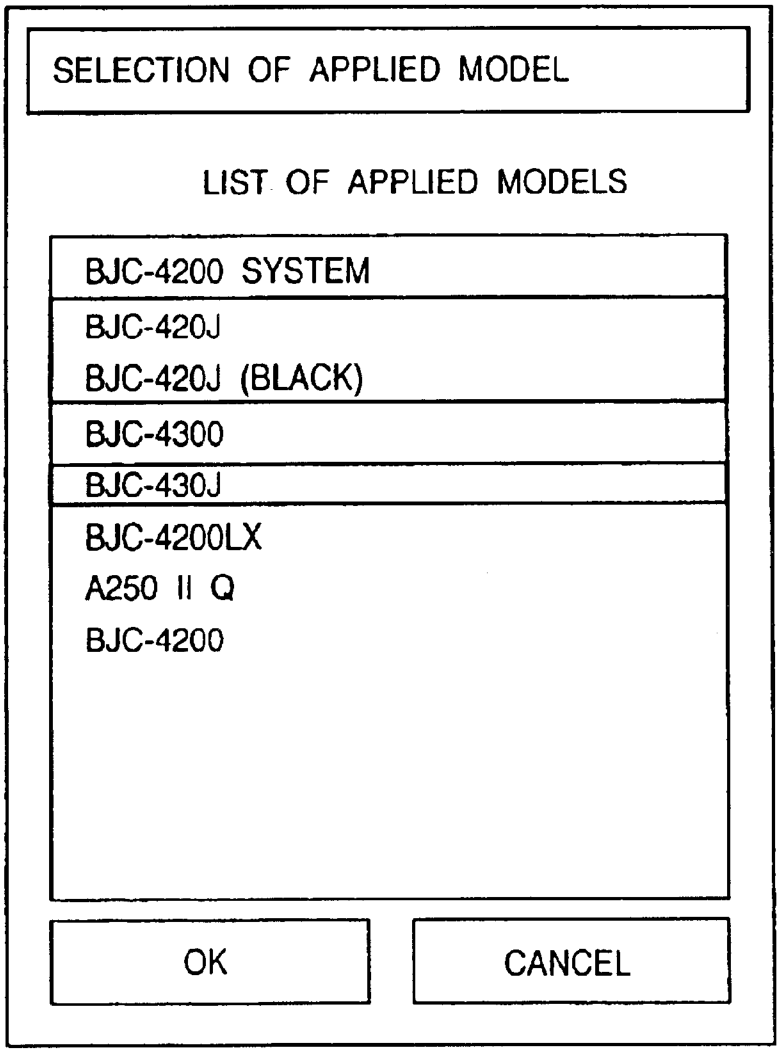
FIG. 6 is a view for explaining a window for inputting data to the "applied model" field.
Figure 7:
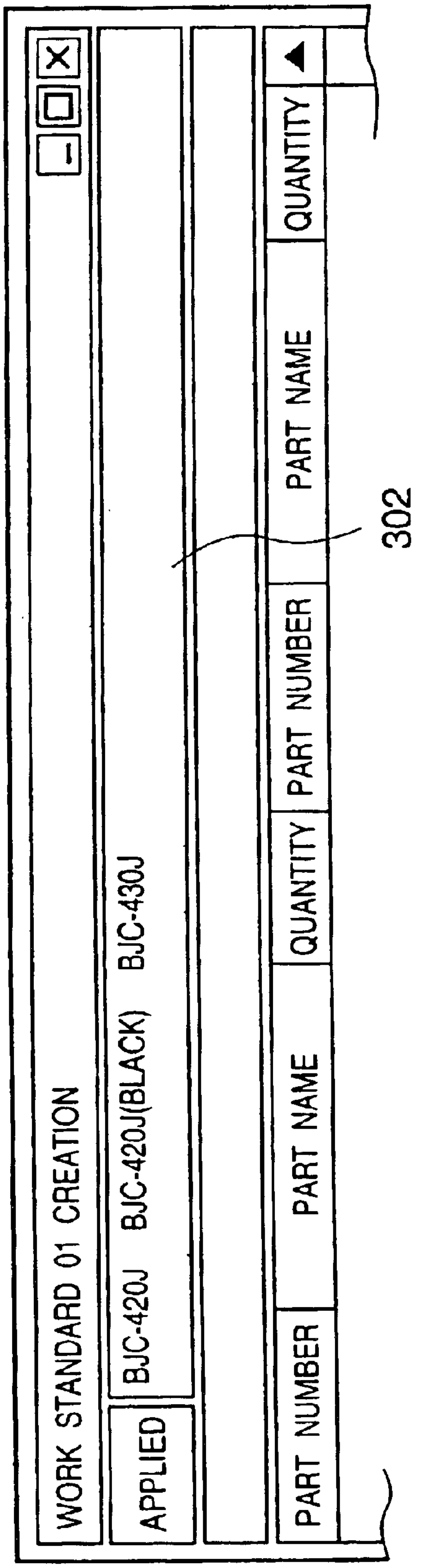
FIG. 7 is a view for explaining another method of inputting a model name to an applied model field 302.

The input in this step can be done in two ways: a direct input method by which the user directly inputs data to the field using a keyboard, and a menu input method by which an icon 301 is clicked to display a window with the list of a plurality of candidate names of the "applied models", as shown in FIG. 6, the user selects one of the displayed candidate names using a mouse or the like, and the selected name is input to the field 302. In the example shown in FIG. 7, the names of a plurality of "applied models" selected in the window shown in FIG. 6 are input to the field 302.

In step S200, the user inputs a desired note to the note column through the keyboard.

In step S300, the user inputs data related to parts or tools to a predetermined field through the keyboard while moving the cursor to an arbitrary position in the field using the mouse.

Figure 8:
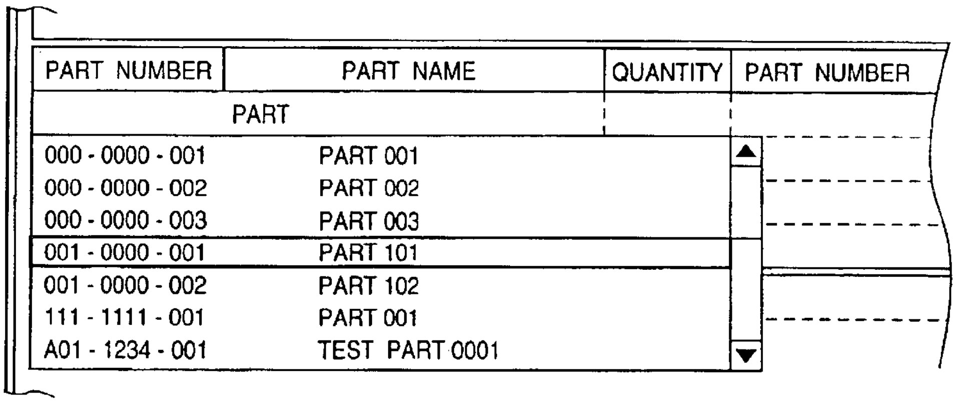
FIG. 8 is a view for explaining reference input of data related to a part.

A part number pairs with a part name. When one of them is input, a part data master file 40 (FIG. 4) is searched (so-called incremental search) using the input character sequence as a keyword, so all pairs of part numbers and part names having that keyword are displayed, as shown in FIG. 8. The user selects a pair from the displayed candidates, so the selected pair data is output to a predetermined field.

The method of incremental search used for the above search will be described with reference to FIGS. 9 and 10.

In the incremental search, search is executed using characters input until the current time as a keyword to display candidates searched at the current time, and every time one more character is input, the candidates that have already been searched are narrowed down to only those matching the character sequence including the added character.

Figure 9:
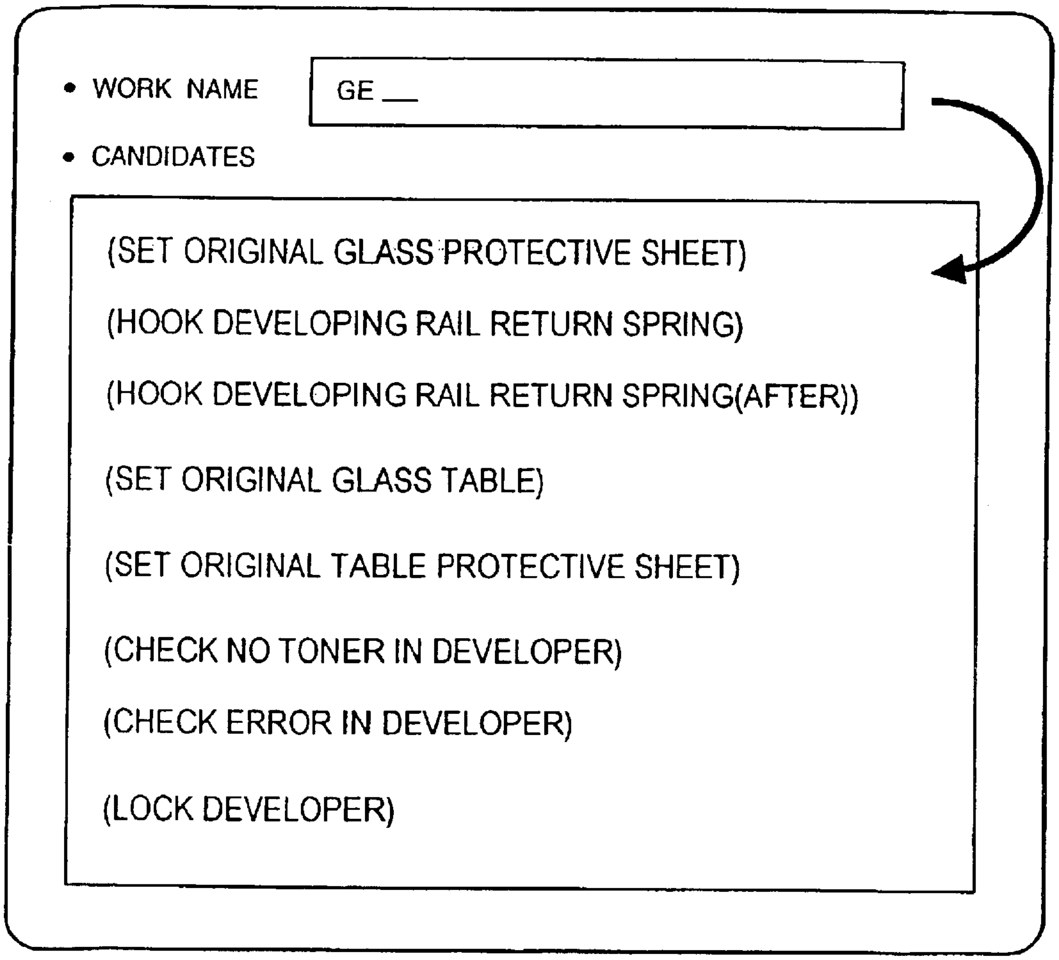
FIG. 9 is a view for explaining incremental search input of data related to a work.
Figure 10:
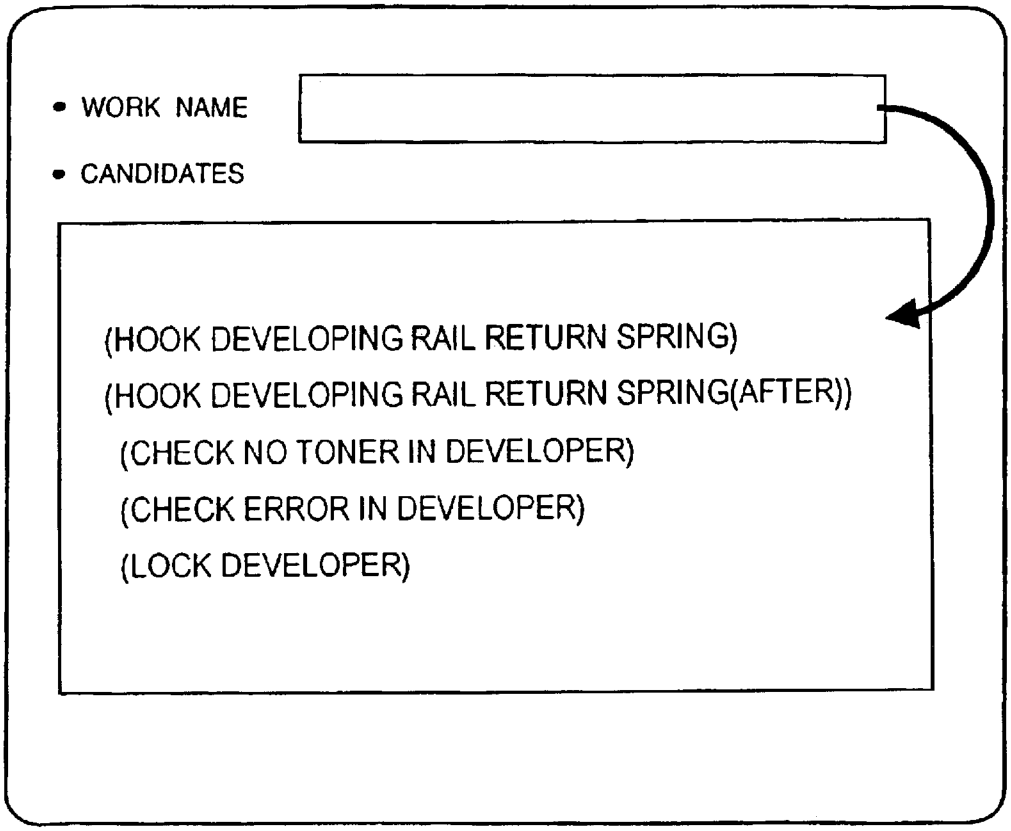
FIG. 10 is a view for explaining incremental search input of data related to a work.

In the example shown in FIG. 9, when "GE" ("げ") is input to an input field (upper field), various words and phrases starting with "げ" are displayed in an output field (lower field) as candidates. Further, when "NZO" is input next to "げ", words and phrases starting with "現像 (GENZOU: developing)" are displayed in the output field as candidates, as shown in FIG. 10. That is, the candidates shown in FIG. 10 are narrowed down from those shown in FIG. 9. Note, that English translations corresponding to each of the Japanese candidates are described, for easy understanding, in parentheses after the Japanese candidates in FIGS. 9 and 10.

The description will be continued referring back to the flow chart shown in FIG. 5.

In step S400, pieces of information related to tools and the like are input to the fields 306, 307, and 308. For this data input as well, the direct input using the keyboard and the method of searching from the master file (tool file 60) are prepared, like the input in step S300.

Figure 11:
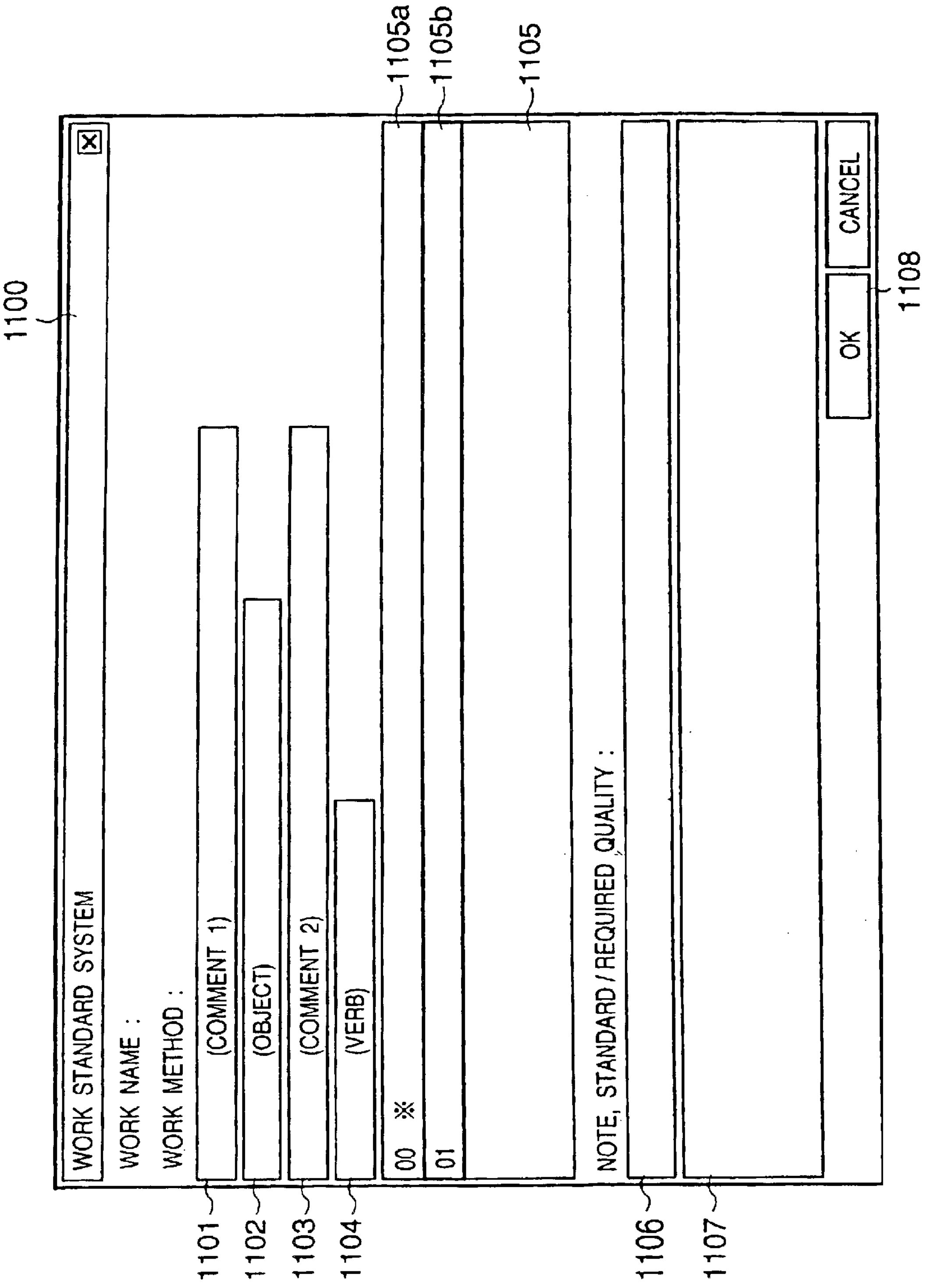
FIG. 11 is a view for explaining a window in which data related to a work is to be input.

In step S500, the user inputs details of a work standard for the work to be defined. The data input for definition of a work standard is the gist of the data input in the work standard creation system 2800, and a dedicated input window as shown in FIG. 11 is prepared. Details of step S500 are included in the control procedure shown in FIG. 14.

When the user double-clicks on an arbitrary part of the "work standard" field 310, the input window shown in FIG. 11 is displayed. When a work standard has already been input to the double-clicked position, i.e., when the user double-clicks on a portion where the name of an already input "work standard" is displayed, details of the already input work standard are displayed in the window shown in FIG. 11.

As shown in FIG. 11, one "work standard" comprises a "comment 1" field 1101,
an "object" field 1102,
a "comment 2" field 1103, and
a "verb" field 1104.

"Operation" that defines one work is defined by the "verb" field 1104, and the target of the "operation" is defined by the "object" field 1102. The subject of the operation in the "verb" field 1104 is an operator. Hence, who is the operator need not be explicit.

"Comment 1" describes a comment about the "object". "Comment 2" describes a comment about the "verb". For example, if "comment 1"="at wwww position",
"object"="xxxx",
"comment 2"="become yyyy",
"verb"="do zzzz"

are input, the user understands when the work standard is displayed that the operator should execute a work of "doing zzzz such that xxxx at wwww position becomes yyyy". Hence, appropriate and simple information must be input to the fields 1101 to 1104 assuming the above understanding by the operator. In other words, standardization is impossible if the user arbitrarily inputs data to the fields 1101 to 1104. To avoid this, the work standard creation system 2800 prepares in advance a standard database 70 already input in relation to "comment 1", a standard database 80 already input in relation to "object", a standard database 90 already input in relation to "comment 2", and a standard database 100 already input in relation to "verb", as shown in FIG. 4. Additionally, when the user is going to input the respective items related to the work standard, the above-described incremental search method for the master databases corresponding to items that the user will input allows the user to execute reference input of already input data. Hence, defined standard terms can be input to the fields 1101 to 1104 regardless of the user.

The reference input operation related to the work standard will be described here with reference to FIG. 11 and the like.

Referring to FIG. 11, a field 1105 is divided into a reference instruction field 1105*a* and a work standard display field 1105*b*. "00*" is always displayed in the reference instruction field 1105*a*. The user who requires the reference input should double-click on the field 1105*a*.

An explanation will be done below by exemplifying a data input to the "comment 1" field 1101.

First, the user selects the field 1101 to notify the system that the user requires the data input of comment 1.

Figure 12:
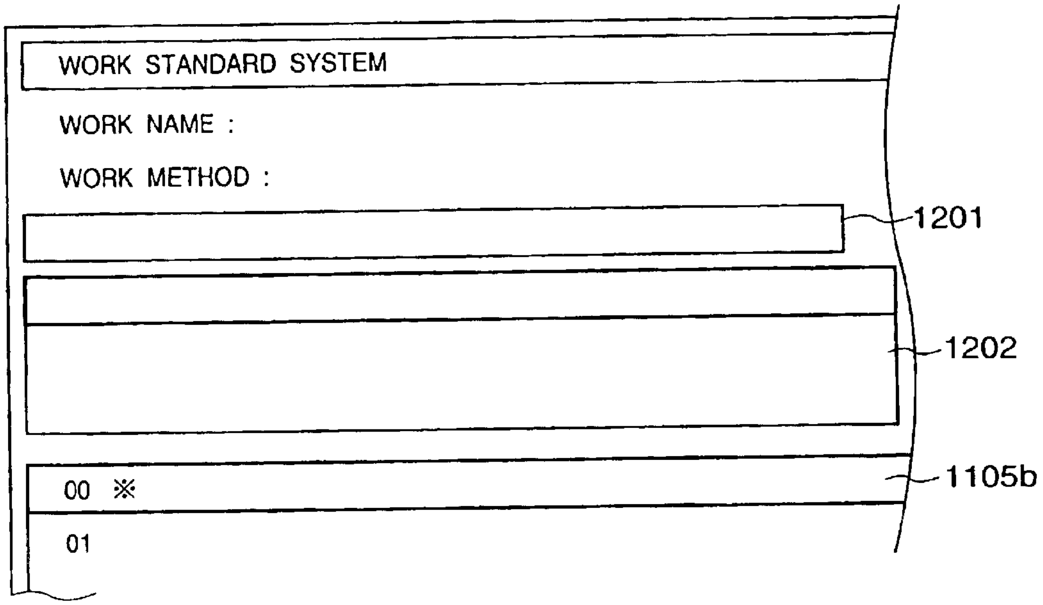
FIG. 12 is a view for explaining reference input in inputting work data.

When the user double-clicks on "00*" in the field 1105*a*, the fields 1101 to 1104 shown in FIG. 11 disappear, and instead, a field 1201 in which a keyword for search of a reference item can be input and a field 1202 in which a plurality of reference item candidates are to be displayed are displayed, as shown in FIG. 12.

Figure 13:
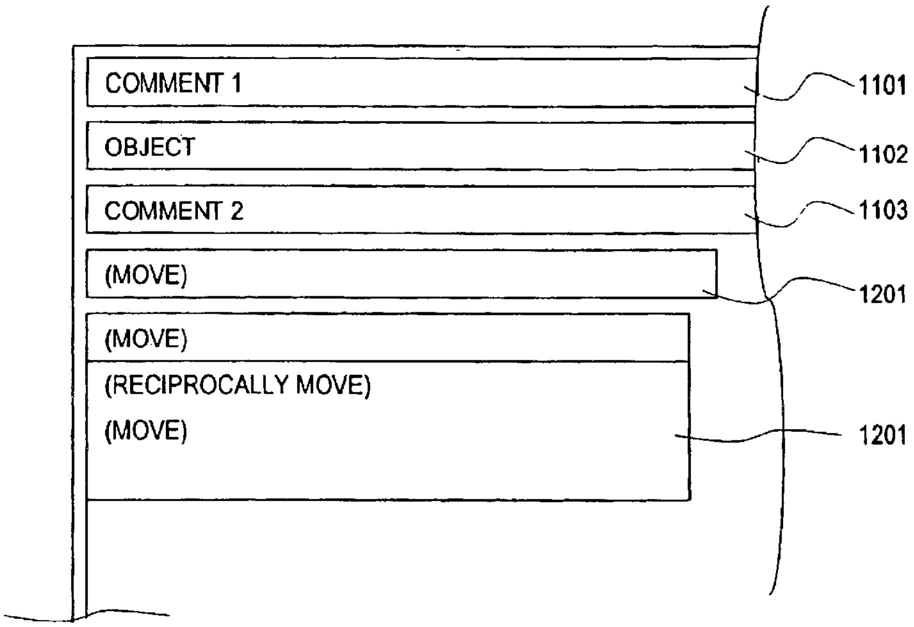
FIG. 13 is a view for explaining the reference input function in inputting "verb" in the work procedure.

For example, as shown in FIG. 13, assume that the input to the "comment 1" field 1101, "object" field 1102, and "comment 2" field 1103 is ended, and data "≦せる (IDOUSASERU: move)" is to be input to the "verb" field 1104 next. In this case, the user selects the "verb" field 1104 in the input window shown in FIG. 11 and double-clicks on "00*" in the field 1105*a*. Then, the window changes to that shown in FIG. 13.

The user does not know the standard verb for the operation "移動させる (IDOUSASERU: move)" but knows that at least the character "動 (DOU: move)" must be used. Referring to FIG. 13, the user inputs "動 (DOU: move)" to the field 1201. The system searches the "verb" master database file 100 for all verb data having the character "動 (DOU: move)". In the example shown in FIG. 13, verbs "移動させる (IDOUSASERU: move)", "往復動作させる (OUFUKUDOUSASASERU: reciprocally move), and "動かす (UGOKASU: move)

are stored in the database 100. These words are searched for the displayed in the field 1202. The user selects "移動させる (IDOUSASERU: move)" in the field 1201 through this window. When "移動させる (IDOUSASERU: move)" is selected in the window shown in FIG. 13, and then, the ENTER key of the keyboard is pressed, the window returns to the window shown in FIG. 11, where "移動させる (IDOUSASERU: move)" is displayed in the field 1104.

Figure 14:
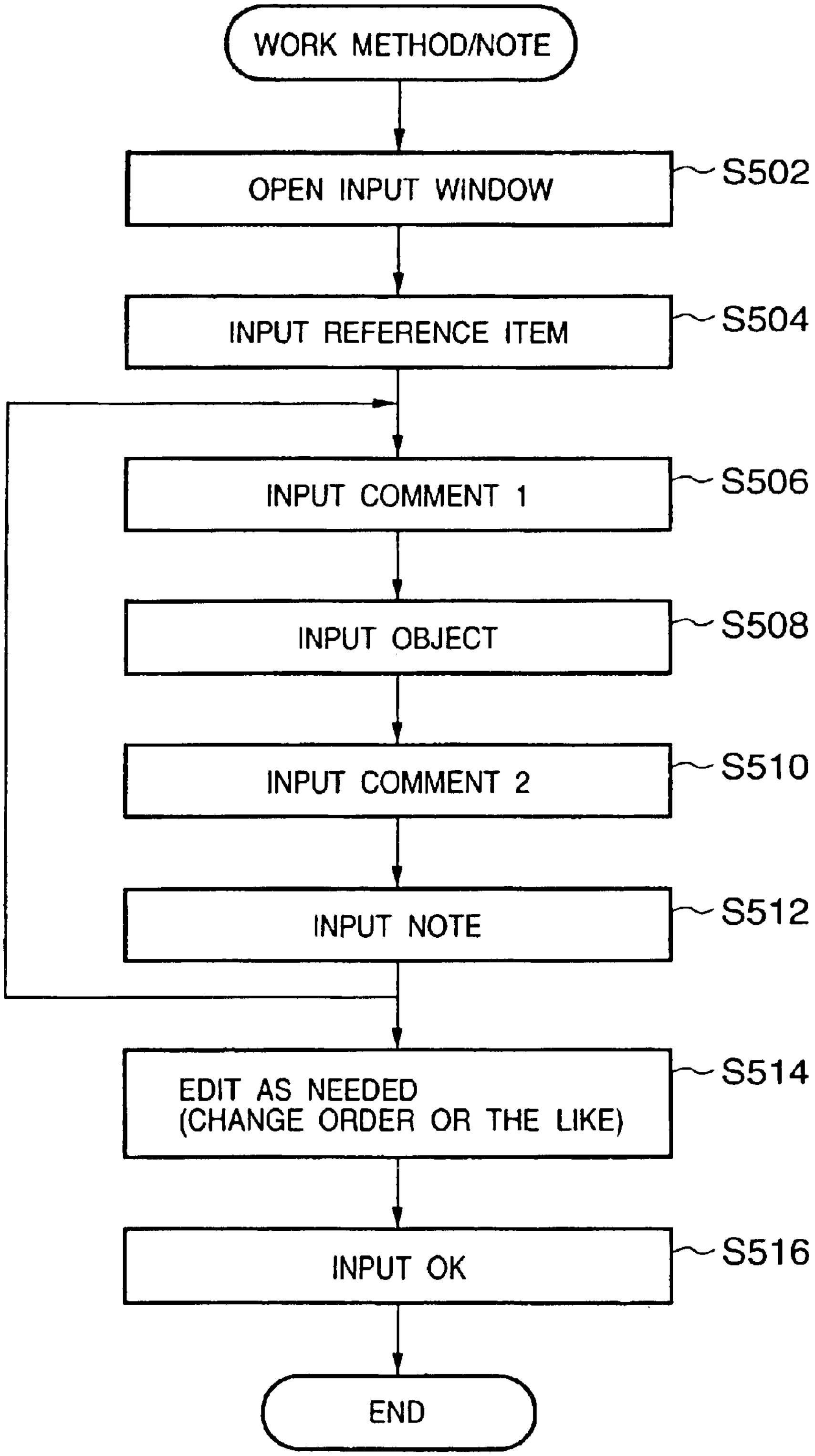
FIG. 14 is a flow chart showing the control procedure in inputting data on the basis of the work procedure input window shown in FIG. 11.

The reference input is used for the input to all the fields 1101 to 1104 (steps S506 to S512 in FIG. 14).

A plurality of work standards are displayed in the field 1105 except the field 1105*a*. FIG. 15 shows that four work standards (procedures 01 to 04) are input.

Figure 16:
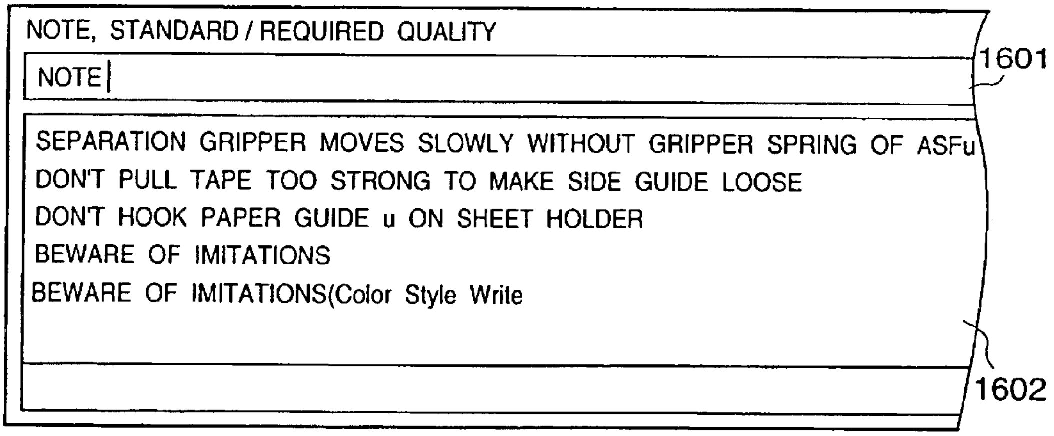
FIG. 16 is an explanatory view of the reference input function in inputting a note.

Each of the work standards can be assigned a note, as shown in FIG. 16.

Figure 17:
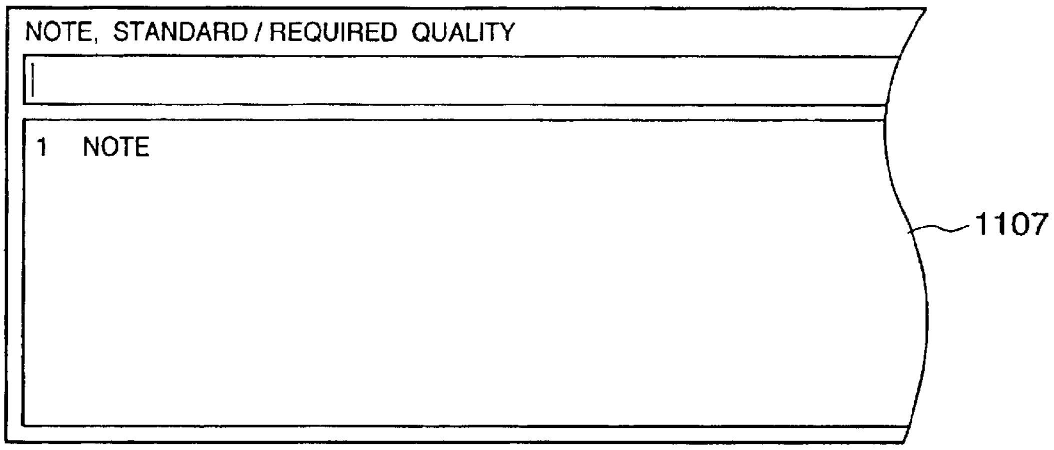
FIG. 17 is an explanatory view of the reference input function in inputting a note.

A note is input to a field 1106. The reference input function can also be used for the input of a note. More specifically, when the user wants to add a note to the already defined work standard 01 (displayed in the field 1105*b*), the user selects the field 1105*b* using the mouse and then selects the field 1106 using the mouse. If the user individually requires the reference input, the user double-clicks on "00*" in the field 1105*a*. Then, a field 1107 changes to a keyword input field 1601 and reference item display field 1602, as shown in FIG. 16. For example, when the user wants to refer to a note including a word "注意 (CHUI: note)", the user inputs "注意 (CHUI: note)" to the field 1601. The work standard creation system 2800 searches the note database 50 (FIG. 4) and displays all notes including "注意 (CHUI: note) " in the field 1602, as shown in FIG. 16. When the user selects a desired note using the mouse and presses the ENTER key, the note is displayed in the field 1107, as shown in FIG. 17.

In this system, an input data editing function is prepared as processing in step S514 (FIG. 14).

In this editing function, to individually change a character in data representing work contents, the number of the work standard to be changed is selected in the field 1107, and the work standard is double-clicked. Then, the data of "comment 1", "object", "comment 2", and "verb" assigned to the procedure are displayed in the fields 1101 to 1104, respectively, and a note corresponding to the procedure is displayed in the field 1106. The user individually corrects the data in each field.

A method of editing one unit of the work standard will be described next with reference to FIG. 18. Editing each unit of the work standard means an-operation of deleting one work standard, an operation of setting the same work standard to another sequential position, or an operation of setting (inserting) a "free" work standard between two arbitrary work standards adjacent to each other.

Figure 18:
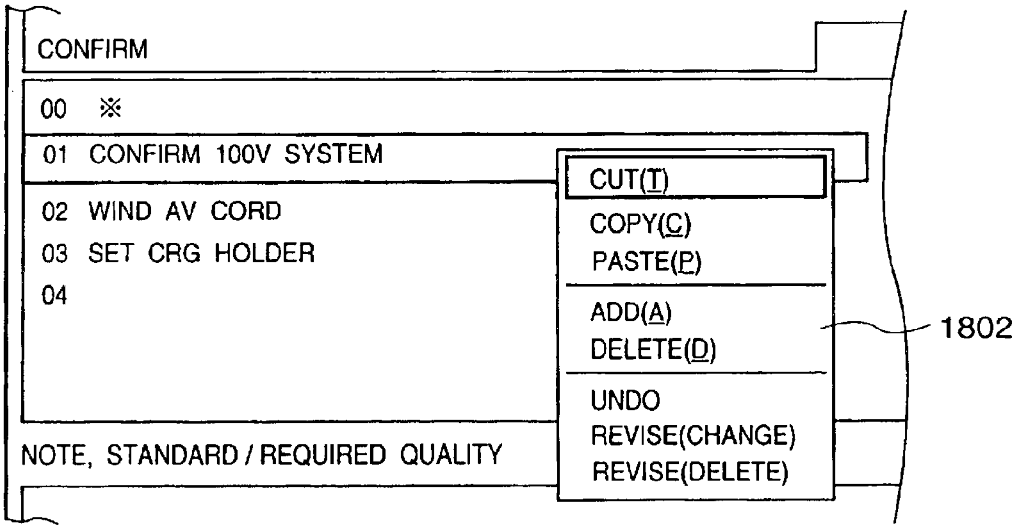
FIG. 18 is an explanatory view of various menus for editing the work procedure itself.

A menu 1802 shown in FIG. 18 is opened, for example, when the right mouse button of the client is clicked.

In this menu 1802, editing functions including cut, copy, paste, add, delete, and undo, revise (change), revise (delete)

are set.

To "delete" a work standard, the target work standard is selected, and the "delete" menu is selected. To copy the contents of a work standard, the "copy" menu is selected. To paste work standard data copied in the work memory to a desired sequential position, the sequential position is selected, and the "paste" menu is selected. With this "paste" operation, the contents of the work standard at the paste position are popped down.

To set a free work standard to the position of sequence 01, procedure 01 is selected in FIG. 18, and the "add" menu is selected. In the example shown in FIG. 18, work standards 01 to 03 sequentially move to procedure positions 02 to 04, and a free procedure is set to procedure position 01.

These various editing functions for "work", which are prepared in the work standard creation system 2800, are commonly used as editing functions in the standard manhour setting system 2801 or work assignment system 2802 to be described later. The mouse operation for these editing functions is also common. The operation is simplified by this common scheme.

Figure 19:
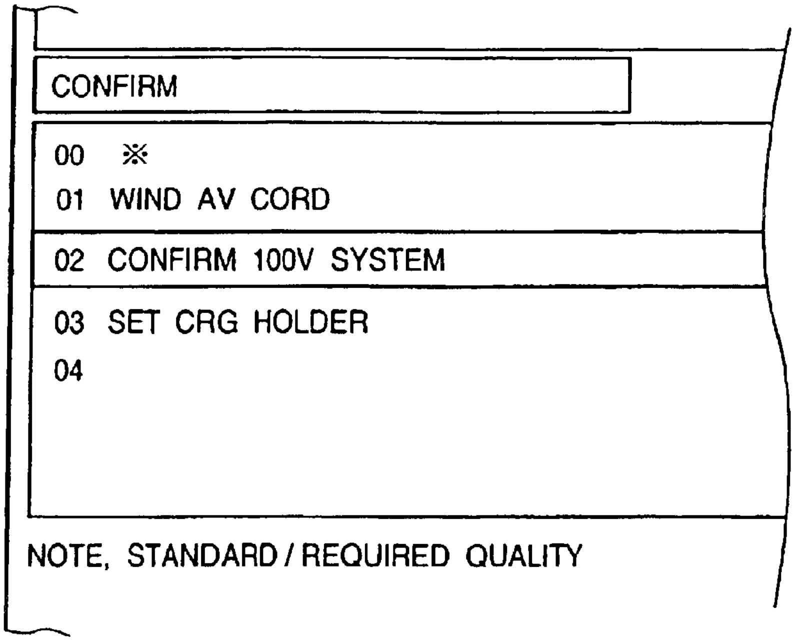
FIG. 19 is a view for explaining operation of exchanging two work procedures.
Figure 20:
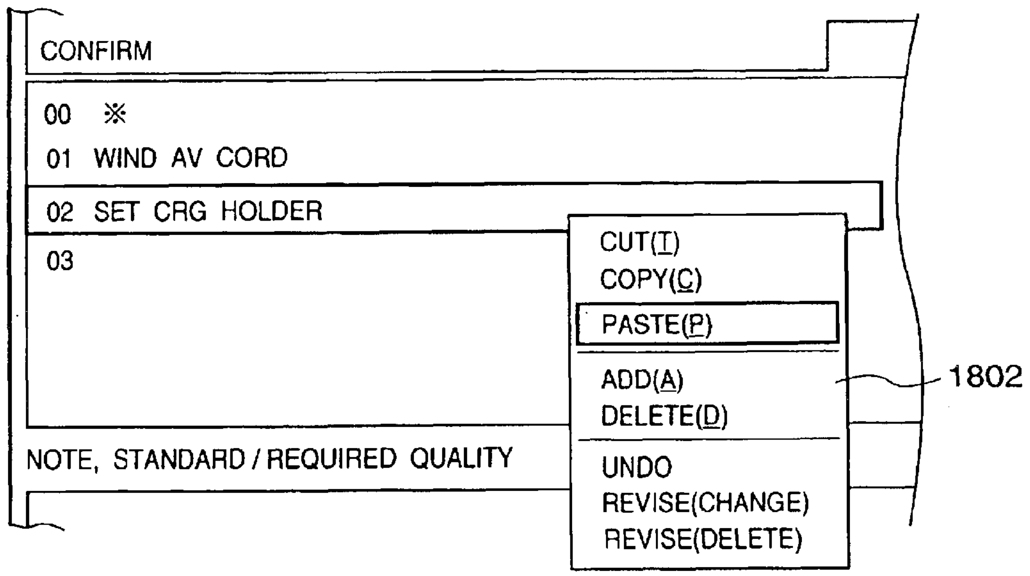
FIG. 20 is a view for explaining operation of exchanging two work procedures.

A function of changing the order of a plurality of already input work standards will be described with reference to FIGS. 18 to 20.

Assume that three procedures or works:

01: confirm 100V system

02: wind AV cord

03: set CRG holder are currently set as work standards, as shown in FIG. 18, and the user wants to exchange procedure 01 with procedure 02. In this case, the user selects procedure 01 and selects the "cut" menu. With the series of operations, the contents of procedure 01 are saved in the work memory, and the contents of procedures 02 and 03 are sequentially shifted to procedures 01 and 02, as shown in FIG. 20. Next, the operator selects the procedure to be exchanged (procedure 02 in the example shown in FIG. 20) and selects the "paste" menu. As shown in FIG. 19, the contents of all procedures from procedure position 02 are sequentially popped down to the lower procedures, and simultaneously, the contents of original procedure 01, which are saved in the work memory, are pasted to procedure position 02.

With the above operation, the input or editing in steps S502 to S514 in FIG. 14 is ended. The user presses an OK button 1108 to indicate that the input of work method is ended.

When the OK button 1108 is pressed, the window returns to the window shown in FIG. 3. In the window shown in FIG. 3, especially, the plurality of set work standards would be displayed in the field 310, and the note would be displayed in the field 313.

The user gives a "work name" as a standard work to the plurality of work standards set in the field 310. That is, the user inputs the work name to the field 312.

Figure 21:
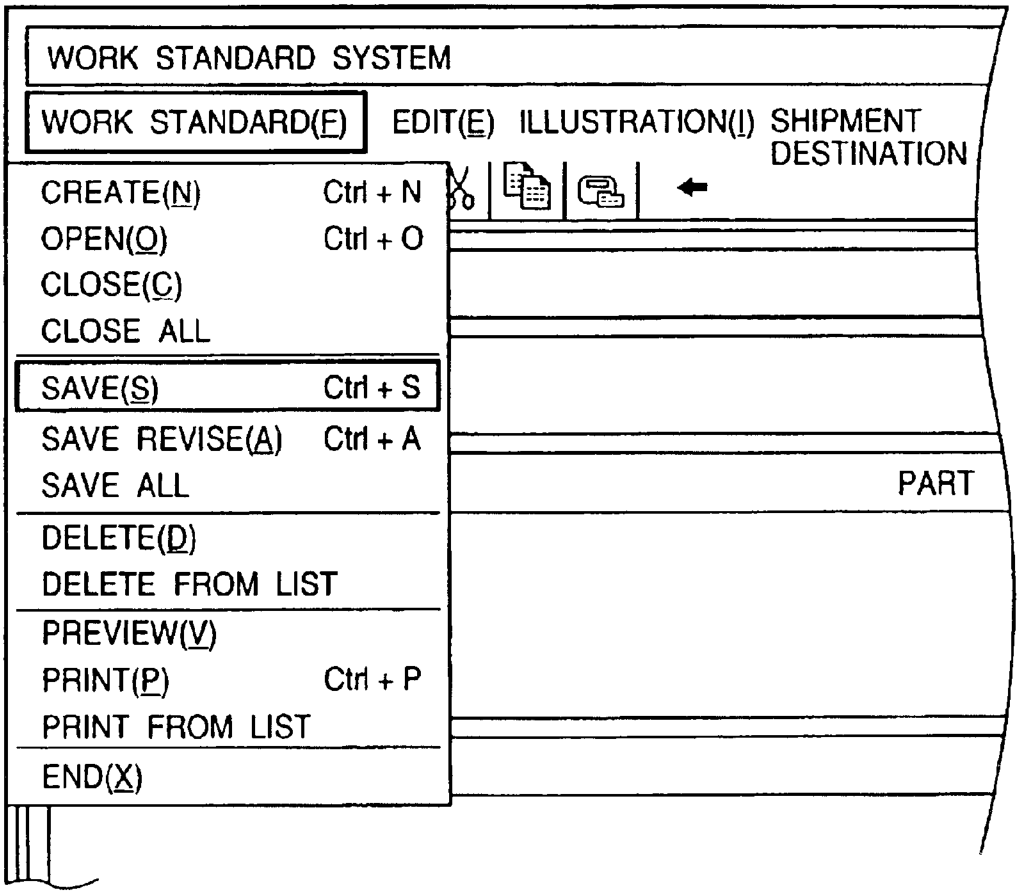
FIG. 21 is an explanatory view of a menu for storing a created work.

When setting of one standard work is ended, the user selects "save" in the menu shown in FIG. 21.

<Editing of Work Contents> . . . Work Standard Creation System 2800

Figure 23:
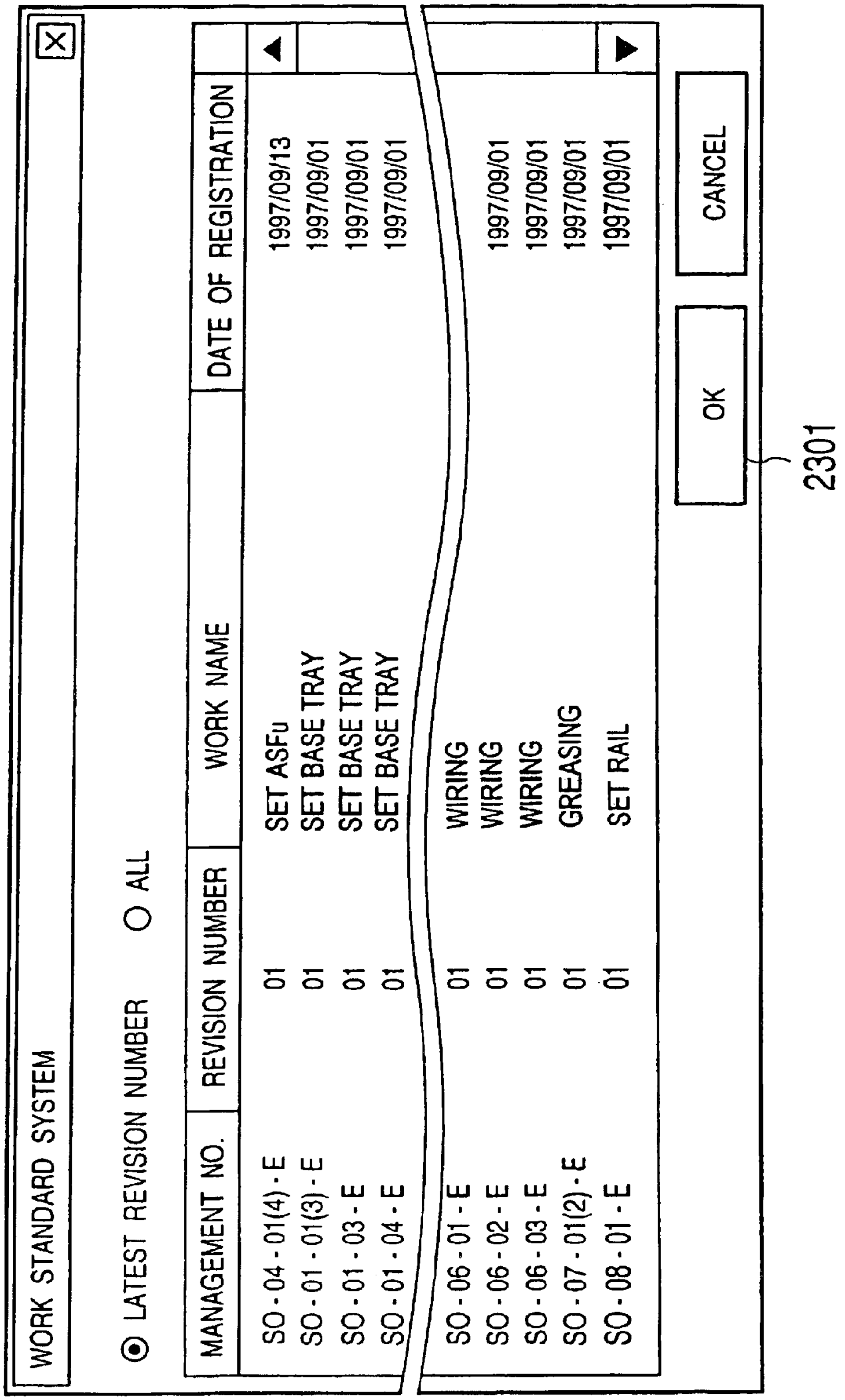
FIG. 23 is a view for explaining a plurality of works opened by the menu shown in FIG. 22.

To edit work contents, "open" in the "work standard" menu is selected (FIG. 22), and the work standard to be edited is selected using the mouse (FIG. 23). When an OK icon 2301 is clicked, the selected work is displayed (e.g., as shown in FIG. 3). Editing is done through almost the same window as in the input.

<Input of Graphic Data> . . . Work Standard Creation System 2800

The assembly information management system can display a process set by the work assignment system 2802 at the site of work (client side). For example, when window display shown in FIG. 3 is done at the site of work, the operator can see the display and confirm the work contents, notes, tools, and parts at a glance. In this system, an image can be attached to each work standard in addition to the above character information for the work.

Figure 24:
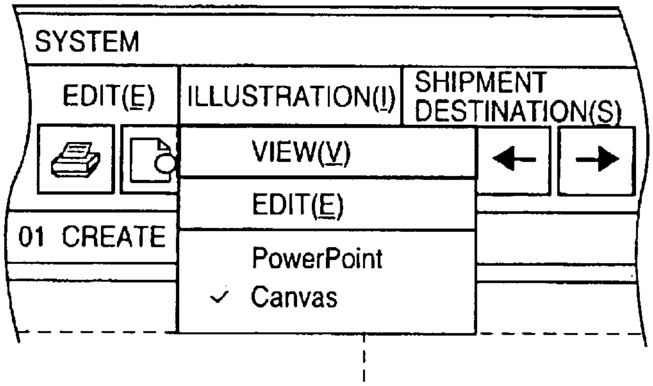
FIG. 24 is a view for explaining a menu window for executing an image editing function.

FIG. 24 shows a window for inputting graphic data. This window is displayed when the user selects the "illustration" menu (menu on the right side of the "edit" menu") in executing the application program of the work standard creation system 2800, and a graphic pattern displayed in accordance with the selection operation can be edited. The image file to be edited is created in advance by a presentation application program PowerPoint (available from Microsoft) or Canvas and stored as a graphic file 120.

Figure 25:
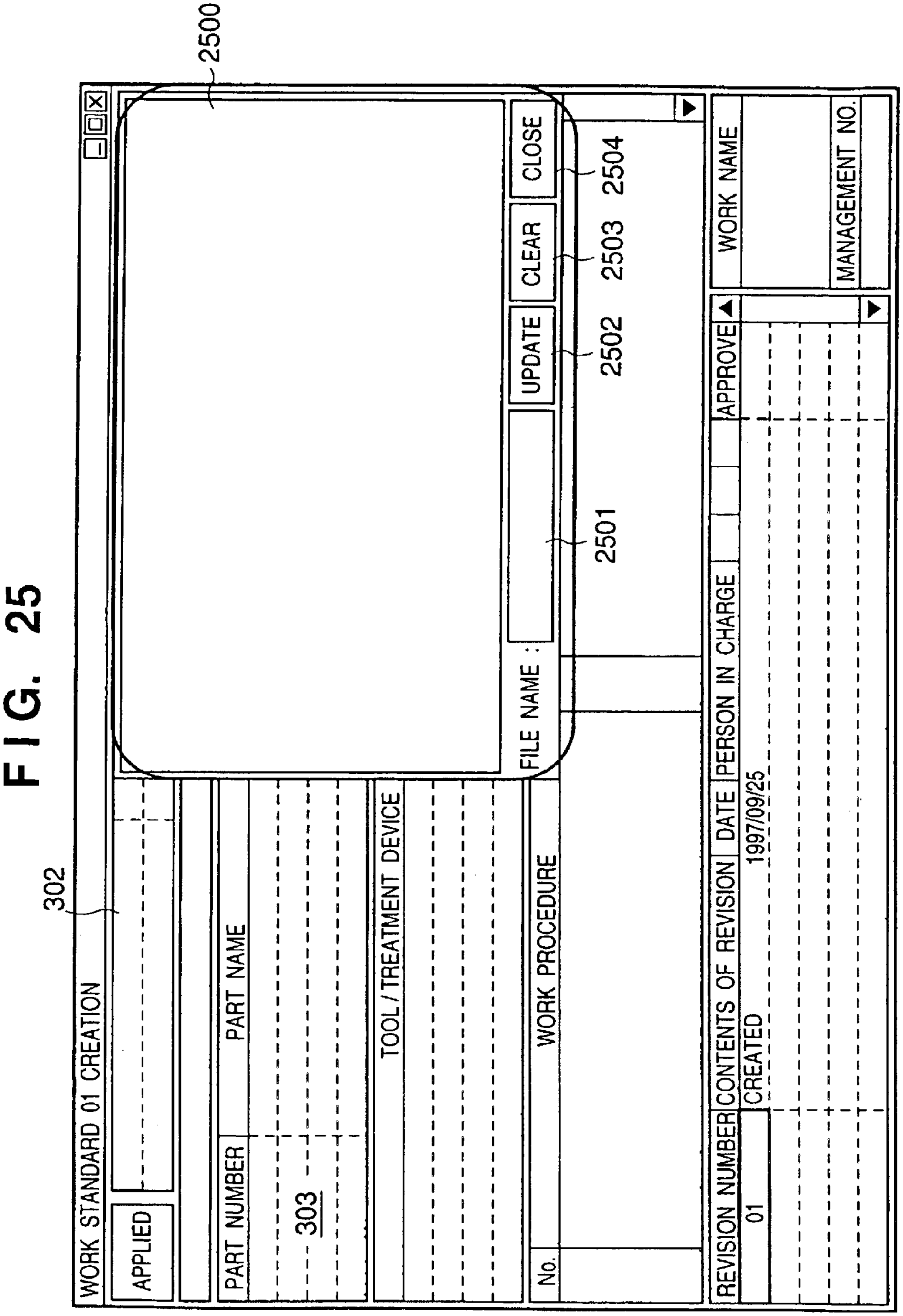
FIG. 25 is a view for explaining an input field to which an image to be attached is to be loaded.

When the user selects the "display" submenu in the "illustration" menu, an illustration display column 2500 (FIG. 25) is displayed. The user inputs the name of a file to be attached to a "file name" field 2501 in the display column 2500. In accordance with the input, the system searches for the file whose name is input to the "file name" field 2501 and displays it in the column 2500. In the example shown in FIG. 26, an image file "so-09.wmf" is displayed at a position corresponding to the illustration display column 2500 shown in FIG. 25 as the result of user's file name input operation.

Figure 26:
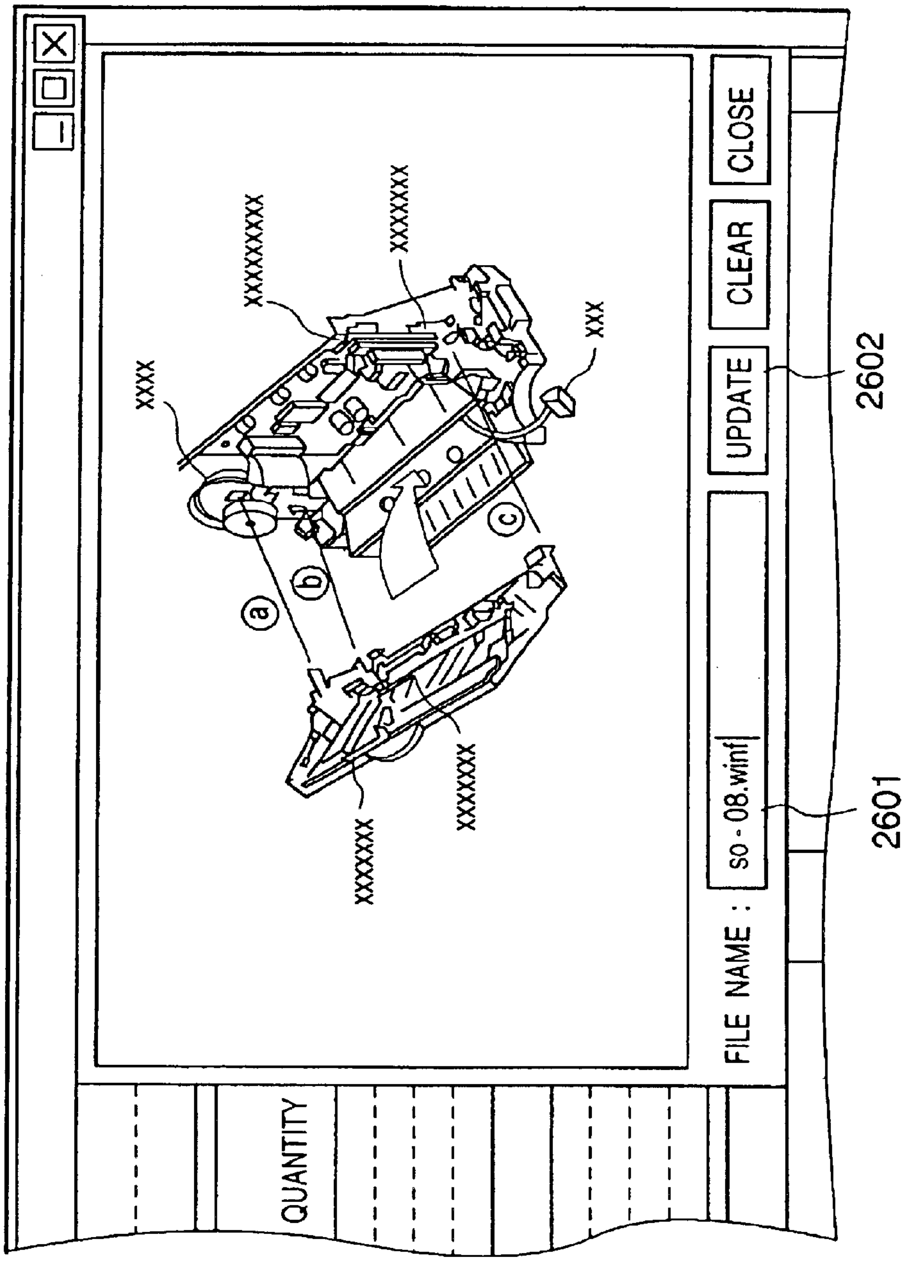
FIG. 26 is a view showing an image attached to the work standard data.
Figure 27:
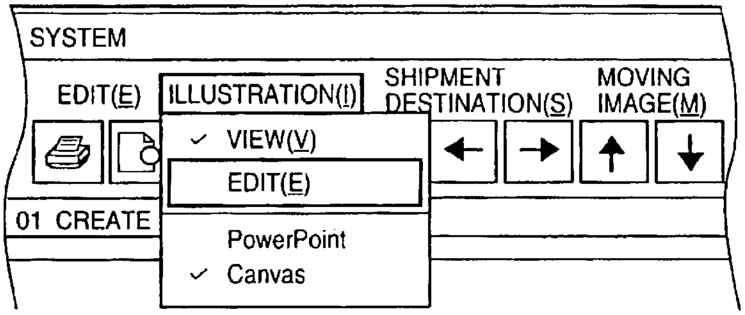
FIG. 27 is a view showing a menu window for selecting a tool to edit an image.

To edit the image, the authoring tool for editing is selected, and then, the "edit" menu is clicked, as shown in FIG. 27. After the end of editing, the update result can be saved by clicking on an "update" icon 2602 (FIG. 26).

In the above example, the image is a still image in the BMP format. However, it may be a moving image compressed by MPEG.

A so-called animation image may be stored in the graphic file 120 (FIG. 4). In this case, each animation image is stored with predetermined parameters unique to the operation of the image.

In assigning parameters unique to an operation to the operation in advance, if operations are, e.g.,"screw", "rotate", and "open", for example, pieces of parameter information:

operation: screw→parameter values: direction of screwing, moving distance, torque amount, . . .

operation: rotate→parameter values: direction of rotation, moving distance, . . .

operation: open→parameter values: direction of opening, moving distance, weight, . . .

are registered.

An image with such parameters is registered in the graphic file 120 by combining the directory name, operation (verb) name, and parameters for each animation image, as shown in FIG. 89.

When the graphic file 120 stored in the state as shown in FIG. 89 is present, and in this state, a work standard is defined in the window shown in FIG. 11, the value of a parameter to be set for the work standard is written in the "comment 1" or "comment 2" field in units of operations of the work standard. The system compares each operation with each of the verbs and the parameter value in the comment with each of the parameter values registered in the graphic file and assigns the directory of an animation image having matching operation and parameter to the work standard. The directory name of the assigned animation image is displayed in a field 2601.

Figure 90:
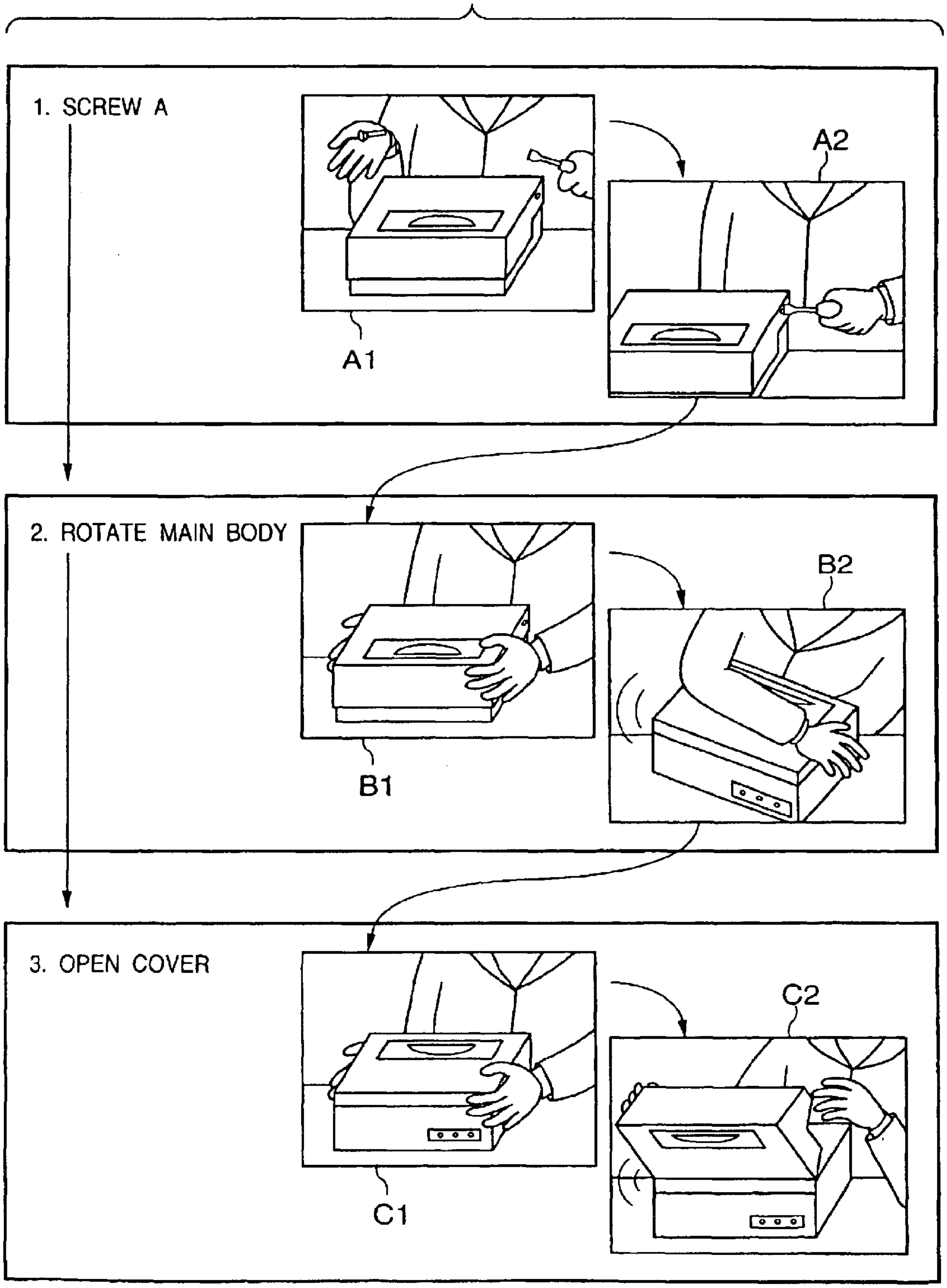
FIG. 90 is a view showing images (images representing a continuous operation) continuously generated by designating parameters in accordance with the method shown in FIG. 89.

FIG. 90 shows an example in which three work standards:

screw A.

rotate main body, and open cover are defined for a product. In this example, two continuous still images (animation images) are assigned to each operation. In other words, when the parameters of the respective operations are assigned to the three work standards, a series of images A1→A2→B1→B2→C1→C2 are continuously displayed, so a work instruction easy to understand can be easily created. In addition, only by designating an operation name and parameter, an animation image corresponding to the work parameter can be designated.

When an animation image is employed, no photorealistic image need be prepared, so work standard data can be created at the initial preparation stage before the start of operation of the factory. For creation of work standard data at the initial stage, automatic image data designation using parameters is preferable.

<Translation> . . . Translation System

Assembly work is not always done only in Japan. This system for standardizing assembly work expects operation not only in Japan but also in many foreign factories (for example, factories in the English-speaking zone and Thai-speaking zone). For this purpose, the work standard creation system 2800 has a translation system 2803.

As shown in FIG. 28, the translation system 2803 downloads master data created by the work standard creation system 2800 from the work standard creation system 2800, and after translation, uploads the translated master data to the work standard creation system 2800, as shown in FIG. 28.

Figure 29:
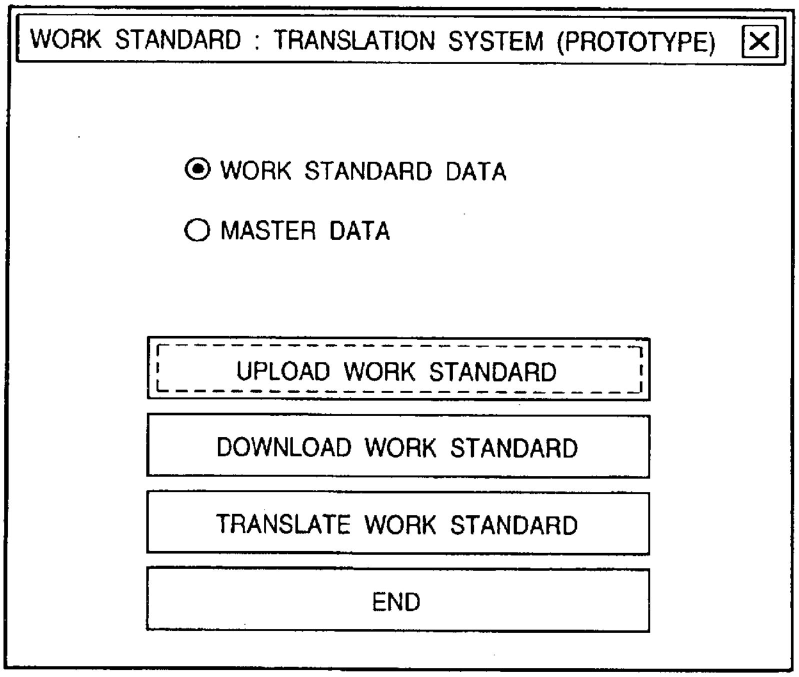
FIG. 29 is a view for explaining a start menu for starting translation.

The menu of the translation system 2803 includes "upload" for uploading work standard data to the master file, "work standard download" for downloading work standard data from the master file, and "work standard translation" for starting translation, as shown in FIG. 29. Icons for switching the translation target between work standard and master data are also prepared.

Figure 30:
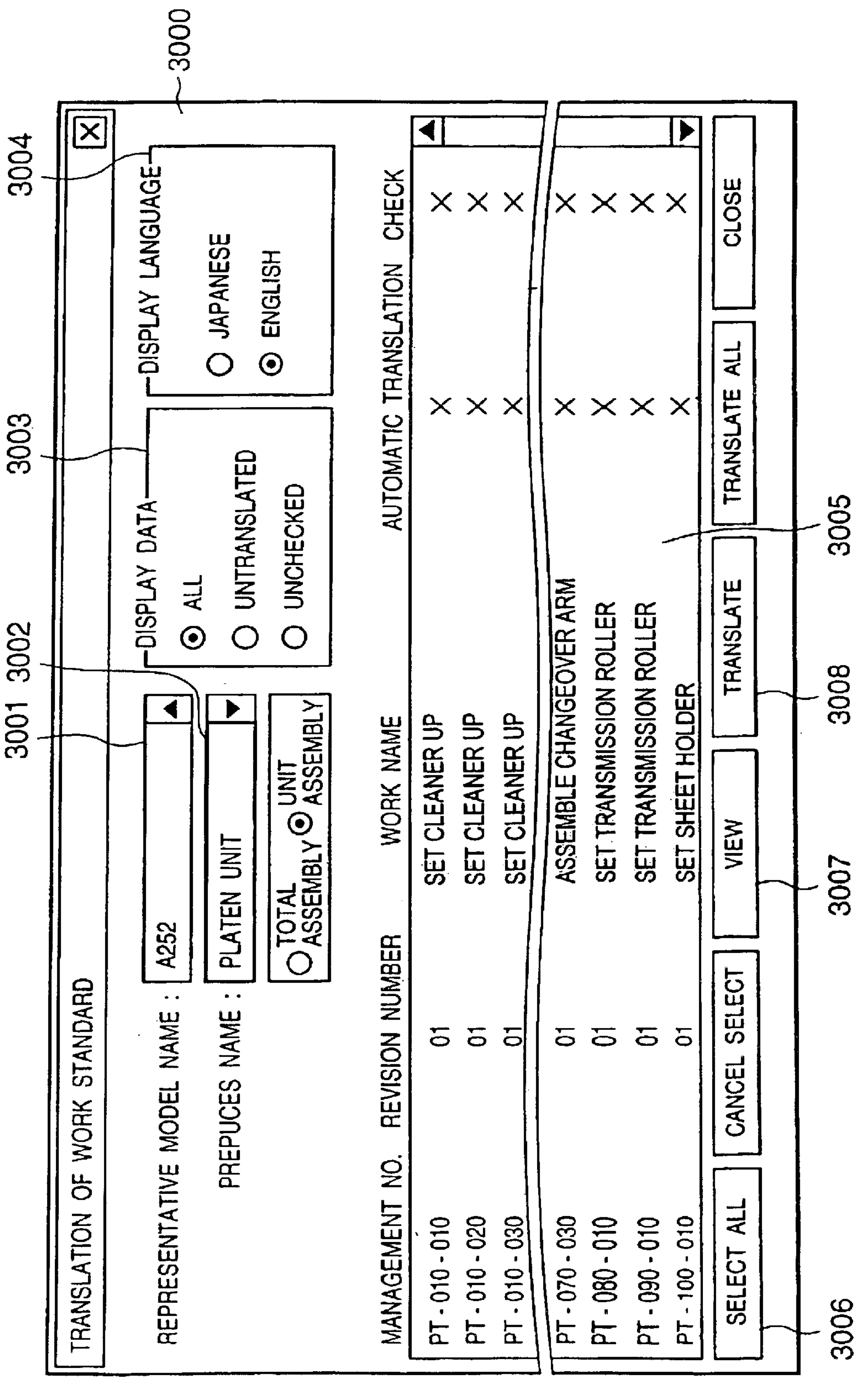
FIG. 30 is a view showing a window for selecting a work standard to be translated.

For example, when work standard data is selected as a translation target, a window 3000 as shown in FIG. 30 is displayed to prompt the user to input a "representative model name" (3001) and "process name" (3002).

With a check box 3003, display of the entire text, display of only an untranslated portion, or display of only an error portion of translation is selected as the range of the display target. With a check box 3004, the translation language can be selected. When the user clicks on a "display" icon button 3007, the names of all works having the model name input to the "representative model name" field 3001 and the process name input to the "process name" field 3002 are displayed in a display area 3005.

If the user wants to translate all works in this display state, he/she clicks on a "select all" button 3006 to select all works. If the user wants to translate some works, he/she selects the names of works to be translated in the area 3005 using the mouse or the like and clicks on a "translate" button 3008. In accordance with clicking by the user, translation starts. When translation by the translation system 2803 is ended, "x" in the "auto-translation" column on the right side of the translated work name in the area 3005 changes to "○".

For work names (field 312 in FIG. 3), part names (field 304), tools and the like (field 306), and notes and the like (field 313) of text data registered in the master data file, the translation system 2803 converts the Japanese to the English using a dictionary. Since this is conversion from words to words, a dictionary (table) is preferably used. Especially, since this work standard creation system 2800 uses the incremental search in inputting data, standard terms are used, and arbitrary word selection is eliminated, as described above. For this reason, the conversion accuracy improves.

However, the work procedure (field 310) is manually input by the user. This is because the language structure of the Japanese is largely different from that of the English, and data (especially comment 1 and comment 2) constructing the work standard with high arbitrariness (i.e., close to a natural language) is unsuitable to conversion using a table.

To prevent a bulky system configuration, the translation system 2803 does not employ a translation method using language analysis (semantic analysis). A reason for this is as follows. In work management, many natural language texts are not always input. Translation is necessary only on a limited occasion when a work is to be newly defined, or work contents are to be changed, so machine translation that is expensive and time-consuming for maintenance is inappropriate. Between European languages (e.g., English and German) having relatively similar language structures, machine translation is appropriate even for the contents of work standards.

Another reason why the advanced machine translation is not employed between, e.g., Japanese and English is the problem of operating system. That is, there is currently no operating system depending on two languages. For example, the WINDOWS of Japanese version and WINDOWS of English version do not simultaneously run for the work standard creation system 2800.

In addition, currently, a work standard is created using one language (e.g., on the Japanese side), and only software that runs on the WINDOWS (or WINDOWS NT) of Japanese version has the function of converting the Japanese text to English. In other words, converting various terms (text data) created by the work management system to the language of another country depends on the function of the language of the operating system based on the official language of that country. For this reason, conversion using a table is most reliable for easy translation to the language of that country.

As described above, this translation system uses word conversion using a table (table dictionary) for a word in a work standard. Additionally, if the table dictionary also stores a converted word for a phrase longer than a word, the phrase is replaced with the converted word. In principle, a word in a work standard, which cannot be completely translated even using the table dictionary, is manually corrected.

To confirm the translation result for a work, the name of the work is selected in the display area 3005, and the "display" button 3007 is clicked. Then, a window as shown in FIG. 31 is displayed. Whether the translation has been appropriate is determined by checking the translation result. To verify the adaptability between a specific English word and a corresponding Japanese (adaptability of translation result), the word portion is double-clicked to display a correction window 3200 as shown in FIG. 32.

All work standards of the work with this work name are displayed in Japanese in an area 3202. English work standards corresponding to these Japanese work standards are displayed in an area 3204. In the example shown in FIG. 32, work standard 01 is selected. This selected work standard 01 is displayed in Japanese in an area 3201, and an English equivalent of procedure 01 is displayed in an area 3203. The English text is corrected in the area 3202.

<Voice Input> . . . Translation System

Data input in the work standard creation system 2800 and, more particularly, translation of work standards into the language of another country is done by word conversion and manual input. Manually inputting a translated text requires the user to have both an ability of translation and an ability of high-speed input using the keyboard. Since it may be difficult to ensure an operator who has both the abilities in that country, the translation operation and input operation are separated. That is, a translation result is recorded by voice input, and the data is input in playing back the recorded voice.

Figure 33:
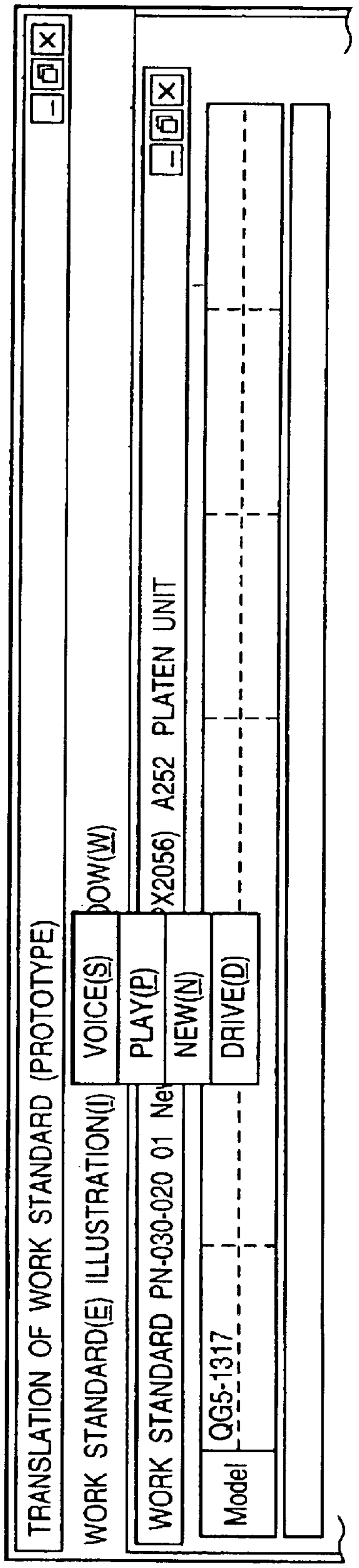
FIG. 33 is a view for explaining a menu window for activating playback of voice data attached to the work standard.
Figure 34:
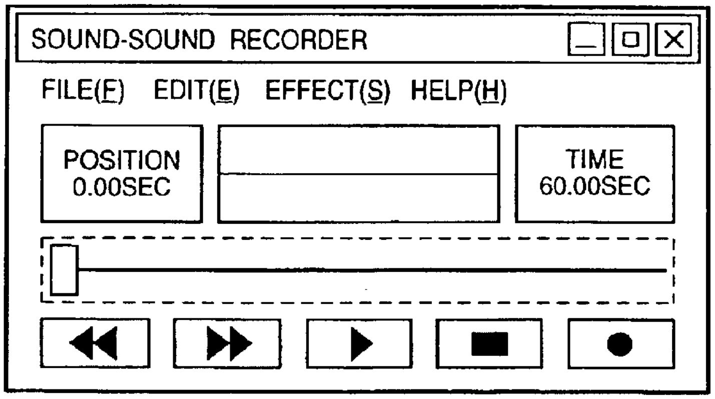
FIG. 34 is a view for explaining a menu window for activating voice data recording.

To input (record) voice, a work standard to which input voice is to be attached is selected, and the "new" menu in the voice menu (FIG. 33) of the translation system application program is selected, thereby displaying a window shown in FIG. 34 overlapping the window shown in FIG. 31. When the recording button (●) in the window shown in FIG. 34 is clicked, recording starts. The voice sampling rate and the like are set in advance. To end recording, the ■ button is clicked. To save the recorded voice, "save" in the "work standard" menu is selected.

Figure 35:
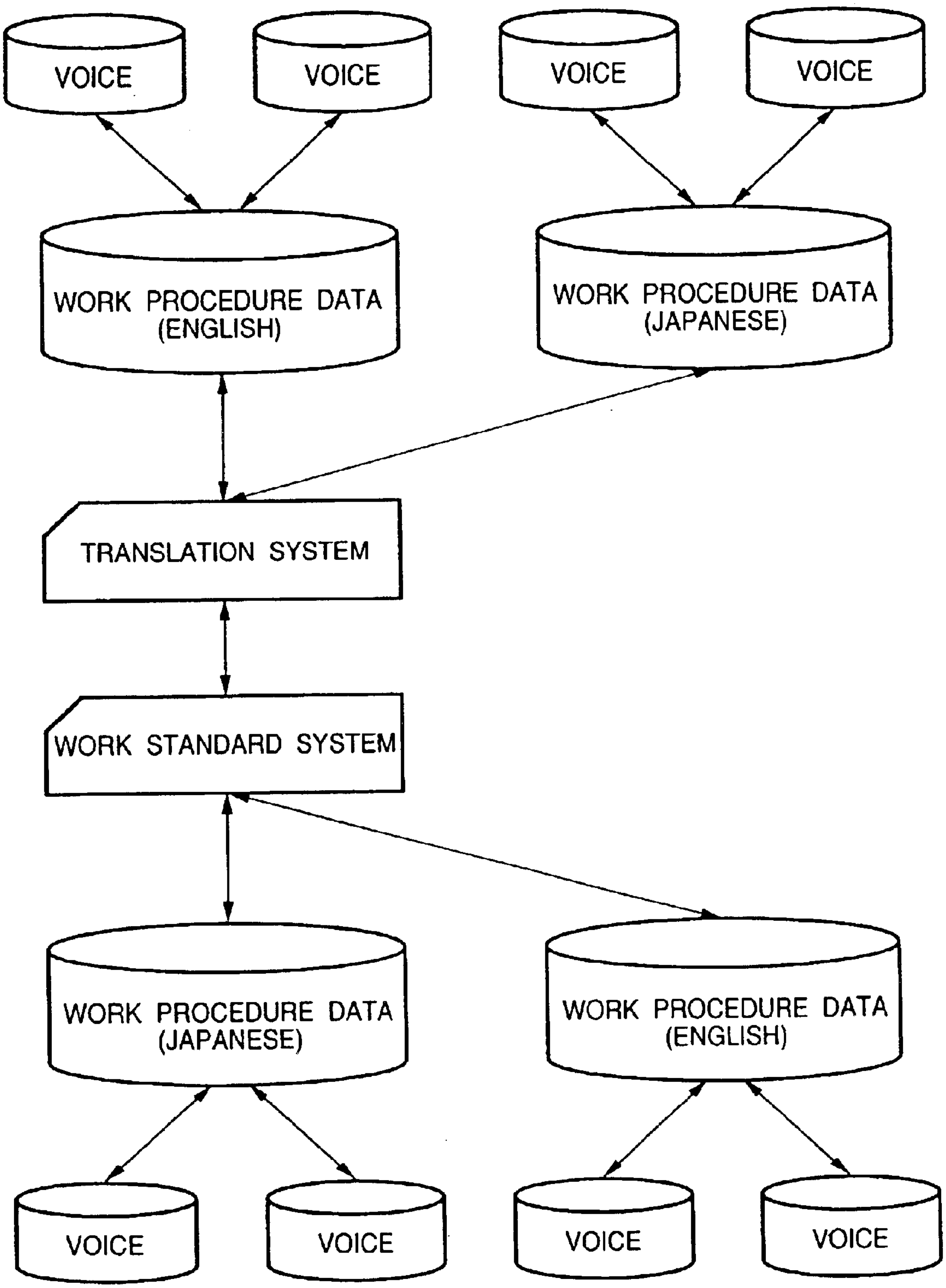
FIG. 35 is a view showing the storage positions of files in a work standard creation system 2800 and translation system 2803.

FIG. 35 shows the storage positions of files saved in the work standard creation system 2800 and translation system 2803.

Both the work standard creation system 2800 and translation system 2803 can process not only voice and image files but also, e.g., MOVIE files by QUICKTIME.

In the work standard creation system 2800, a plurality of files temporarily registered, as shown in FIG. 35, can reproduced together (including voice and images). For example, when one or a plurality of work standards are selected in the window shown in FIG. 23, and display in the "illustration" menu or "playback" in the voice menu is selected, the images/voices of the work standards are displayed/played back in the defined order.

The voice and image are preferably synchronized. A QUICKTIME file or MOVIE file can easily synchronize voice and image. The work standard creation system 2800 also proposes to superpose CG data of an arrow or the like on still image data. During voice playback of a work, the arrow can visually indicate the operator in detail which work portion is being mentioned.

The work assignment system 2802 to be described later composes the work standard data created by the work standard creation system 2800, thereby assigning each work to a desired workshop. The result is reflected to a composition table file 6400 to be described later. The composition table file 6400 is uploaded to the work standard creation system 2800.

More specifically, the work standard creation system 2800 can input works in the composition order corresponding to actual assembly workshops from the work assignment system 2802 and open the works. The uploaded file has voice data and image data attached by the work standard creation system 2800. When the voice/image playback function of the work standard creation system 2800 is exploited at the actual site of assembly, the work contents can be instructed to the operator in detail by voice and image.

<Effect of Work Standard Creation System 2800>

According to the work standard creation system 2800 of the above-described embodiment, the following effects can be obtained.

AD-1: The work standard creation system 2800 describes a work related to a work standard by an operation phrase representing an operation of the work, an object phrase representing the target of the operation, and a comment phrase representing auxiliary information related to the operation or object. Hence, all work standards are standardized by the elements including the operation, object, and comment phrases.

AD-2: The work standard creation system 2800 is preferably built under a client/server computer system. When a common memory (or disk) connected to the subsystems to store or read out work standards is prepared, a client/server distribution system for assembly information management is provided.

AD-3: In this embodiment, the translation system 2803 can translate the operation, object, and comment phrases in each record of the standard manhour database into a predetermined language such that the system can operate in a country with a different language.

AD-4: For translation by the translation system 2803, a translation method using matching to a dictionary is employed in consideration of easiness.

AD-5: Image data or voice data can be attached to a work standard.

AD-6: Since not only a photorealistic image but also CG data or animation image can be used as image data, work standard data can be created at the initial stage quite before the actual operation of the factory.

<Standard Manhour Setting System 2801>

The standard manhour setting system 2801 is a system for determining the standard manhour of a desired work and is connected to the work standard creation system 2800. More specifically, as shown in FIG. 28, the standard manhour setting system 2801 and work standard creation system 2800 share master data and the like. Determination of the standard manhour by the standard manhour setting system 2801 is preferably done in the form of so-called batch processing. Hence, after master data including work standard data as the determination target is downloaded to the standard manhour setting system 2801, the standard manhour setting system 2801 determines the standard manhour.

The above-described work standard creation system 2800 does not input manhour data. The work standard creation system 2800 does not give a manhour value to a standard work because, in the standard work created by the work standard creation system 2800, the manhour value given to each work must not vary depending on the person or day. The idea is that the manhour value is determined by the user who will compose works at the time of composition. To standardize the manhour value, the standard manhour setting system 2801 uses standard data as basic manhour data.

Figure 36:
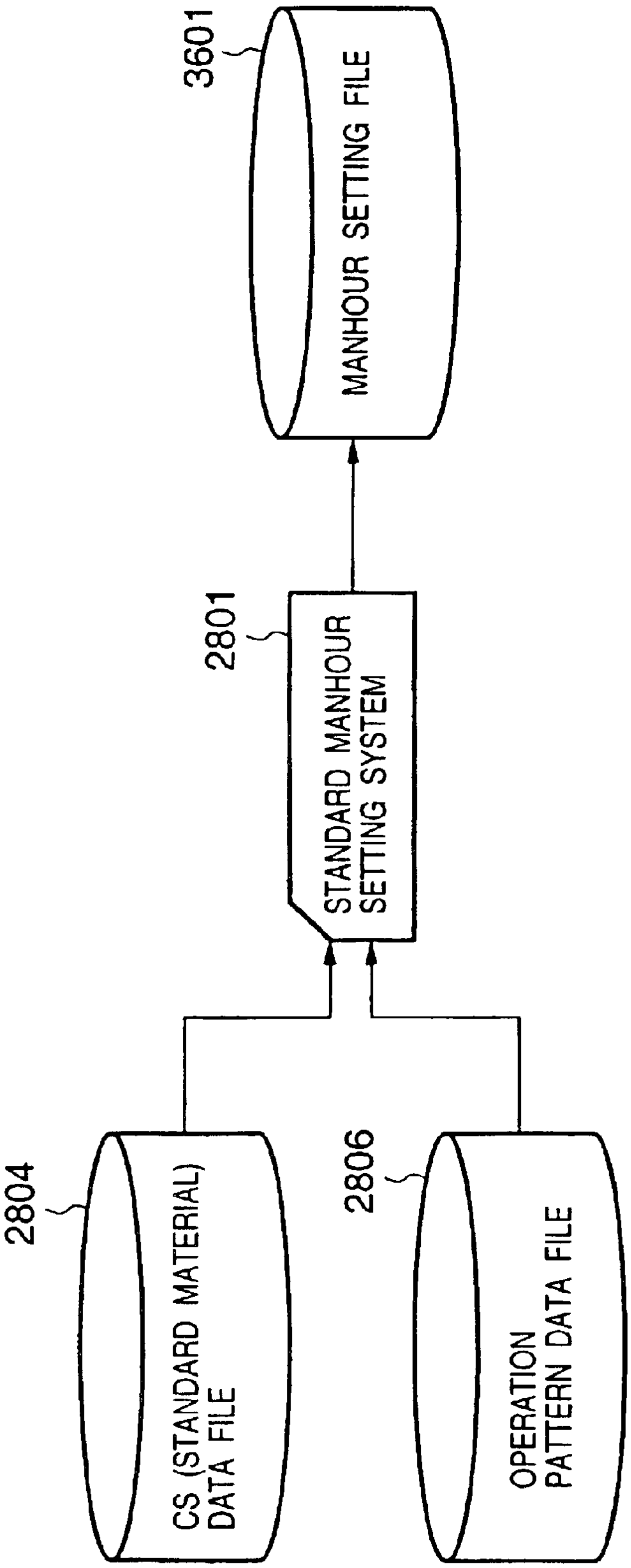
FIG. 36 is a view for explaining the file structure of a standard manhour setting system 2801 of the embodiment in the form of blocks.

As shown in FIG. 28 or 36, the standard manhour setting system 2801 outputs a manhour setting file 3601 using, as reference files, a standard data (to be referred to as CS (C. Standard data) hereinafter) file 2804 and operation pattern data file 2806.

FIG. 37 shows the data structure of the manhour setting file 3601. The manhour setting file 3601 shown in FIG. 37 has records in units of element works and has the names of the element works, the frequencies of the element works, the manhours of the element works (unit: RU), the values of “CS”, and the values of “set conditions”. More specifically, the value of the directory of a data file containing the contents of a set condition given to the work is stored in the “set condition” field. The value of the root directory of the set condition data file is stored in the “CS” field.

FIG. 38 shows the data structure of the standard data file 2804. Each record of the standard data file 2804 is called a standard material. As shown in FIG. 38, each record of the standard data file 2804 has a “comment 1” field, “object” field, “comment 2” field, “verb” field, and “set condition” field. The “comment 1”, “object”, “comment 2”, and “verb” fields in the standard data file 2804 are the same as those in the work standard creation system 2800. Set condition data will be described later.

Figure 39:
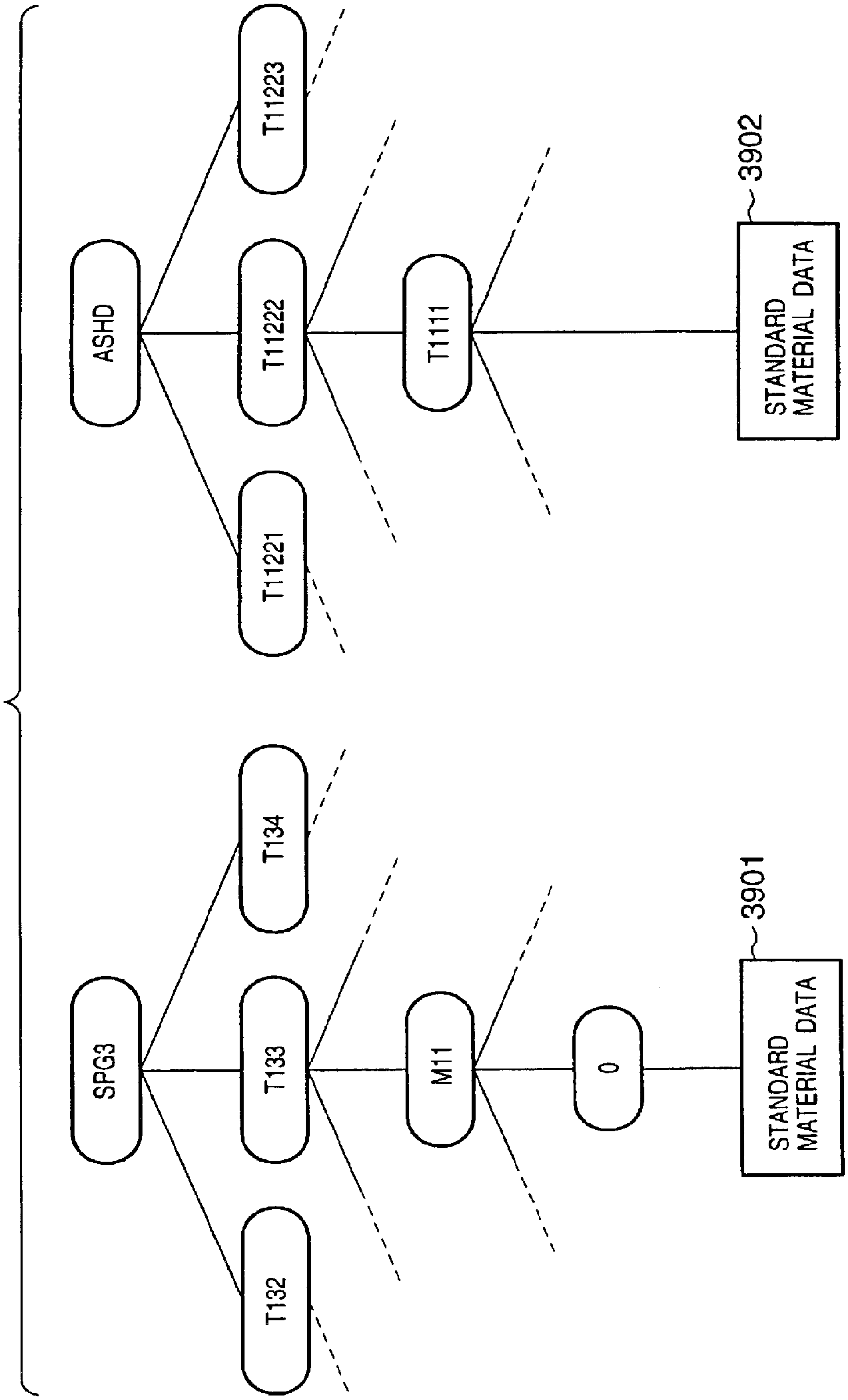
FIG. 39 is a view showing the directory structure in the standard data file 2804.

FIG. 39 shows examples of the data structure in the standard data file 2804. Referring to FIG. 39, standard material data 3901 of an element work has directories “SPG3/T133/M11/0”, and standard material data 3902 of another element work has directories “ASHD/T11222/T1111”.

The operation pattern data file 2806 has the same data structure as that of the CS data file 2804. More specifically, work data contained in the operation pattern data file 2806 include data as shown in FIG. 38, which are related to works actually executed in the past. Only the difference from the standard data file 2804 is whether the work is recognized as a “standard”.

As described with reference to FIG. 2, there are an infinite number of works related to manufacturing a device (printer) as a product. However, as described with reference to FIGS. 1 to 35, the work standard creation system 2800 can easily define a number of element works as “work standards” each constituted by two comments, object, and verb Especially, as shown in FIG. 2, work standards are classified into processes, and processes are classified into models. In other words, models, processes, and works have tree structures, as shown in FIG. 2.

On the other hand, the work assignment system to be described later changes the composition of element works in consideration of the manhour. That is, the work standard creation system 2800 defines works, and the standard manhour setting system 2801 sets the manhour such that the composing operation by the work assignment system 2802 is facilitated.

The work standard creation system 2800, standard manhour setting system 2801, and work assignment system 2802 commonly have work elements with identifiers. However, since the identifiers themselves do not make the user remember the work contents, the master files cannot be searched using the identifiers of work elements (standard works). Hence, this system is designed to be able to execute multi-keyword searching using, as keywords, a total of four phrases, i.e., two comments, object, and verb common to all the systems.

To give a manhour to each work created by the work standard creation system 2800 in advance, the standard manhour setting system 2801 searches the standard material data file 2804 using the total of four phrases, i.e., two comments, object, and verb (the combination of these four keywords will be referred to as a "work identification multi-keyword" in this specification) and gives manhour data (the above-described "manhour" and "set condition") attached to the found standard data to each work data of data created by the work standard creation system 2800.

Figure 40:
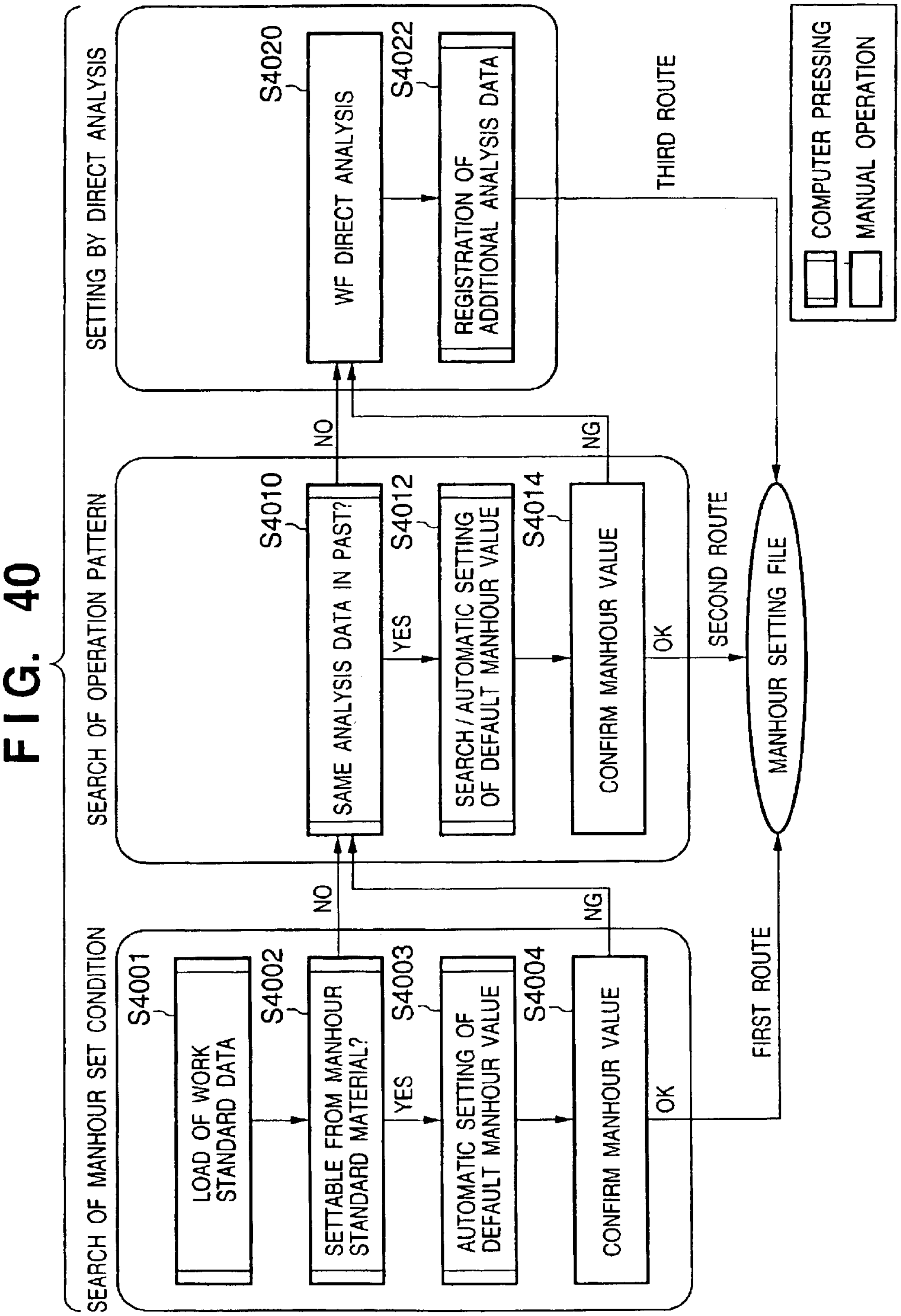
FIG. 40 is a view for explaining three routes of manhour setting in the standard manhour setting system 2801.

The outline of this procedure is shown as a flow chart "search of manhour standard material" on the left side of FIG. 40. Referring to this flow chart, work standard data created by the work standard creation system 2800 is loaded in step S4001. In step S4002, it is determined for each work whether data having work identification keywords matching (or partially matching or ambiguously matching) the work identification multi-keyword of the work is present in the standard material data file 2804, and if so, manhour data HS of a record in the standard material data file is assigned to the work standard data. For example, work data loaded from the work standard creation system 2800 is represented by X, and a work identification multi-keyword of the data X is represented by KW. In step S4004, the user has a chance to confirm whether the assigned manhour data HS is appropriate.

On the other hand, it is determined in step S4002 that the work identification multi-keyword KW of the work data X is not present in the standard material data file 2804, a record having the work identification multi-keyword KW is searched for from the operation pattern data file 2806 in step S4010.

As described above, the operation pattern data file 2806 has the same data structure as that of the standard material data file 2804. The difference between the two files is that data in the operation pattern data file is not a standard but at least has manhour data set in the past. When such work data is present in the operation pattern data file 2806, manhour data HP set for the work data is assigned to the target work. In step S4014, the user is given a chance to confirm whether the manhour data HP is correct.

That is, in the flow chart "search of manhour standard material" on the left side of FIG. 40 and the flow chart "search of operation pattern" at the central portion of FIG. 40, manhour data is automatically searched from standard material data or past data and assigned without intervention of the user. However, there must be works unsuitable to automatic assignment. The flow chart on the right side of FIG. 40 explains a user's procedure of directly setting manhour data to a work unsuitable to automatic assignment by the user.

As is apparent from FIG. 36, the standard manhour setting system 2801 has three routes to set manhour data. Referring to FIG. 40, the route using the standard material data file 2804 is called a "first route", the route using the operation pattern data file 2806 is called a "second route", and the route in which the user directly analyzes a work and assigns manhour data is called a "third route" for the descriptive convenience.

Figure 42:
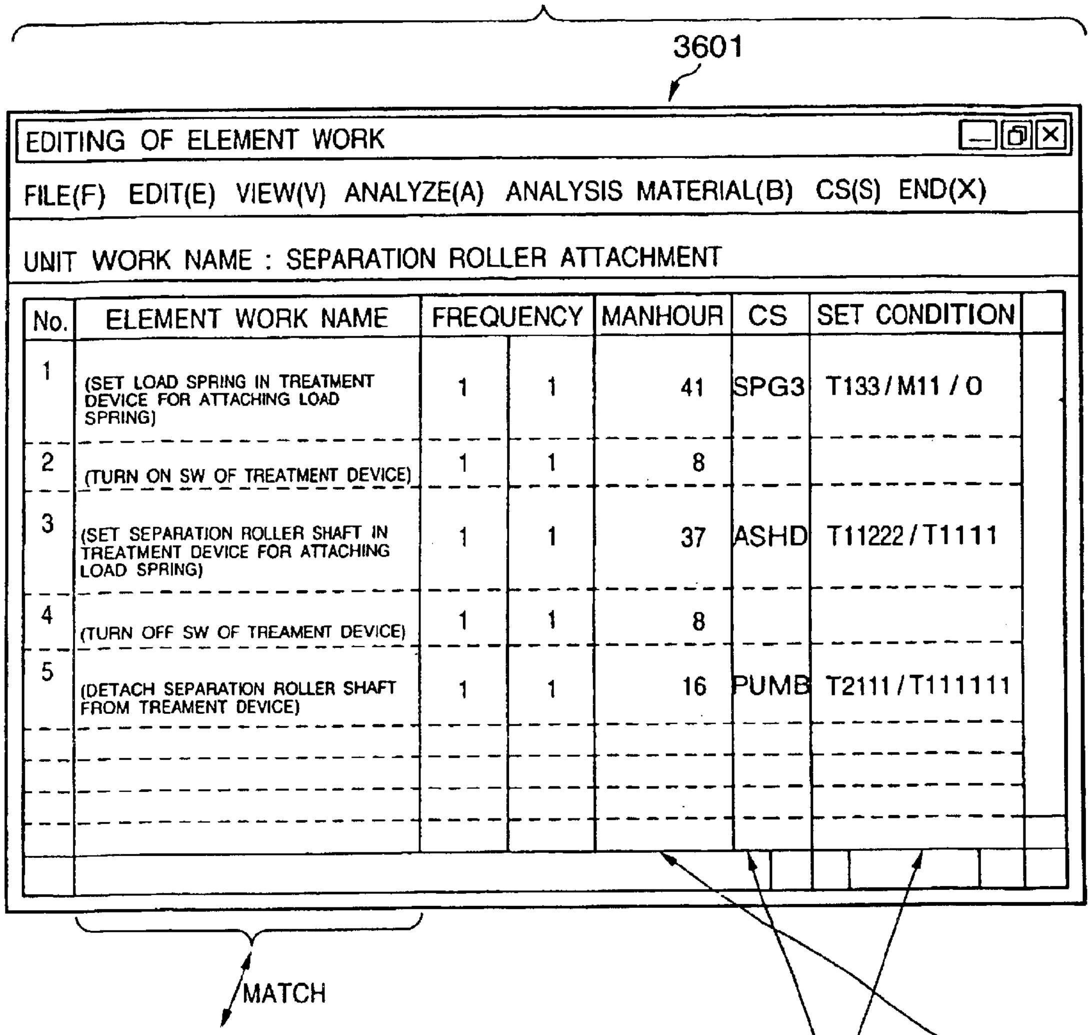
FIG. 42 is a view for explaining the first route for setting the manhour on the basis of data from a standard material data file.

The work or procedure in FIG. 40 will be described using a detailed example shown in FIGS. 41 to 44. FIG. 41 is a view for explaining for explaining data load in step S4001 of FIG. 40. FIG. 42 is a view for explaining the operation of the first route in detail. FIG. 43 is a view for explaining the operation of the second route. FIG. 44 is a view showing a detailed example of the final manhour setting file 3601 obtained by the operation in FIGS. 41 and 42.

As for the operations shown in FIG. 40, the operation of the first, second, or third route is performed every time a work data file is downloaded from the work standard creation system 2800, i.e., every record of the work data file. However, FIGS. 41 to 44 show the operations as if the operation of the first, second, or third route were performed at once for all the downloaded files, for the illustrative convenience.

Referring to FIG. 41, the manhour setting file 3601 before data load has the data structure shown in FIG. 37. When data created by the work standard creation system 2800 is loaded to the manhour setting file 3601, the "comment 1" field, "object" field, "comment 2" field, and "verb" field in the work data file are loaded as an "element work name". Since the work data file does not contain manhour data, the manhour setting file 3601 has no manhour data at the stage of data load in FIG. 41.

For the descriptive convenience, the Japanese texts in the "element work name" field of the manhour setting file 3601 shown in FIG. 41 are not translated to English, and English equivalents of these texts are indicated by *1 to *5 in the margin of FIG. 41. This aims at indicating that when data in the respective columns of the table shown on the lower side of FIG. 41, which are created by the work standard creation system 2800, are directly loaded in this order, and the data in the row direction (horizontal direction) of the columns are connected, these data form significant Japanese texts in that word order in the "element work name" field.

Although each "element work name" shown in FIG. 42 and the like is illustrated as a series of text data for the illustrative convenience, the "element work name" field is actually separated into the "comment 1" field, "object" field, "comment 2" field, and "verb" field.

FIG. 42 explains the first route. For example, when the first record is downloaded from the work standard creation system 2800, standard data having the keyword KW "set load spring in treatment device for attaching load spring" is searched from the standard material data file 2804.

The symbol "*" in the keyword formula shown in FIG. 42 and the like will be described here.

The "*" is a symbol representing a wild card and can have an arbitrary value. Data shown in the first record of the standard material data file 2804 shown in FIG. 42 are comment 1=* object="*バネを (BANEO: spring)"

comment 2=*"に (NI: to)"

verb="組み込む (KUMIKOMU: set)"

That is, since the "comment 1" field of the first record is designated to "*", it matches any text data contained in the "comment 1" field of the "element work name" field as the work data in the manhour setting file. In a similar manner, for the "object", any word including "バネを (BANEO: spring)" can match in all records. For the "comment 2", any word including "に (NI: to)" can match in all records. For the "verb", any word including "組み込む (KUMIKOMU: set)" can match in all records.

In the example shown in FIG. 42, the first record in the manhour setting file 3601 matches the first record in the standard material data file 2804, which has "∗ (BANEO: spring), ∗バネを (NI: to), ∗に (KUMIKOMU: set)", and the second record having "∗, ∗を, (O), *∗に (NI: to), 組み込む (KUMIKOMU: set)"

In the standard manhour setting system 2801, when a record matches two or more records, it is determined that the record matches a record having the highest degree of matching. The degree of matching is obtained with reference to the number of characters except the wild card. In the example shown in FIG. 42, the first record in the standard material data file 2804 contains more matching text data than the second record. Hence, it is determined that the degree of matching is higher for the first record in the standard material data file 2804 than for the second record. It is finally determined that the record matches not the second record but the first record.

The first record in the standard material data file 2804 has a time value "41 RU" as a manhour, so "41" is set in the "manhour" field of the first record of the manhour setting file 3601. In addition, the first record in the standard material data file 2804 has ""SPG3/T133/M11/0" as "manhour standard material" data. The root directory of manhour information is "SPG3", and the sub-directories are "T133/M11/0". Hence, "SPG3" is stored in the "CS" field of the first record in the manhour setting file 3601, and data "T133/M11/0" is stored in the "set condition" field.

When this system is used in a non-Japanese-speaking zone, the "degree of matching" is determined with reference to the number of matching words.

For the above search in the standard manhour setting system 2801, perfect matching or partial matching by words or phrases except the wild card symbol are employed, and one candidate is always employed in principle. However, a plurality of candidates may be displayed in descending order of degrees of matching, and the user may finally select a candidate.

When similar checking is performed for the remaining four records in the manhour setting file 3601, the second record matches no record in the standard material data file 2804, the third records matches the second record in the standard material data file 2804, the fourth record matches no record in the standard material data file 2804, and the fifth record matches the third record in the standard material data file 2804.

Hence, for the third work data in the manhour setting file 3601, which matches a record, "37" is assigned as a "manhour", "ASHD" is assigned as a "CS", and "T11222/T1111" is assigned as a "set condition". For the fifth work data, "16" is assigned as a "manhour", "PUMB" is assigned as a "CS", and "T2111/T111111" is assigned as a "set condition". Thus, the manhour setting file 3601 is tentatively created as shown in FIG. 42 in accordance with the manhour data setting procedure by the first route.

On the other hand, for the second and fourth work data that do not match any record by the first route, the procedure of the second route is executed as shown in FIG. 43. The text data of "element work names" of the second and fourth work data and the "comment 1", "object", "comment 2", and "verb" in the operation pattern data file 2806 are searched.

In the example shown in FIG. 43, the second and fourth work data match the first and second records in the operation pattern data file 2806, respectively. Hence, the values ("/GET-50E/M-10E" and "/GET-50E/M-10E") of the "operation pattern" fields of the first and second records in the operation pattern data file 2806 are stored in the "set condition" fields of the second and fourth records in the setting file 3601. In this case, the records do not match the standard material data file, no value is written in the "CS" fields in the setting file 3601. Thus, the operation of the second route is ended.

In this way, the manhour setting file 3601 is set as shown in FIG. 44 by the operations of the first and second routes.

The operation of the third route is performed when the standard manhour can be determined by neither the first route nor the second route. In the third route, the standard manhour is determined by directly analyzing the WF (Work Factor).

The overall operation of the standard manhour setting system 2801 has been described above. Details of the operation of the standard manhour setting system 2801 will be described below.

<Data Load> . . . Standard Manhour Setting System

Figure 45:
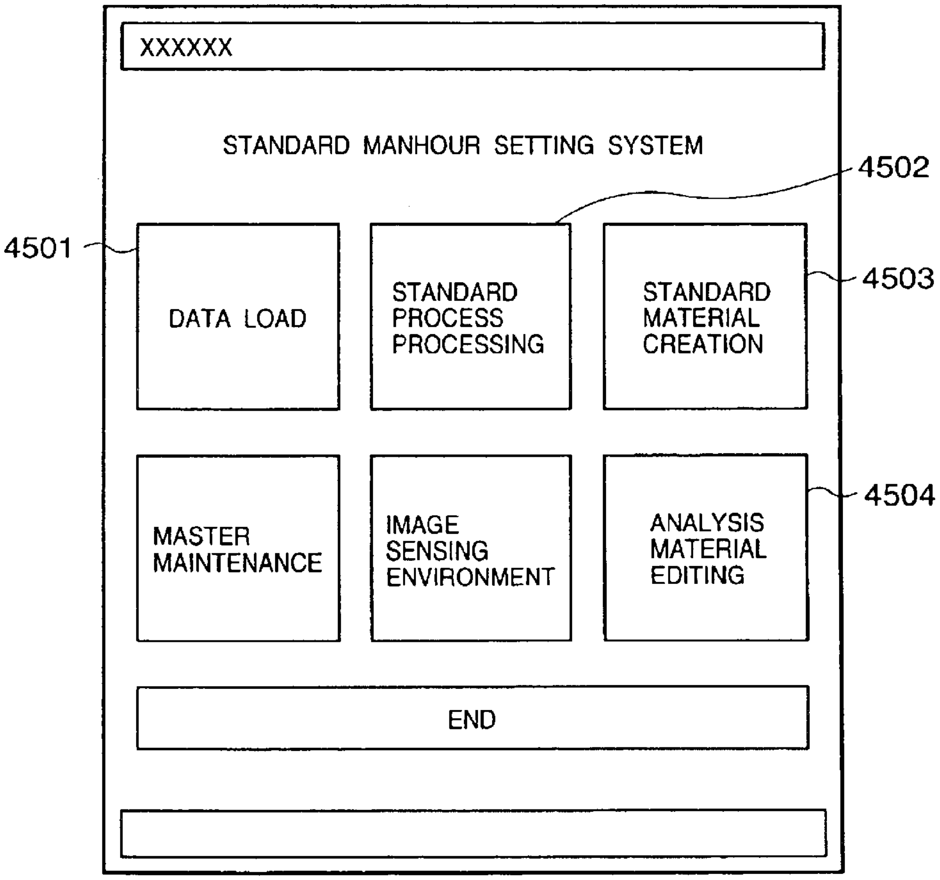
FIG. 45 is a view for explaining the initial menu window of the standard manhour setting system 2801.

FIG. 45 shows the initial menu window displayed when the standard manhour setting system 2801 is activated. In this menu, six main menus:

data load (icon 4501),
standard manhour processing (icon 4502),
standard material creation (icon 4503),
master data maintenance,
environment setup, and
analysis material editing (icon 4504)
can be selected.

Data load is necessary before determination of the standard manhour. When the user selects the data load menu 4501, a window as shown in FIG. 46 is displayed.

Figure 46:
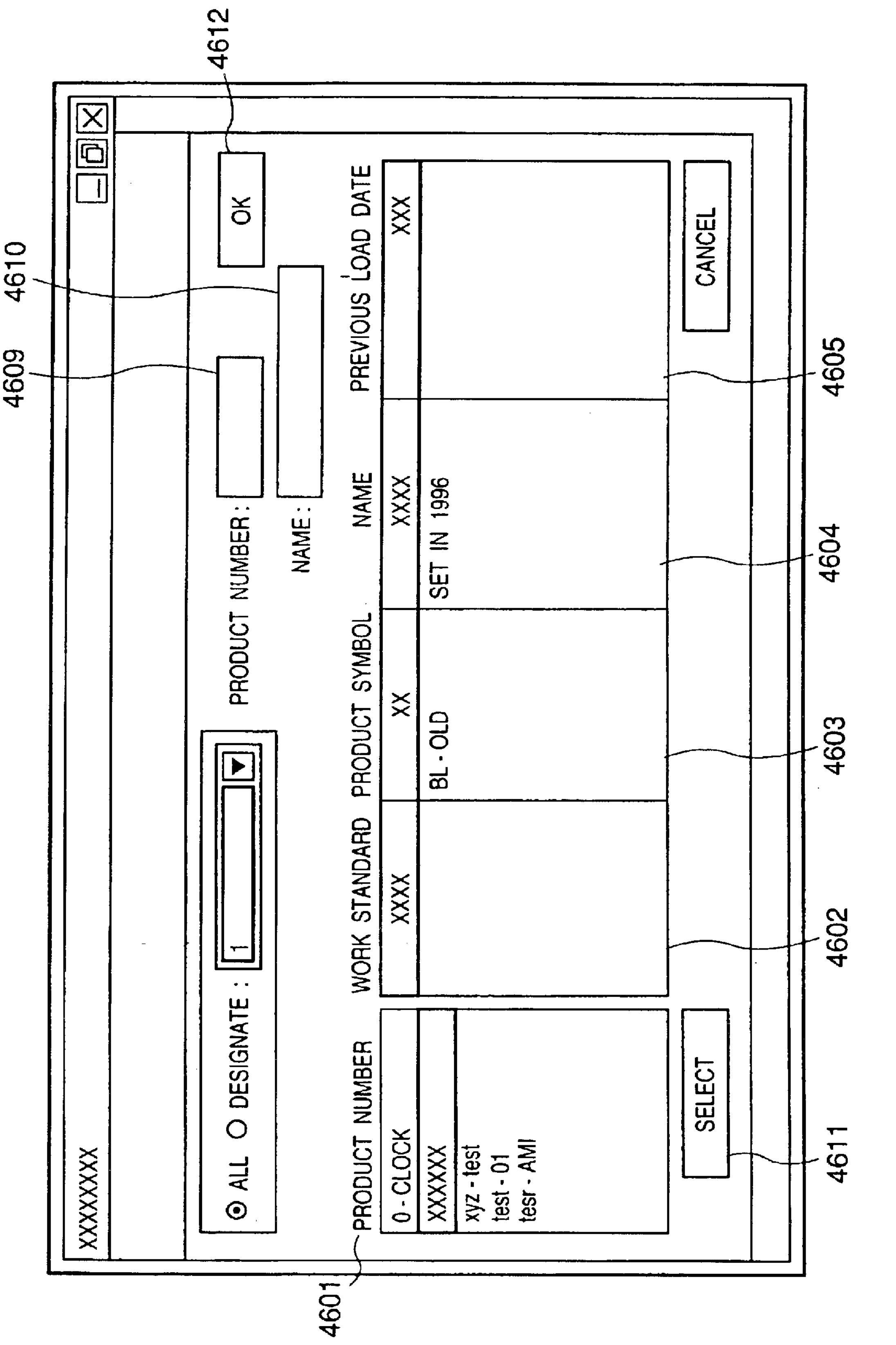
FIG. 46 is a view for explaining the window structure for defining the data range to be loaded in the standard manhour setting system 2801.

Referring to FIG. 46, the window is roughly divided into to areas. A field 4601 on the left side indicates product symbols created by the work standard creation system 2800, i.e., product numbers (or the names of "representative models") that can be downloaded to the manhour determination system.

Fields 4602 to 4605 on the right side indicate work names downloaded from the work standard creation system 2800 in the past. More specifically, the field 4602 indicates the names of "work standards" downloaded by the standard manhour setting system 2801, the field 4603 indicates the "product symbols" of the respective "work standards", the field 6404 indicates the "names" of the respective "work standards", and the field 4605 indicates download dates, i.e., "load dates".

One or a plurality of "product numbers" to be loaded (downloaded) are selected from the field 4601 using the mouse. To given a name different from that set by the work standard creation system 2800 to the product to be downloaded, the product number of the product to be named is designated in the field 4601, and the "name" is input to a field 4601. Data load is started by selecting the product to be loaded with the mouse, clicking on a "select" button 4611, and clicking on an "OK" icon 4612.

Figure 47:
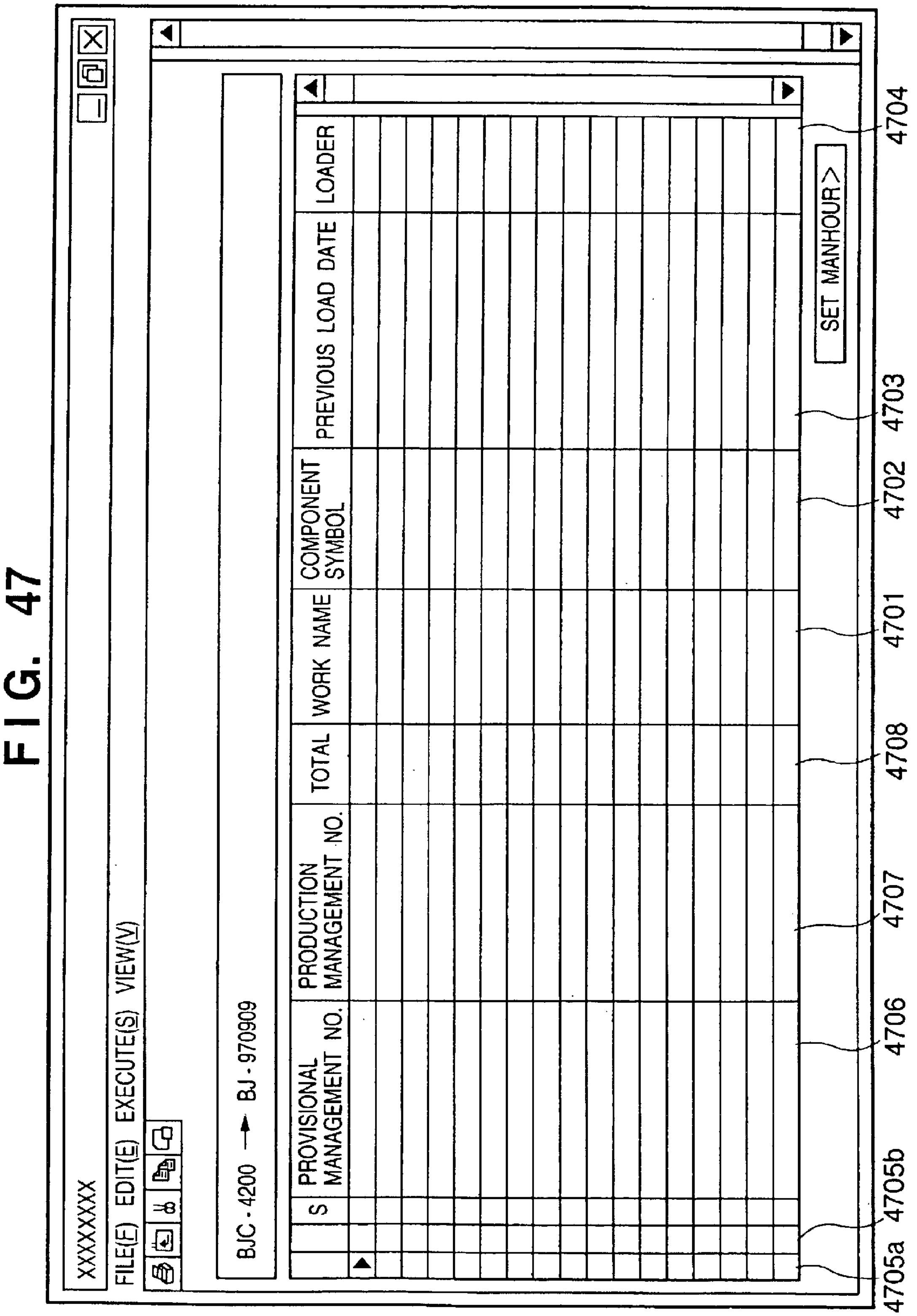
FIG. 47 is a view showing the list of work data defined by the window shown in FIG. 46.

When the user clicks on the "OK" icon 4612, work name data is loaded to the memory of the standard manhour setting system 2801, and a window as shown in FIG. 47 is displayed.

The window shown in FIG. 47 displays the list of works present on the memory of the standard manhour setting system 2801. A work downloaded previously can be discriminated from the current download data by referring to a previous load date field 4703.

Since the standard manhour setting system 2801 is separated from the work standard creation system 2800, works or work groups to be considered by the standard manhour setting system 2801 itself are present independently of works or work groups set by the work standard creation system 2800. In the standard manhour setting system 2801, one work (or work group) is independently recomposed by the standard manhour setting system 2801 as another "component".

Figure 91:
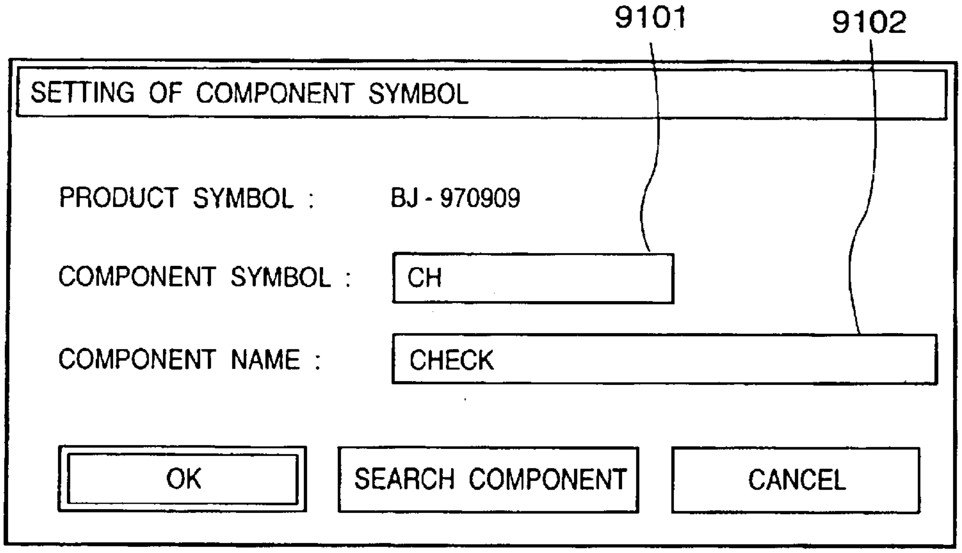
FIG. 91 is a view showing a dialog box for inputting a component symbol in relation to FIG. 39.

The component newly set by the standard manhour setting system 2801 is discriminated from other components by a "component symbol". To create a component, the names of a plurality of works to be set in the component are selected in a field 4701, the "component symbol set" menu in the edit menu is selected, and a component symbol (field 9101) and name (field 9102) are input through a window as shown in FIG. 91. Thus, the component symbol is assigned to a field 4702 in FIG. 47 in correspondence with the selected work names.

Referring to FIG. 47, a flag 4705*a* represents the state of work standard data. When the value of this flag is "N", it represents that the work standard is newly created. When the value is "C", it represents that the work standard is previously loaded to the standard manhour setting system 2801 and then changed on the standard manhour setting system 2801 side. When the value is "D", it represents that the work standard is previously loaded to the standard manhour setting system 2801 and then deleted on the standard manhour setting system 2801 side.

A field 4705*b* has a flag representing the approval state of a work standard. When the value is "F", it represents that the approver of the work standard is registered.

A field 4706 represents a number assigned to the work standard by the work standard creation system 2800. A field 4707 represents a number given to the work standard by the standard manhour setting system 2801.

Figure 48:
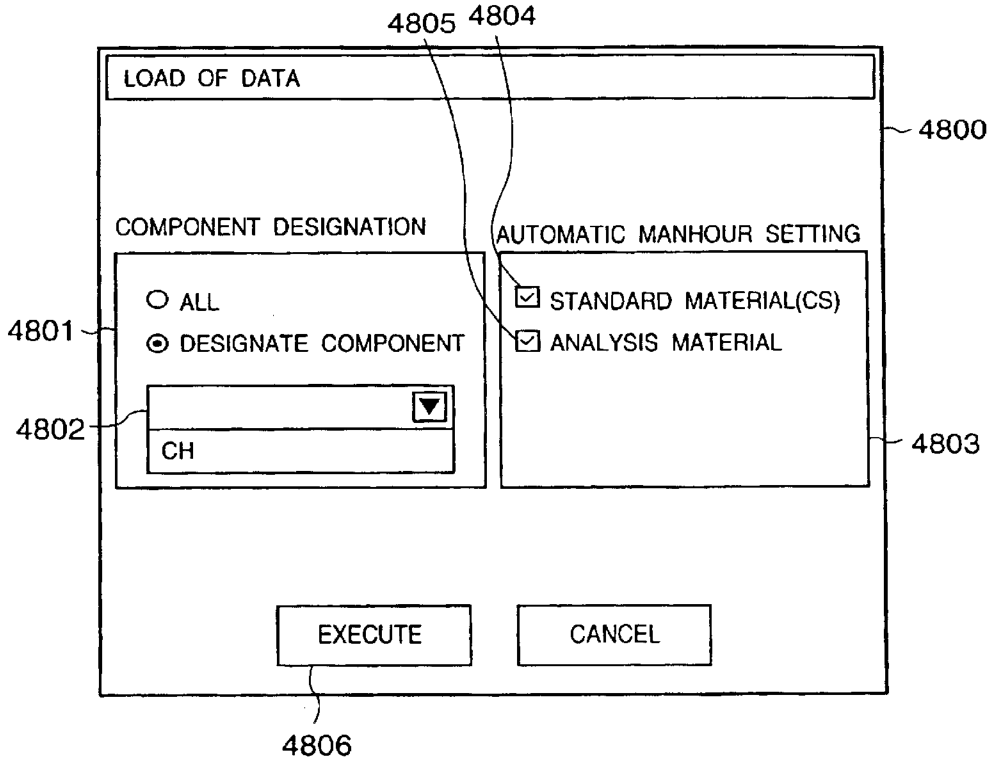
FIG. 48 is a view for explaining the data load window.

Data is loaded in units of components. When the user selects the "execute" menu in FIG. 47, a "data load" window 4800 shown in FIG. 48 is displayed. The user designates the component symbol of a load target through a dialog 4801 in the window 4800.

More specifically, to load the component symbols of all components displayed, the user checks the "all" button. To designate and load a specific component symbol, the user checks the "designate component" button and inputs the component symbol name to a field 4802. As described above, for one component, a work name selected in the field 4701 in FIG. 47 with the mouse is recognized as one "component".

Figure 49:
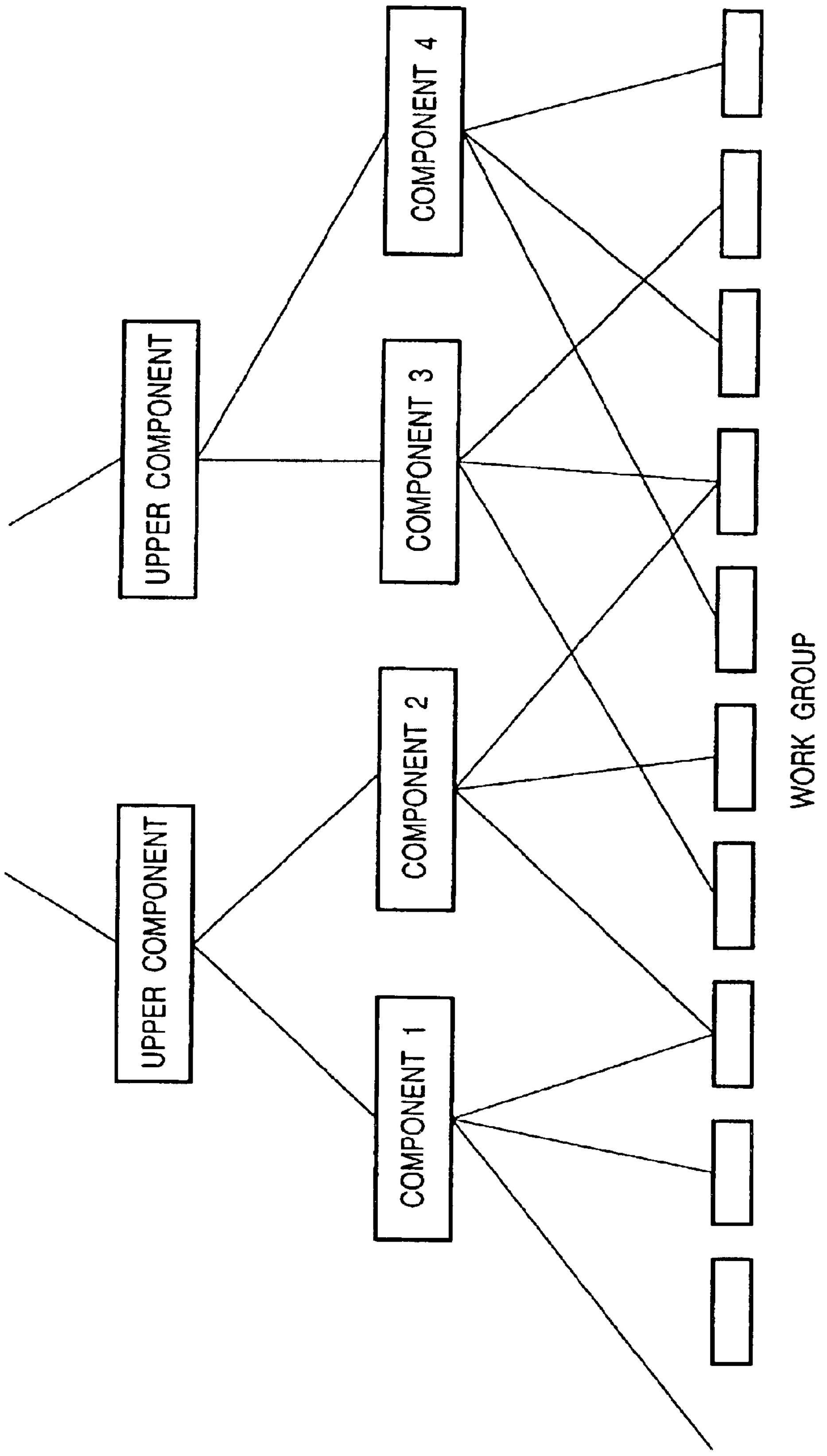
FIG. 49 is a view for explaining that arbitrary works can be grouped by arbitrarily changing the hierarchical structure of directories in the standard manhour setting system 2801.

As shown in FIG. 49, in the standard manhour setting system 2801, a plurality of components can be defined. A single work can belong to different "components".

The advantage of providing "components" on the upper side of works is as follows. Since individual works themselves have high universality, they can hardly be strongly connected to a specific product. However, to re-define works in setting the manhour, or to re-define works in composing works in the workshop in consideration of the manhour, it is preferable for the user to connect the works to a name easy to remember the product to be manufactured, i.e., the name of the upper level.

Referring back to FIG. 48, the window 4800 also has a dialog 4803 in which a material to be referred to in automatically setting the manhour. That is, after the data load, whether an operation of automatically setting the manhour for the loaded work should be performed can be designated by a "standard material (CS) check button 4804 and "analysis material" check button 4805. The "standard material (CS)" is the standard material data file 2804, and automatic manhour setting by checking the "standard material (CS)" is manhour data setting by the above-described first route.

The "analysis material" is the operation pattern data file 2806, and automatic manhour setting by checking the "analysis material" is manhour data setting by the above-described second route. If the user does not want automatic manhour setting, both of the "standard material (CS)" and "analysis material" check buttons are turned off.

When the user clicks on an OK button 4806, the data load is started.

Figure 50:
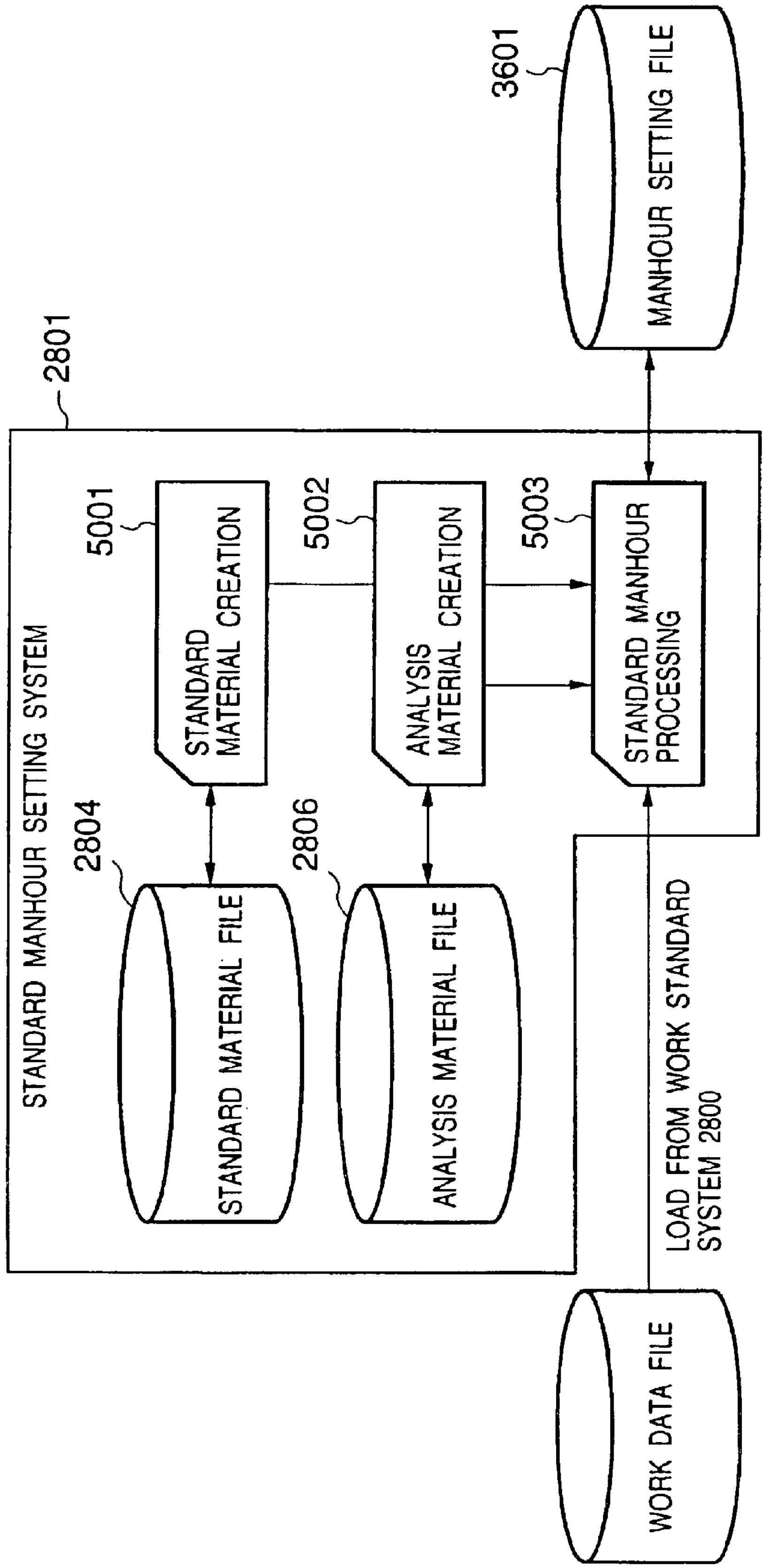
FIG. 50 is a view for explaining the file structure of the standard manhour setting system 2801.

FIG. 50 shows the file structure of the standard manhour setting system 2801. As described above in relation to FIG. 36, the standard manhour setting system 2801 creates the manhour setting file 3601 on the basis of files loaded from the standard material data file 2804 and operation pattern data file 2806.

Referring to FIG. 50, the standard material data file 2804 and analysis material "operation pattern" data file 2806 are created by a standard material creation routine 5001 and analysis material creation routine 5002, respectively, in advance.

In the above way, more specifically, in accordance with the control procedure shown in FIG. 40 (this control procedure is included in a standard material manhour processing routine 5003), manhour data is automatically set for work data downloaded from the work standard creation system 2800.

As shown in FIG. 49, the respective "works" (the "works" are not the sets of a plurality of detailed works but simple root directories) required to assembly a product are linked by directories through one or a plurality of components (the components may be divided into a plurality of layers). In other words, when the directories are traced, the "product" assembly work can finally reach a work, and which manhour data is set for the work can be confirmed.

The program procedure of displaying work contents for this confirmation is included in the standard material manhour processing routine 5003. The manhour data automatically set by the standard material creation routine 5001 or analysis material creation routine 5002 can also be confirmed by the standard material manhour processing routine 5003. The standard material manhour processing routine 5003 will be described.

<Standard Manhour Processing> . . . Standard Manhour Setting System

Standard manhour processing is executed by clicking the "standard manhour processing" icon 4502 (FIG. 45). Individual "element works" correspond to work data and have a structure as shown in FIG. 38, as described above.

Figure 51:
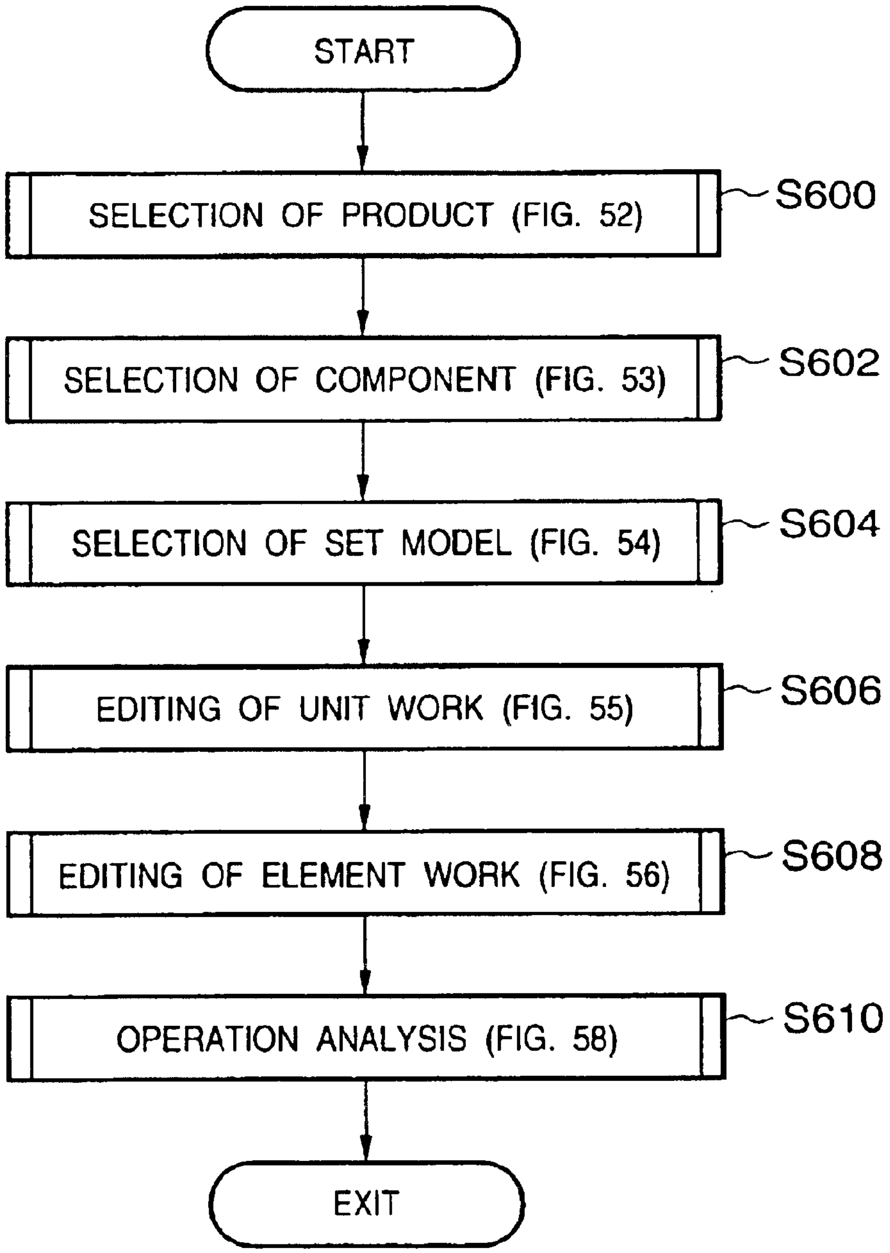
FIG. 51 is a flow chart for explaining the control procedure of the standard manhour setting system 2801.
Figure 52:
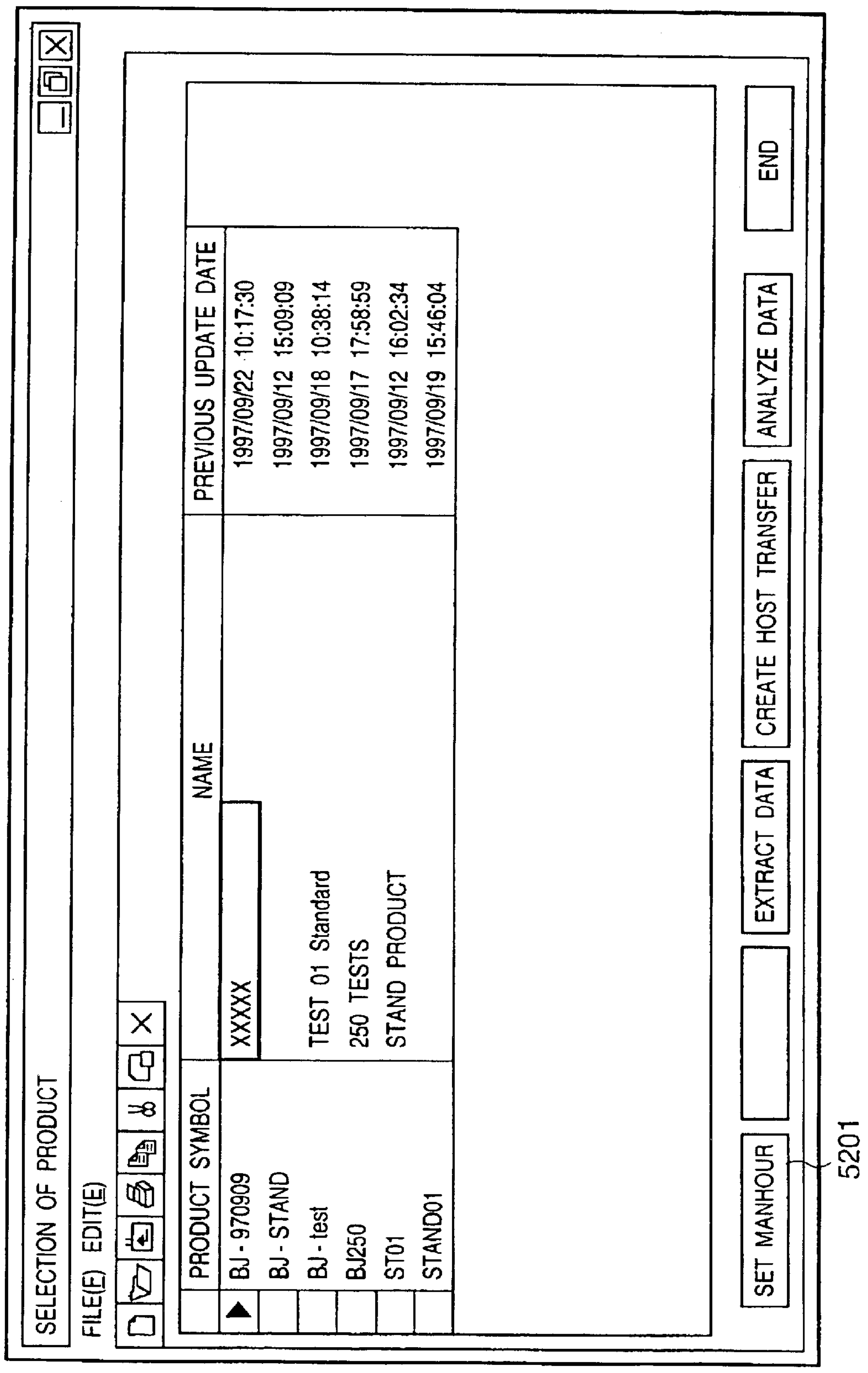
FIG. 52 is a view for explaining a user interface window for selecting a "product" as a manhour setting target.
Figure 53:
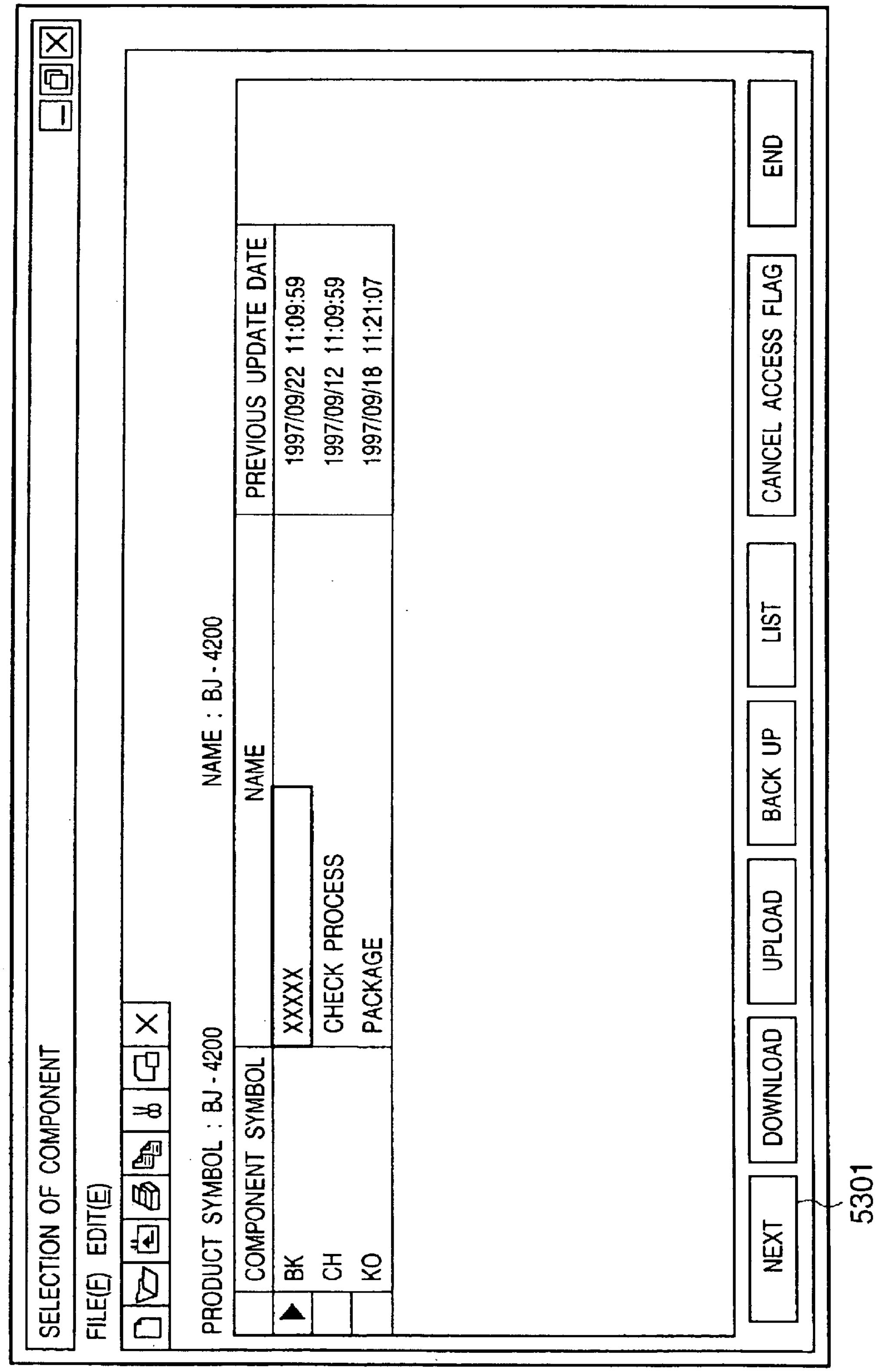
FIG. 53 is a view for explaining another user interface window for selecting a "product" as a manhour setting target.
Figure 54:
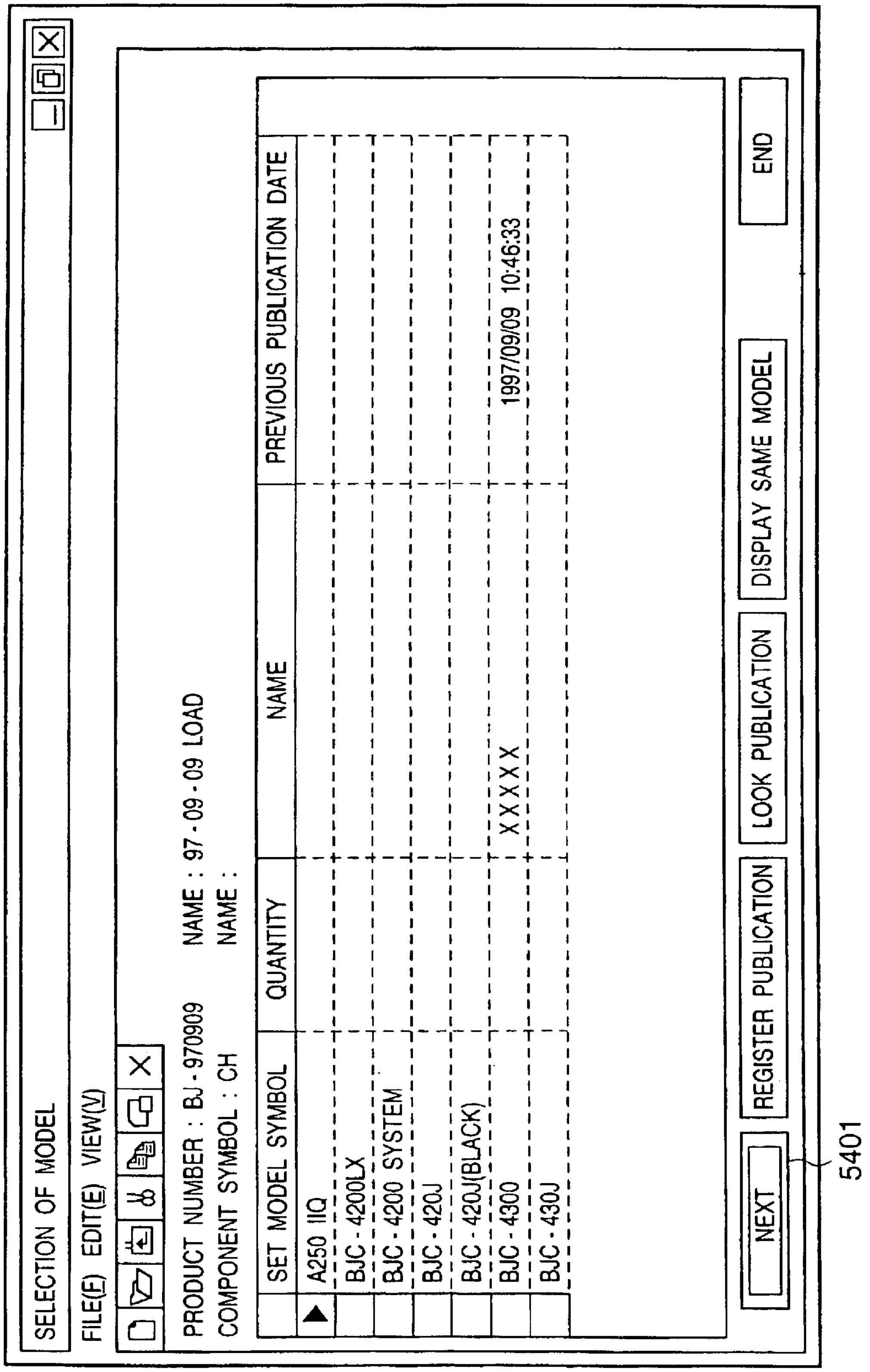
FIG. 54 is a view for explaining the "model" selection window.

The standard material manhour processing routine 5003 is executed in accordance with the control procedure of the flow chart shown in FIG. 51. For the control procedure shown in FIG. 51, the directories are linked using a hierarchical structure Product→component→model→work In step S600, the "product" as a manhour setting target is selected. FIG. 52 shows the product selection window. The target "product" is selected with the mouse or the like, and a "set manhour" button 5201 is clicked. When this button is clicked, the flow advances to step S602 to select a "component". FIG. 53 shows the "component" selection window. A target component is selected with the mouse or the like, and a "next" button 5301 is clicked. When this button is clicked, the flow advances to step S604 to select a "model". FIG. 54 shows the "model" selection window. At this stage, in the example shown in FIG. 54, since the user has selected the "product" and "component", "BJ-970909" and "97-09-

09 load" are displayed as a product symbol and product name, respectively. In addition, "CH" is displayed as a component symbol.

Next, the target "model" is selected with the mouse or the like ("BJC-4300" is selected in the example shown in FIG. 54), and a "next" button 5401 is clicked. When this button is clicked, the flow advances to step S606 to select a "work" to be edited.

FIG. 55 shows the dialog for causing the user to select a "work" to be edited. At this stage, in the example shown in FIG. 55, since the user has selected the "product" and "component", "BJ-970909" and "97-09-09 load" are displayed as a product symbol and product name, respectively. In addition, since "CH" is displayed as a component symbol, and "BJC-4300" is selected as the "model", "BJC-4300" and "xxxxxxx" are displayed as a set model symbol and model name, respectively.

Referring to FIG. 55, a plurality of works are displayed. In a field 5501, the "formal management No" of each work is set. In a field 5502, the "name" of each work is set. In a field 5503, the manhour value set for each work is set.

A field 5504 ("USE" field) stores the directory (corresponding to "set condition field" in the example shown in FIG. 43) of manhour set on the basis of automatic manhour setting by the second route, i.e., the operation pattern data file 2806 (this file is created on the basis of works used in the past). A field 5505 ("CS" field) stores the root directory (corresponding to "CS field" in the example shown in FIG. 42) of manhour set on the basis of automatic manhour setting by the first route, i.e., the standard material (CS) data file 2804.

At the stage in FIG. 55, the user can confirm manhour data (manhour value and manhour set condition (USE and CS)) automatically set. That is, in the manhour confirmation processes in step S4004 and S4014 of FIG. 40 are executed by the user through the display shown in FIG. 55. More specifically, in the example shown in FIG. 55, when a work has a value "0" as the "manhour" in the field 5503, it means that no corresponding work is registered in either the standard material data file 2804 or operation pattern data file 2806.

In step S4004, when the manhour in the window shown in FIG. 55 is "0", to automatically set the manhour by the second route, the user returns to the window shown in FIG. 48 to turn on the check box 4805 and click the OK button 4806.

After the end of automatic manhour setting by the second route, the window shown in FIG. 55 is displayed again, and it is confirmed whether a work having a "manhour" value "0" is present. If a work having a manhour value "0" is present, processing from step S608 in FIG. 51 is executed. Operations in step S608 and S610 correspond to step S4020 and S4022 in FIG. 40 (third route).

Step S608 in FIG. 51 is executed when the user clicks a "change" button 5506 to change the contents of the elements (comments, object, and verb) of a work or set the manhour value.

Figure 56:
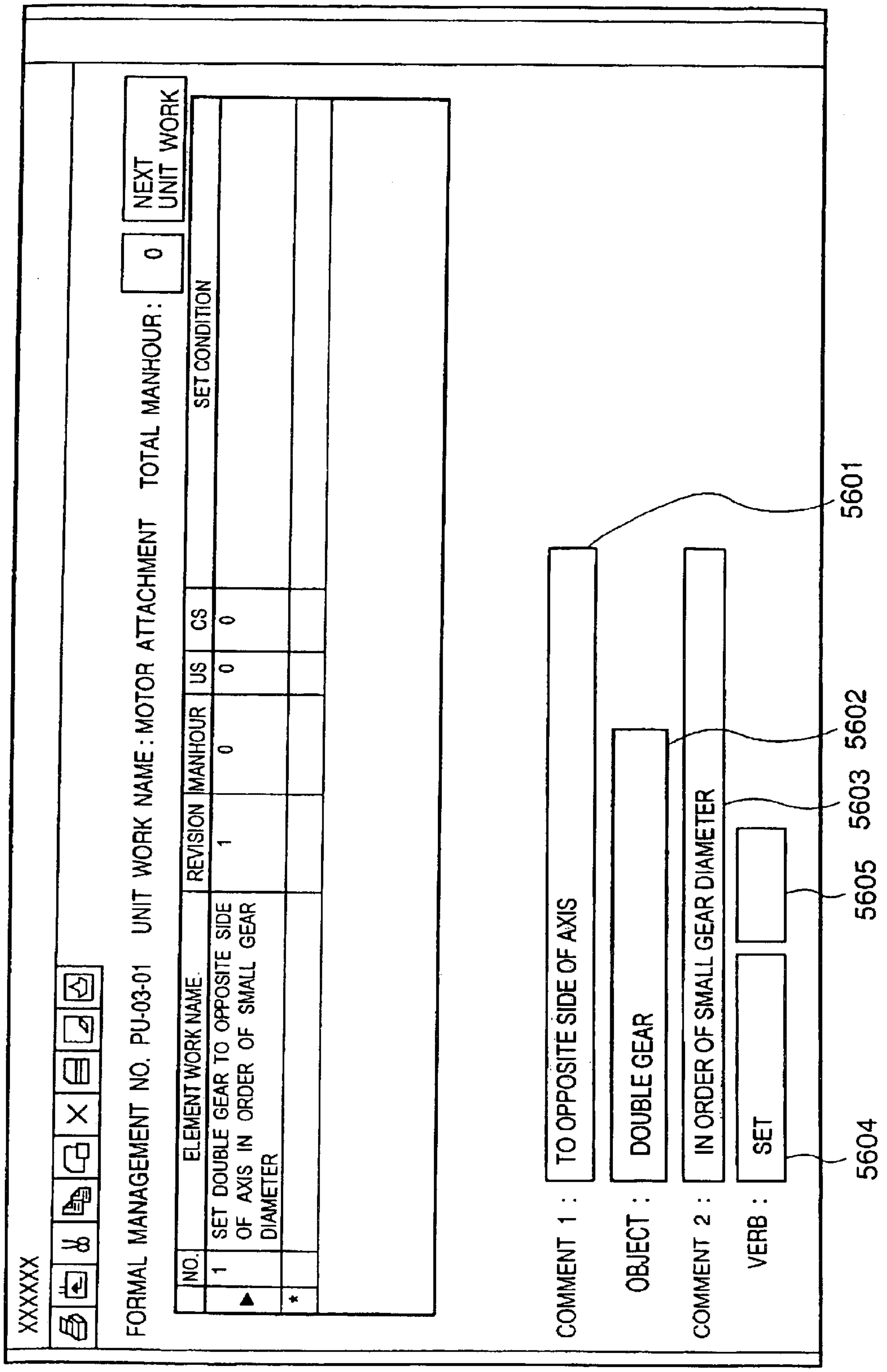
FIG. 56 is a view for explaining a work loaded by selection in FIG. 55.

FIG. 56 shows a user interface window for editing a work element. To change a work element, the comment 1, object, comment 1, and verb are corrected in fields 5601 to 5605. To reflect the correction to the setting file 3601, the button 5605 is clicked. To edit the next work element, a button 5606 is clicked.

To edit element works in units of genres, a user interface window shown in FIG. 57 is displayed.

<Operation Analysis>

As described above, when the manhour can be determined neither by the first route nor by the second route, the contents of each work are analyzed to determine the manhour using the third route. The control procedure shown in the flow chart of FIG. 51 is used for operation analysis in the third route.

To analyze a unit work, the user double-clicks on the name of a work to be analyzed in the window shown in FIG. 56. Then, step S610 is executed, and a user interface window shown in FIG. 58 is displayed.

Figure 58:
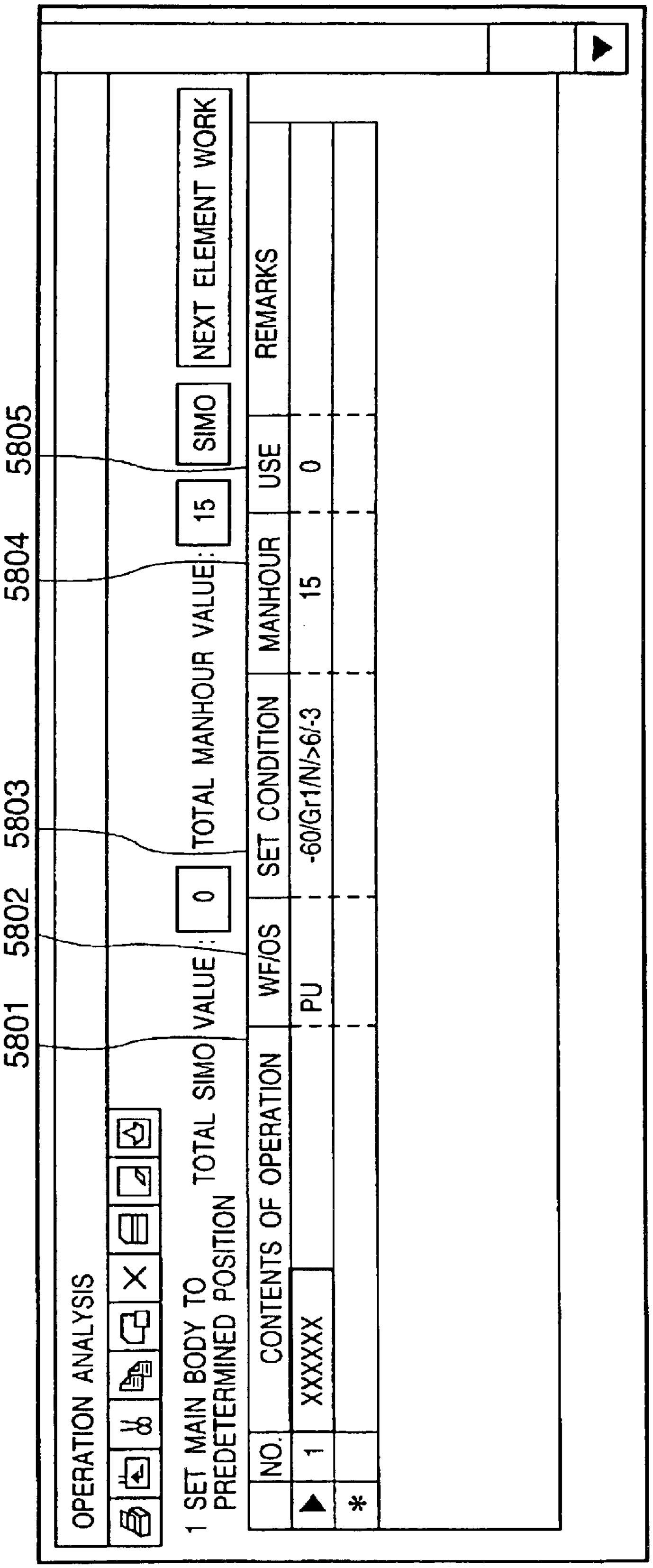
FIG. 58 is a view for explaining a user interface window for selecting a work to be analyzed.

In the user interface window shown in FIG. 58, the user inputs a target operation content to a field 5801 and a WF (Work Factor symbol) to a field 5802. A field 5803 stores the directory of a set condition.

In the example shown in FIG. 58, the operation of a work

"set main body to predetermined position"

is analyzed, and the manhour is calculated. The analysis contents and set conditions obtained by analysis are stored in the set condition field 5803 as a directory including the data.

More specifically, for the analysis operation, a WF must be set for a work "set main body to a predetermined position". To do this, the field 5802 is double-clicked.

Figure 59:
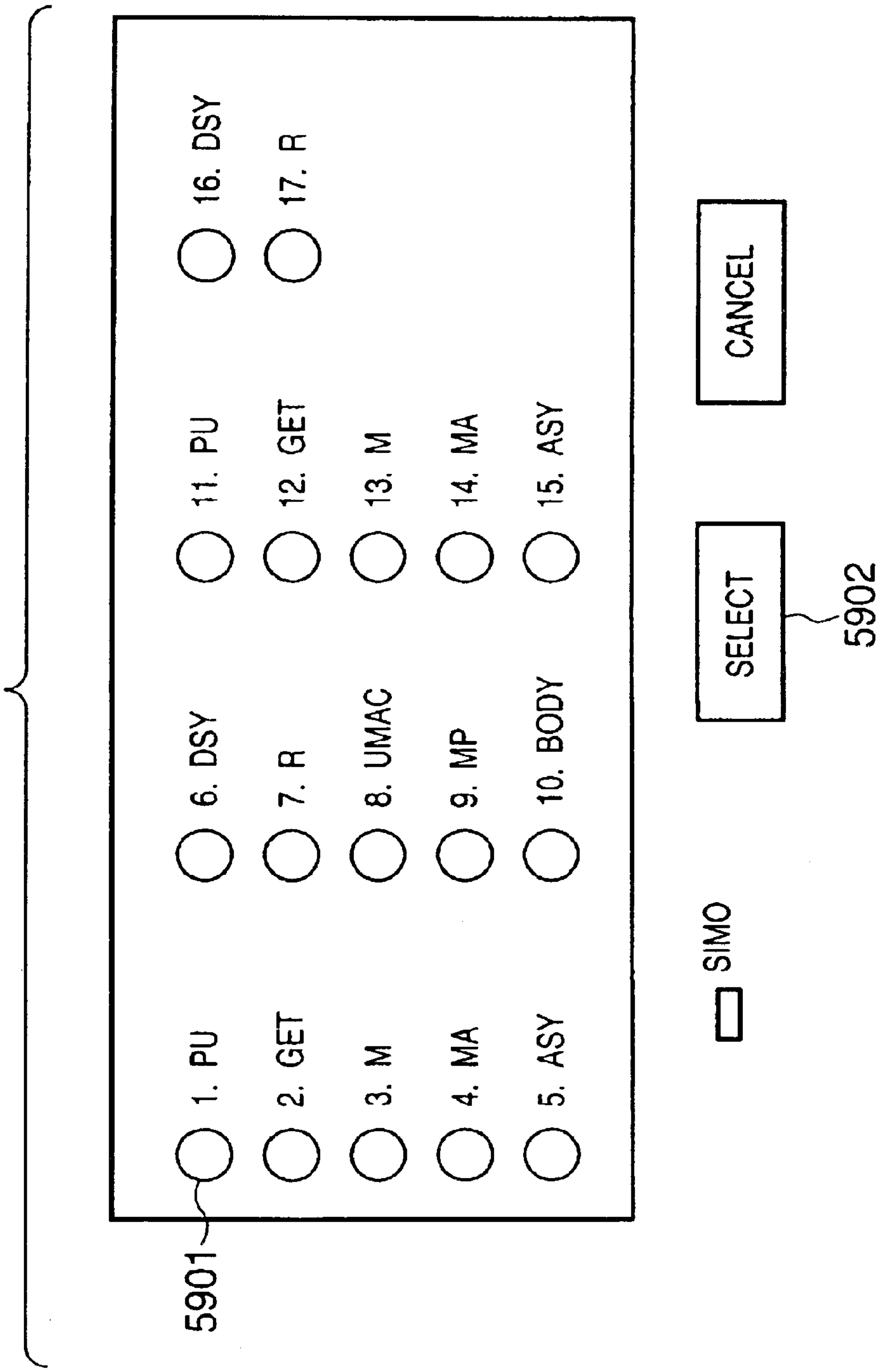
FIG. 59 is a view for explaining a user interface window for displaying representative WFs (Work Factors) that can be selected by the user.

The WF is a known Work Factor symbol. In the standard manhour setting system 2801 of this embodiment, a characteristic user interface window as shown in FIG. 59 is prepared to input the WF. In this embodiment, 17 WFs are prepared, as shown in FIG. 59. Since the user understands the operation content "set main body to predetermined position", he/she knows that this operation corresponds to "pickup" (WF=PU). Hence, the user would check a first button (PU) 5901 and click a "select" button 5902.

Figure 60:
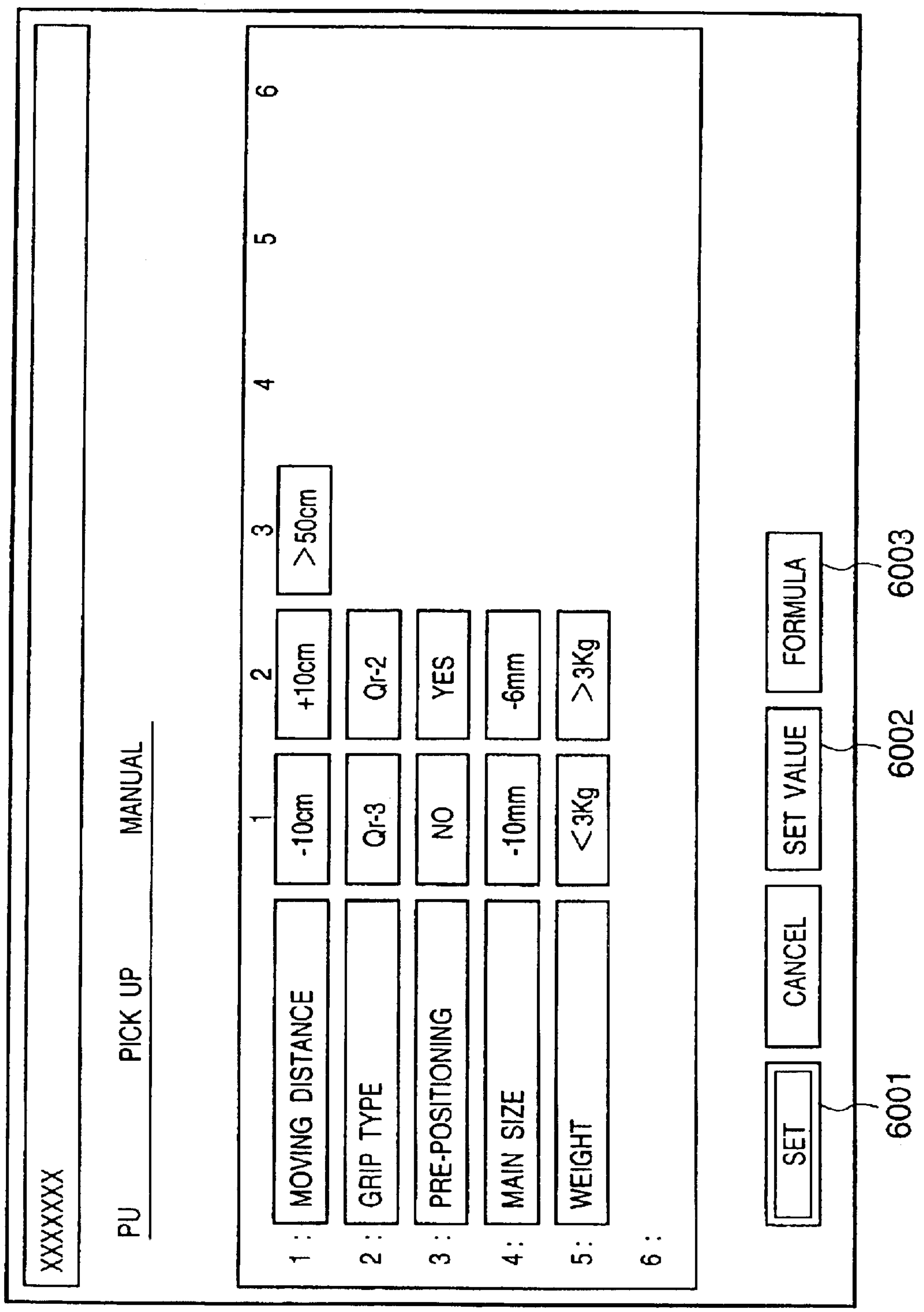
FIG. 60 is a view showing a user interface window so as to explain the manhour definition of PU (pick up) operation.
Figure 61:
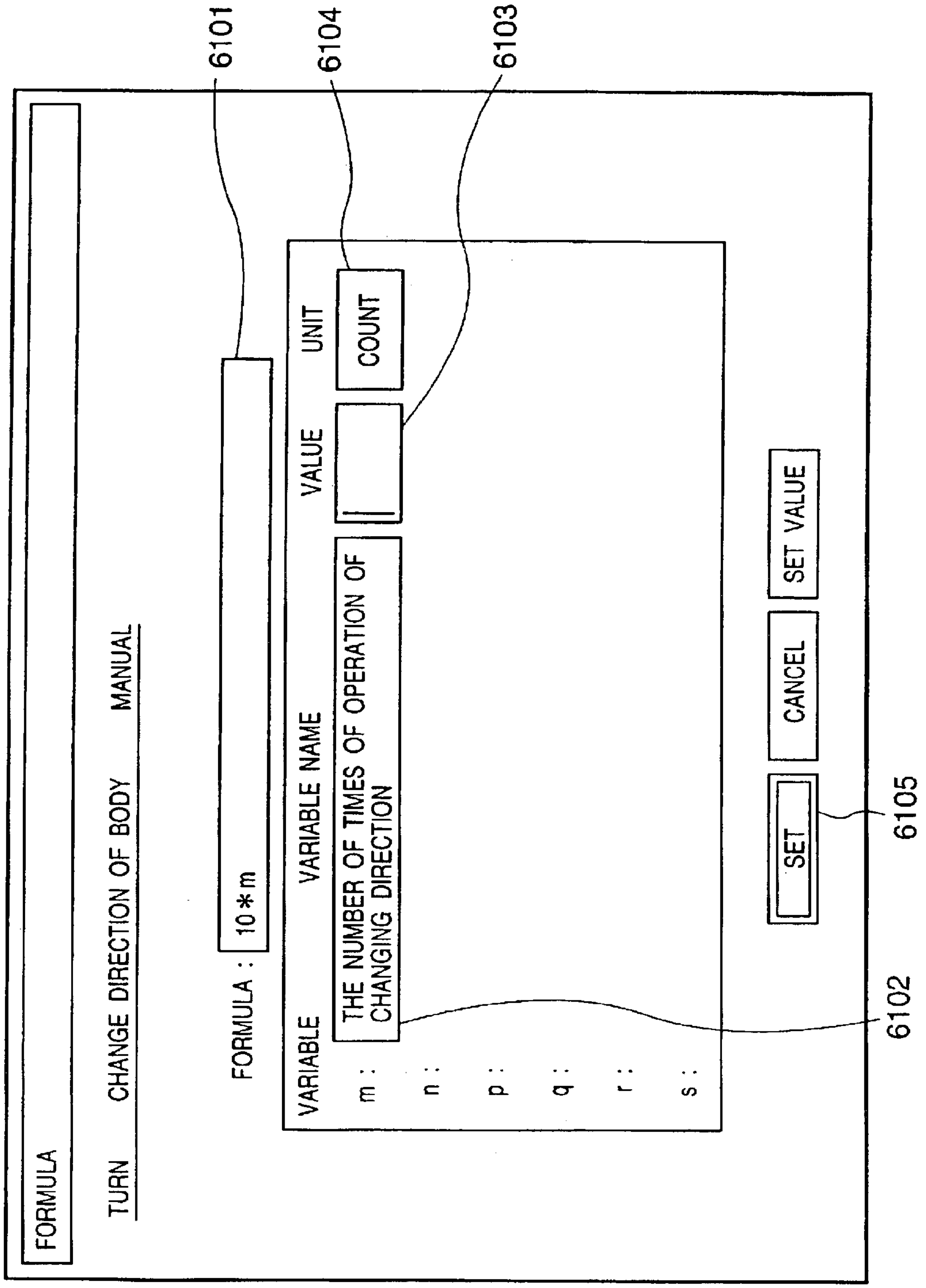
FIG. 61 is a view showing a user interface window so as to explain the manhour definition of TURN (direction changing) operation.

In accordance with selection of a button corresponding to a WF in FIG. 59, a user interface window shown in FIG. 60 or 61 is displayed. Of the 17 WFs shown in FIG. 59, PU, GET, ASY, MA, DSY, R, and Ri are WFs to be classified into a "table" type and can be set in the user interface window as shown in FIG. 60. In addition, UMAC, MP, BODY, SUSD, TURN, STEP, and UMAN are WFs to be classified into a "formula" type and can be analyzed in the user interface window as shown in FIG. 61. Furthermore, M, TD, and WALK are WFs to be classified into a "table/formula" type and can be analyzed in the above-described user interface windows as shown in FIGS. 60 and 61.

The analysis setting user interface window for a table-type WF will be described with reference to FIG. 60 while exemplifying "pickup" (=PU).

Each operation is analyzed by a condition related to the operation and a threshold value used to determine whether the condition is satisfied. For the "pickup" operation of the example shown in FIG. 60, five (six at maximum in accordance with the display window size) conditions, "moving distance", "grip type", "pre-positioning", "main size", and "weight", are preset.

Six threshold values can be set for condition determination in accordance with the limited display window. In the example shown in FIG. 60, threshold values "−10 cm", "+10 cm", and ">5 cm" are prepared for "moving distance". Condition values are also preset for the remaining conditions, i.e., "grip type", "pre-positioning", "main size", and "weight". These condition and condition values (threshold values) are displayed when a "default value" button is clicked. For each condition, the user selects a condition value that is suggested to be most appropriate. In the example shown in FIG. 60, the user selects "+10 cm" for "moving distance", "Qr-3" for "grip type", "NO" for "pre-positioning", "−10 mm" for "main size", and "<3 kg" for "weight"

On the basis of the selection, the user would click on a "select" button 6001.

For the operation "set main body to predetermined position", which is to be analyzed by the user, since the user himself/herself selects "PU", the system side knows that the WF is of the table type, and analysis by a formula is unnecessary. Hence, to indicate that the user cannot operate, the icon of a "formula" button 6003 is displayed in a light color.

When the user clicks on the "set" button 6001, the system calculates the manhour (time) for each condition. For example, for the condition value "+10 cm" for the condition "moving distance", the moving speed of the worker is known, and time t1 required for movement by 10 cm is set for the condition "moving distance". In a similar way, for the remaining conditions "grip type", "pre-positioning", "main size", and "weight" as well, manhour times t2, t3, t4, and t5 are calculated, respectively, and the sum of times t1 to t5 is stored in a field 5804 as a manhour. In addition, a directory for storing the conditions and contents of condition values set in FIG. 60 is stored and displayed in the set condition field 5802 shown in FIG. 58.

FIG. 61 shows analysis definition for a formula-type WF using an example "TURN" ("change direction of body"). More specifically, when time (i.e., unit time) necessary for one cycle of the operation "change direction of body" is "10", a manhour for the operation "change direction of body" is generally represented by 10*m where m is a variable representing the "number of times of operation of changing direction". In this system, a manhour formula "10*m" is set for TURN ("change direction of body") as a default value. Hence, referring to FIG. 61, the formula "10*m" is displayed in a field 6101, the variable name "the number of times of operation of changing direction" is displayed in a field 6102, and the unit of the variable, "times", is displayed in a field 6104. The user inputs the value of "times m" in a field 6103.

On the basis of the selection, when the user clicks on a "set" button 6105, the manhour value is calculated, displayed in the manhour field 5804 in FIG. 58, and stored in the memory.

The work procedures of work analysis and manhour determination according to the third route have been described above.

<Log of Change in Manhour> . . . Standard Manhour Setting System

Starting from the dialog shown in FIG. 55, when the manhour set condition is changed, and the "change" button 5506 is clicked, the manhour value may change. The standard manhour setting system 2801 monitors whether the manhour value changes using click on the "change" button 5508 as a trigger.

When a change in manhour is detected, a user interface window shown in FIG. 62 is displayed to allow the user to input the change reason for the manhour. In the example shown in FIG. 62, a field 6201 contains "10" and indicates that the manhour change amount is "10". A field 6202 has a USE value "0" and indicates that the work data is still unused. The change reason for the manhour is input to a field 6204. In the example shown in FIG. 62, the change reason is "new setting" because a work is newly registered.

The reason code in a field 6203 is provided in a one-to-one correspondence with the change reason. When a new change reason occurs for a work, a reason code with an arbitrary code can be assigned to the change reason. However, to ensure integrity in the entire system, the reason code to be set is preferably determined in advance.

To display reasons for change in previous setting in the field 6204 in scroll, the user clicks on a button 6206.

The change reason code set in the user interface window shown in FIG. 62 is displayed together with various kinds of information set for the work. For example, in the display window shown in FIG. 55, the reason code is displayed in a "correction" field 5507 (value "1").

Figure 63:
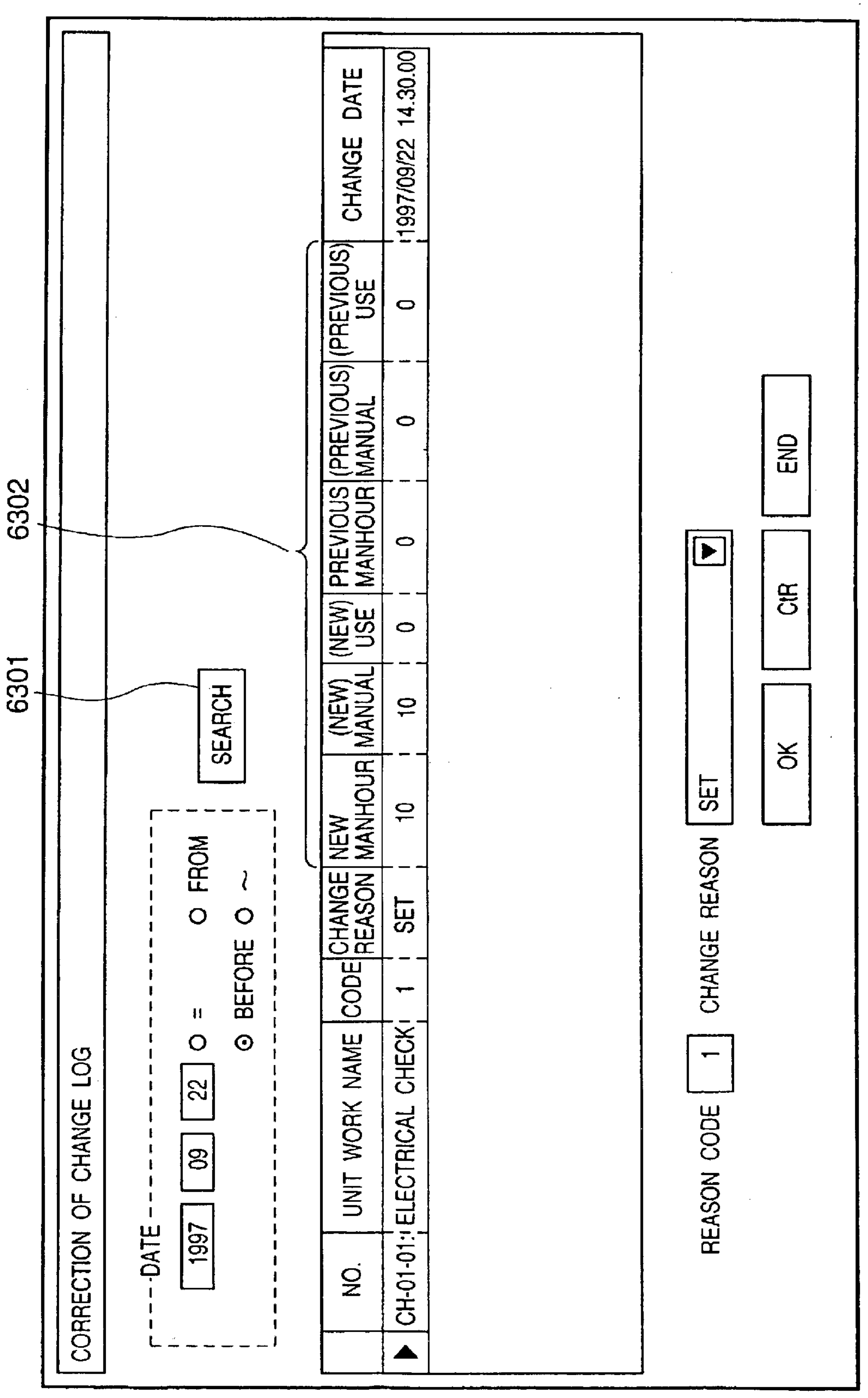
FIG. 63 is a view showing a window for displaying the change reason for the manhour.

This standard manhour setting system 2801 can hold the log of five changes (five or more if the memory allows) for one work. To confirm the log of change reasons, the column of the "correction" field 5507 of the work is double-clicked. Upon clicking, a change log correction window shown in FIG. 63 is displayed. The change reason is displayed in a field 6301, and preceding and succeeding manhour values are displayed in a field 6302. In the example shown in FIG. 63, the work "electrical check" has only one change reason. However, when a plurality of change reasons are present, five change reasons are displayed at maximum while being stacked on the lower side.

<Work Assignment System>

As shown in FIG. 28, the work standard creation system 2800 creates work standard data containing no manhour data, and the standard manhour setting system 2801 creates the manhour setting file 3601 from the work standard data.

Figure 64:
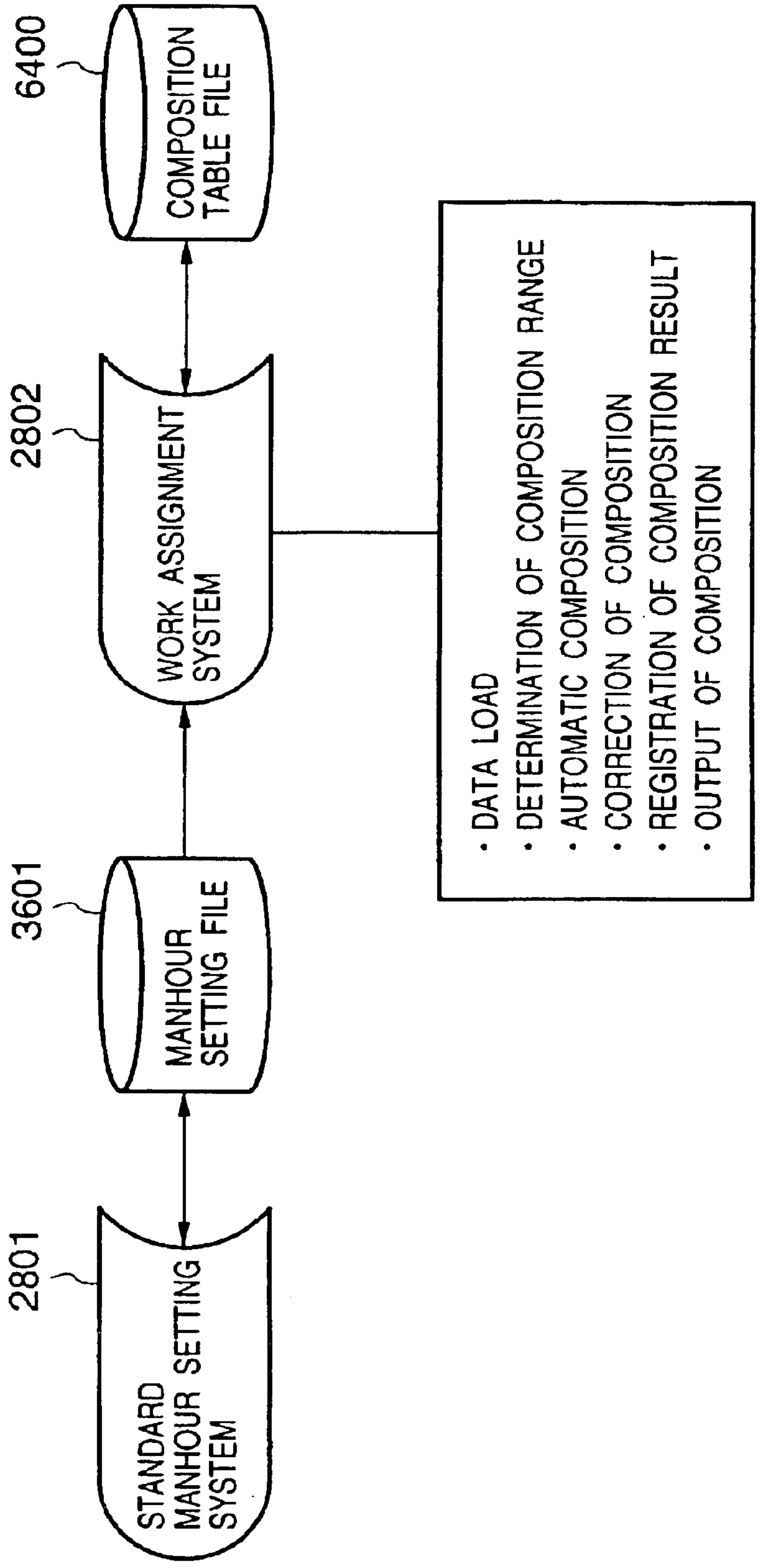
FIG. 64 is a view for explaining the basic operation of a work assignment system 2802.

As shown in FIG. 64, the work assignment system 2802 downloads (loads data) the contents of the manhour setting file 3601 and creates a composition table file 6400. The work assignment system 2802 also determines the range of composition in the loaded manhour setting data, composes works within that range in accordance with a predetermined purpose, corrects the composition, and outputs the composition. In other words, it may safely be said that the work standard creation system 2800 and standard manhour setting system 2801 exist such that the work assignment system 2802 can automatically execute composition, allow the user to easily grasp the composition result, easily correct the composition contents, and do composition matching the set purpose.

Figure 65:
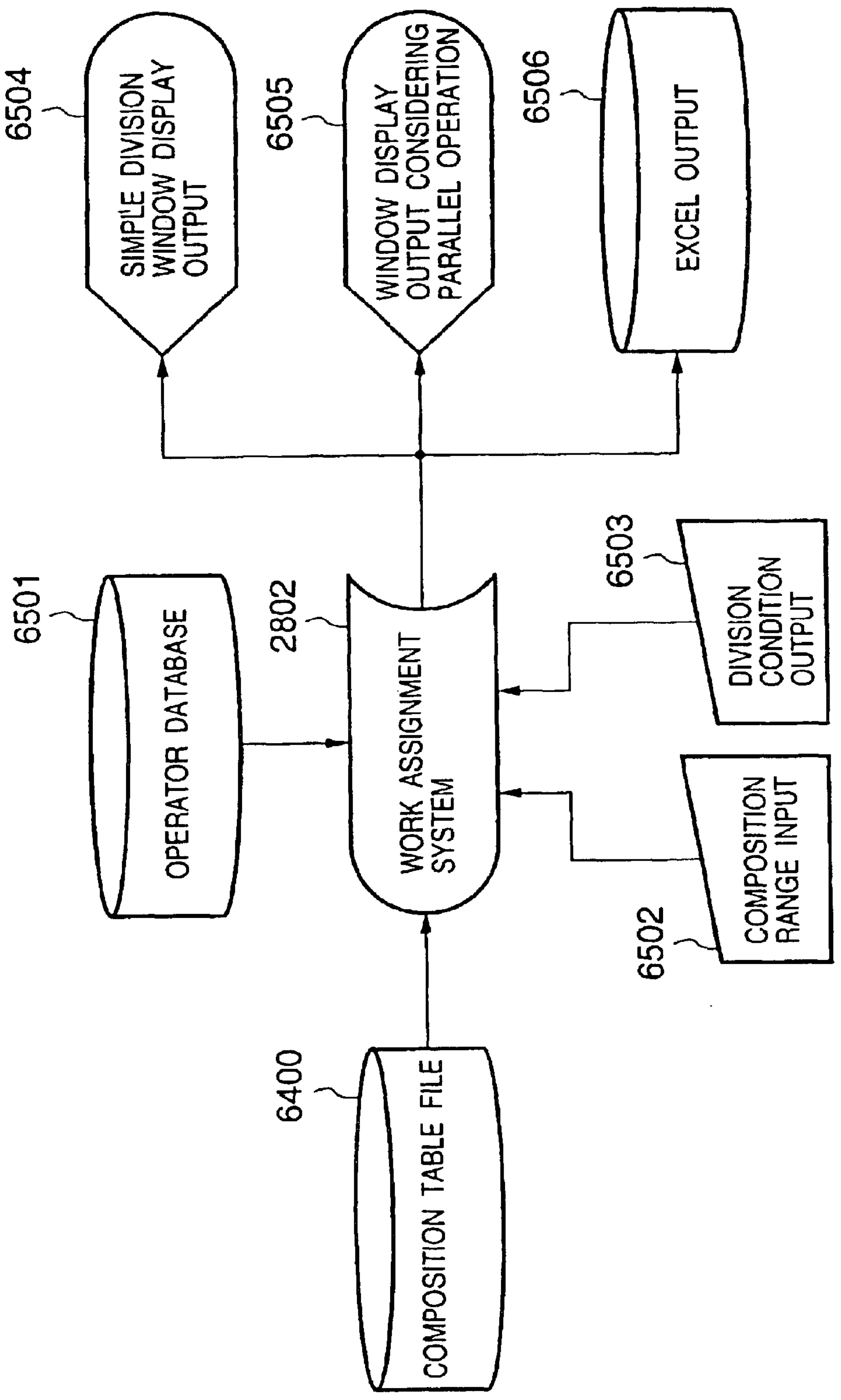
FIG. 65 is a view for explaining the file structure of the work assignment system 2802.

FIG. 65 illustrates inputs to the work assignment system 2802 and outputs from the work assignment system 2802.

Referring to FIG. 65, the work assignment system 2802 receives the range to be composed as range data 6502. Work data downloaded in accordance with this range is used for the composing operation. Also, division condition data 6503 for division to stations is input as a condition for composition.

Composition here means that a plurality of works in an order defined by the work standard creation system 2800 are distributed to a plurality of "stations" in accordance with the order of works (including a case wherein the order is changed by the work assignment system 2802).

A station means a physical station or simply indicates a plurality of work groups put together in terms of concept. Each station is assigned a specific operator. In this assignment, the work assignment system 2802 assigns a specific operator on the basis of the information of each operator (experience time or the degree of skill for a work), which is stored in an operator database 6501.

The work assignment system 2802 outputs a simple division window display output 6504 or window display output 6505 (considering the parallel operation of works) to the display unit such that the user can easily confirm the composition result. The composition data can also be output in the EXCEL format as an example of a general document data format.

The work assignment system 2802 provides two division methods as composition methods. As one method, works are simply divided to stations. As the other method, works are divided to stations in consideration of the parallel operation of the works (to be referred to as "parallel division" hereinafter for the descriptive convenience). For either division method, work data download from the standard manhour setting system 2801 to the work assignment system 2802 is necessary.

Figure 67:
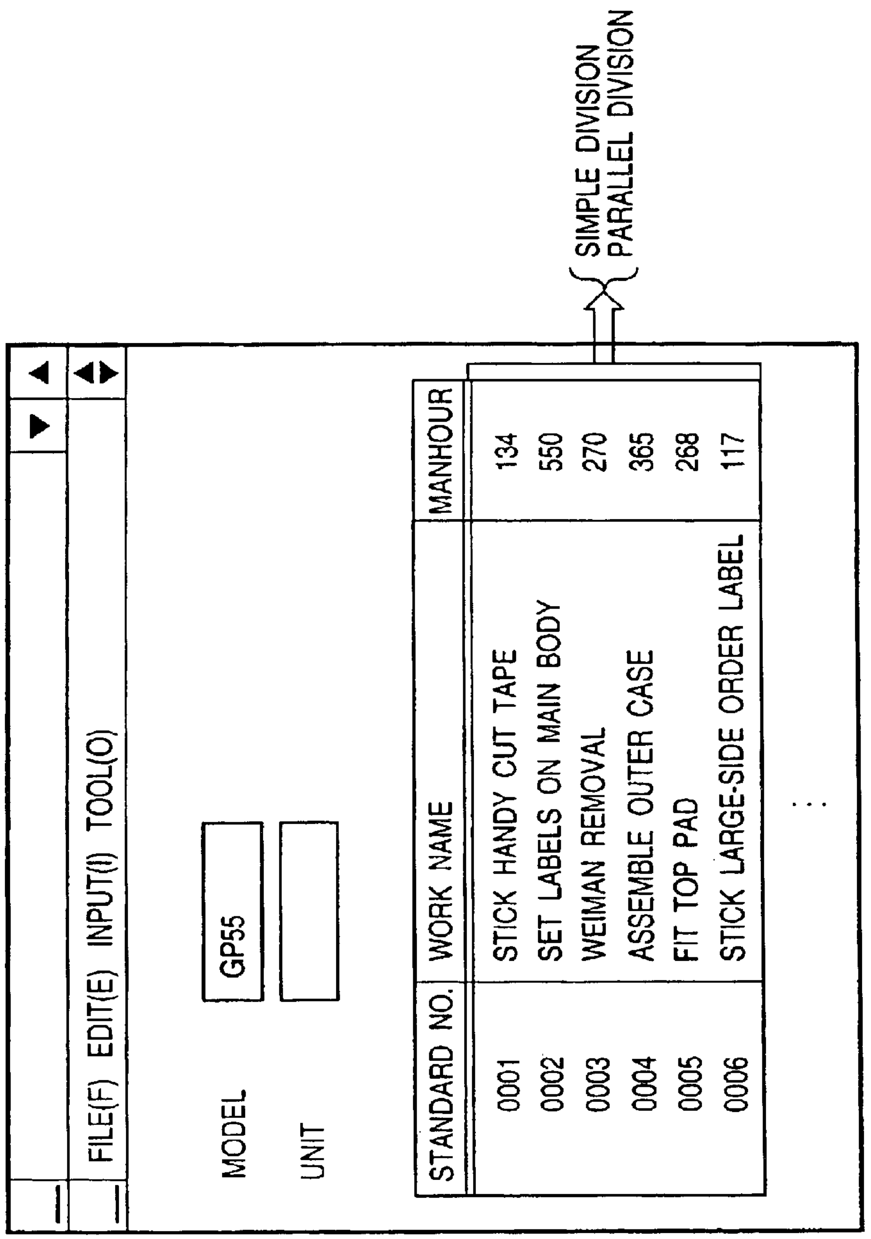
FIG. 67 is a view for explaining a window for displaying original data of simple division or parallel division in the standard manhour setting system 2801.

FIG. 67 shows an example in which some works related to the assembly work of a model "GP55" are loaded to the work assignment system 2802 and displayed on the screen of the display unit. Referring to FIG. 67, "standard No" represents the work order defined by the work standard creation system 2800 and edited or corrected by the standard manhour setting system 2801. In other words, the work assignment system 2802 initially recognizes the order of work data in the manhour setting file 3601 of the standard manhour setting system 2801 as the work order in the work assignment system 2802. For data in the range of the loaded data (or the range designated by the work assignment system 2802), simple division or parallel division is executed.

In the example shown in FIG. 67, the assembly work of one unit of model "GP55" comprises seven (or more) works NO. 1: stick handy cut tape
NO. 2: set labels on main body
NO. 3: Weiman removal
NO. 4: assemble outer case
NO. 5: fit top pad
NO. 6: stick large-side order label The manhour of these works is $$134+550+270+365+268+117=1704\ RU$$

In this case, 1 RU is 1/1000 min.

<Simple Division> . . . Work Assignment System

Generally, letting WF (unit: RU) be the total manhour in the composition, U be the number of units (the number of products) to be produced by one crew as a set of a plurality of operators per day, H (unit: RU) be the operation time of one crew (a set of a plurality of operators) per day, and E be the target composition efficiency (i.e., expected composition efficiency), the number of stations $N_{ST}$ to be divided is given by $$N_{ST}=(U\times WF)/(H\times E) \tag{1}$$

That is, when $N_{ST}$ stations are prepared, the above object can be achieved. In this setting, the time (i.e., pitch time $T_P$) required for work in each station is given by $$T_P=H/U \tag{2}$$

Figure 66:
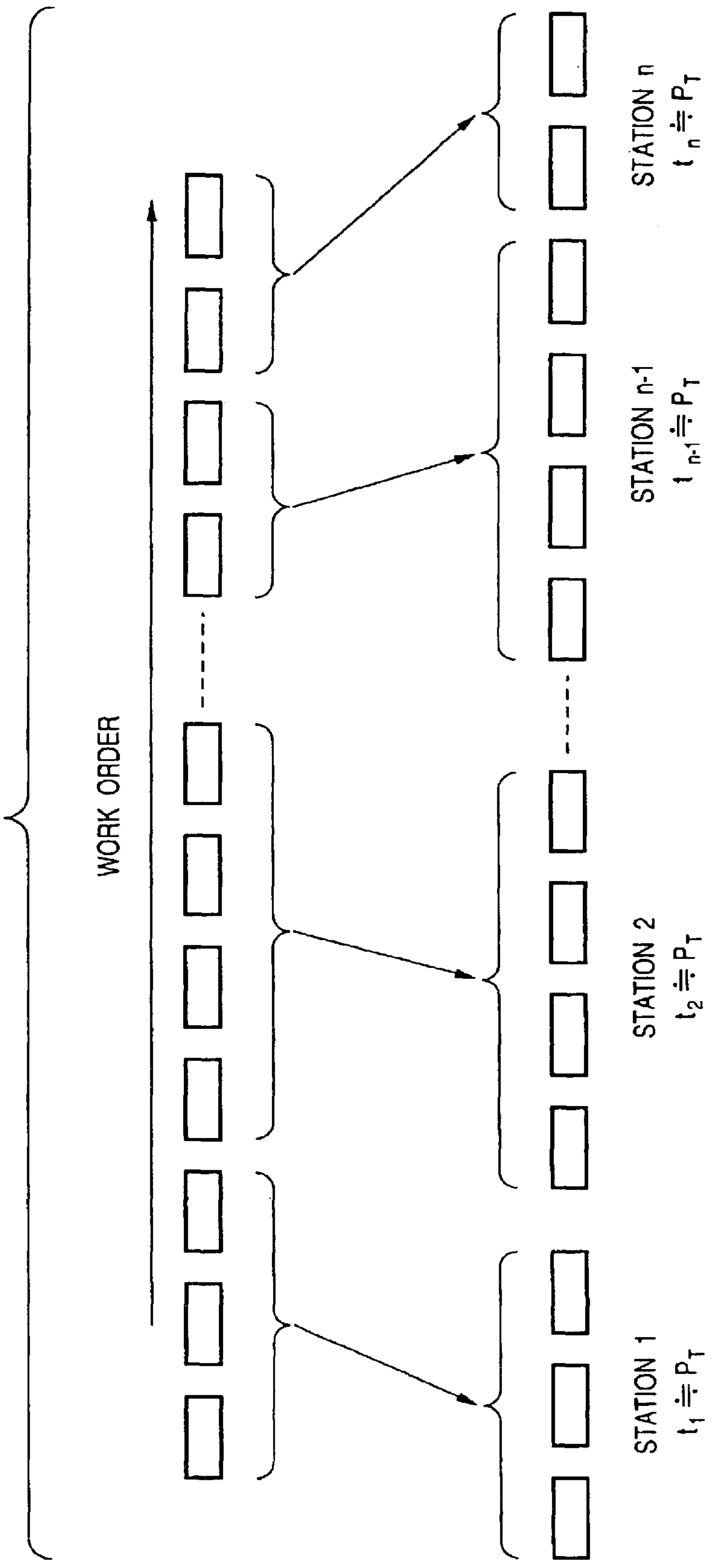
FIG. 66 is a view for schematically explaining the work composition in the standard manhour setting system 2801.

In other words, the total manhour of works assigned to one station by simple division is assigned such that it almost matches the pitch time $T_P$ in average. In the example shown in FIG. 66, $$t\mathbf{1}, t\mathbf{2}, \ldots, tn\text{-}\mathbf{1}, tn\approx T_P \tag{3}$$

FIG. 68 shows a display window in which the works shown in FIG. 67 are divided to plurality of stations, and the work contents of station 1 (St1) and station 2 (St2) are displayed. More specifically, of the seven or more works shown in FIG. 67, works Nos. 1 to 3 are assigned to station 1 (St1) and works Nos. 4 to 6 are assigned to station 2 (St2).

In the example shown in FIG. 68, the total manhour in station 1 (St1) is 954 RU, and that in station 2 (St2) is 750 RU. The total manhours "945 RU" and "750 RU" should fall within the pitch time $T_P$.

However, in an actual production workshop, composition based on the theory may lower the efficiency. As a measure against this, the work assignment system 2802 prepares a means for easily correcting/changing the contents of composition. The correction/change means is shown in FIG. 69.

Figure 69:
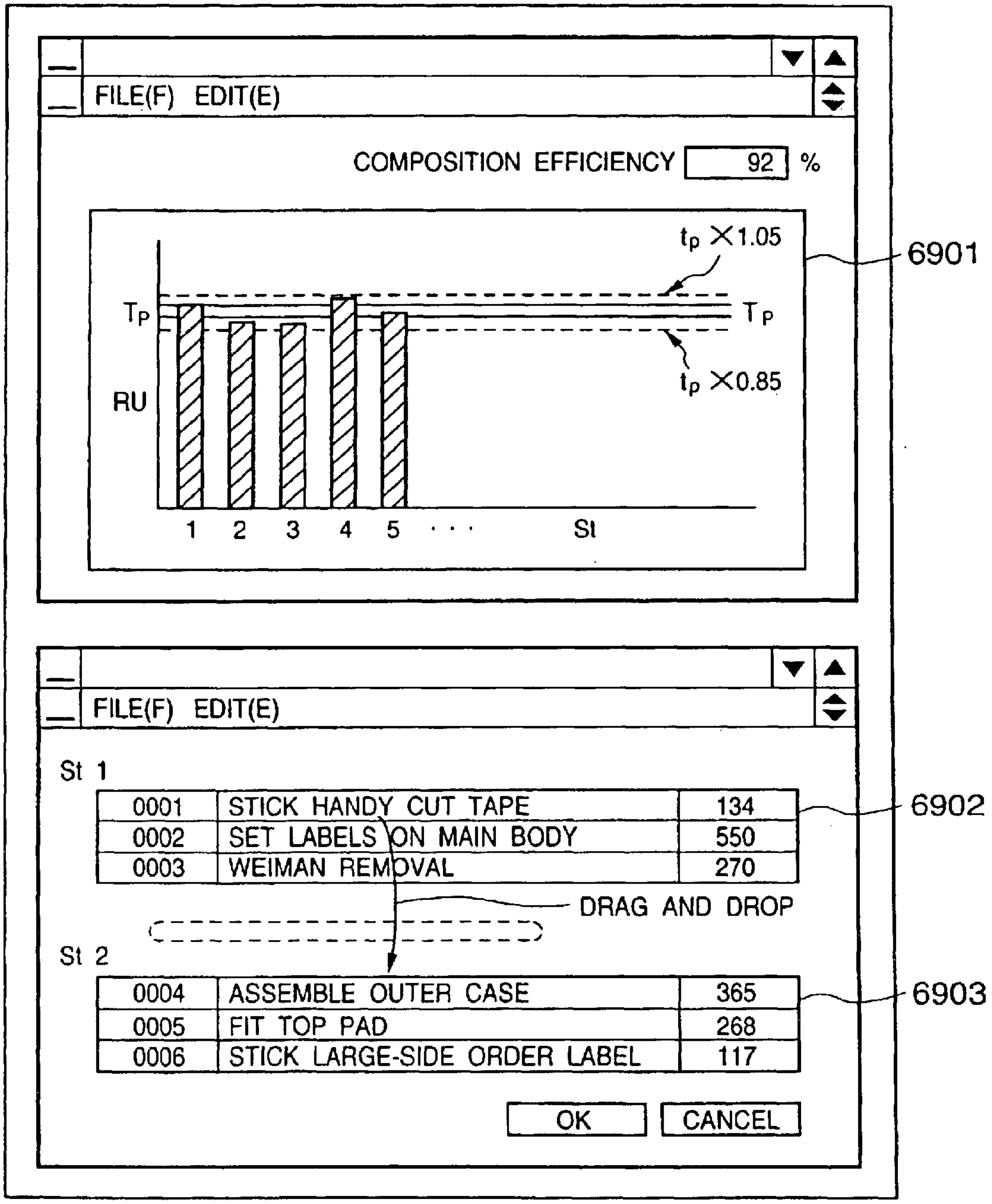
FIG. 69 is a view for explaining a user interface window in further editing the workshop divided by simple division.

FIG. 69 shows a user interface window as the correction/change means displayed on the display screen of the display unit of the work assignment system 2802. More specifically, a bar graph 6901 represents the manhours (RU) assigned to the stations as a result of simple division. Reference numerals 6902 and 6903 denote contents of works assigned to the respective stations, which correspond to the graph 6901.

Referring to FIG. 69, the bar representing the man hour of the station St1 matches the pitch time $T_P$, the bars for the stations St2 and St3 are shorter than the pitch time $T_P$, and the bar for a station St4 exceeds the pitch time $T_P$.

A certain user may average the variation in manhour between the stations by exchanging the works between the stations. In addition, a certain user may empirically know that the efficiency can be improved by moving a specific work to another station although it increases the variation in manhour.

To cope with-this, in the work assignment system 2802, a work in the station St1 and a work in the station St2 shown in the table 6902 can be exchanged. When exchange is actually done, the variation result of the total manhour in each station in accordance with the exchange is reflected to the bar graph 6901. In other words, the process change result can be visually confirmed on the bar graph.

For correction or editing in the work assignment system 2802, not only exchange of two works between different stations but also a change in work order in a single station, integration editing for integrating two works to one work, and editing for dividing one work into two works are prepared.

<Parallel Division> . . . Work Assignment System

In the simple division, works are divided to a plurality of stations simply in accordance with the work order defined by the work standard creation system 2800 or standard manhour setting system 2801. This simple division does not consider that there are some works that can be operated in parallel. Parallel division is division that takes the parallel operation of works into consideration.

Figure 70:
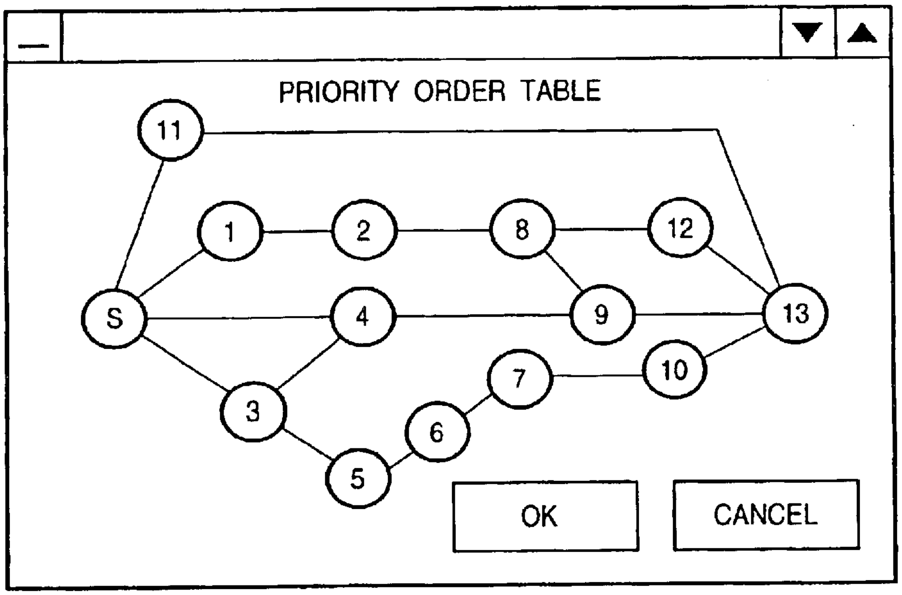
FIG. 70 is a view for explaining a user interface window for defining the parallel operation between works in parallel division.

FIG. 70 shows a user interface window for defining the parallel operability of works. For the descriptive convenience, the example shown in FIG. 70 assumes an assembly procedure for a total of 14 works with numbers S (start) to 13. Assume that the names, process number, and manhours of all works as shown in FIG. 67 are displayed on the display screen of the display unit for user confirmation.

The user defines the parallel operation of works, which is known based on the experience of himself/herself, using work icons and link lines for connecting the work icons, as shown in FIG. 70, while confirming the order of works on the table as shown in FIG. 67. In the example shown in FIG. 70, a work icon is symbolized by a circle and a work number in the circle.

In the example shown in FIG. 70, for example, since works 1, 11, and 3 are linked to work S and have no priority therebetween. Since work 4 linked to start work S must be executed subsequently after work 3 linked to start work S, work 4 cannot be handled equivalently to works 1, 3, and 11.

Figure 71:
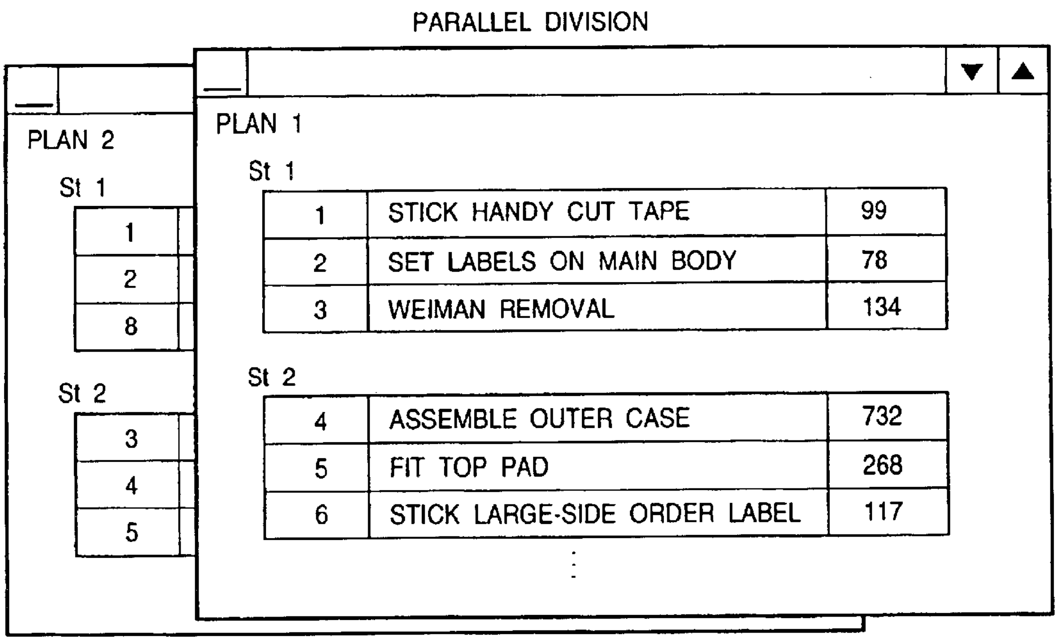
FIG. 71 is a view for explaining a plurality of composition plans created by parallel division.

Even when the order of works 1, 3, and 11 which are parallel to each other and have no priority therebetween is changed, no problem is posed. This means that when parallel operation is taken into consideration, a plurality of composition plans are available. The work assignment system 2802 proposes composition plan 1, composition plan 2, . . . . and displays them, as shown in FIG. 71.

Figure 92:
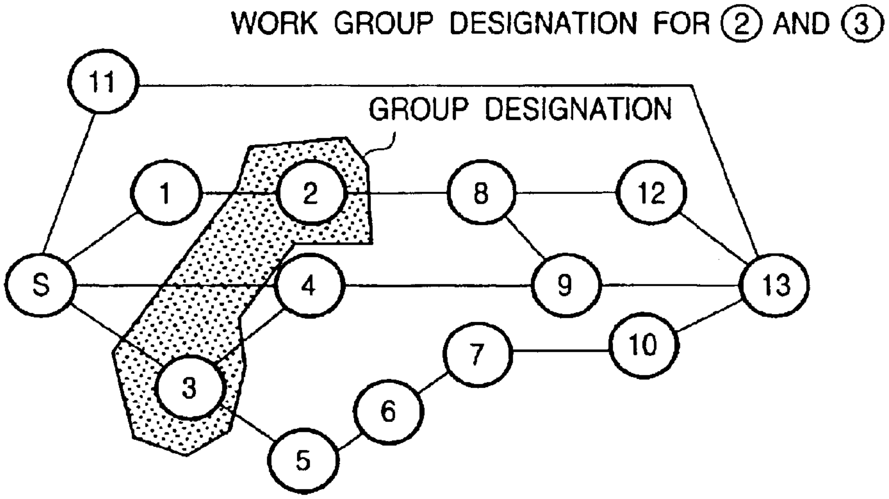
FIG. 92 is a view showing a user interface window for grouping a plurality of works in composing works.
Figure 93:
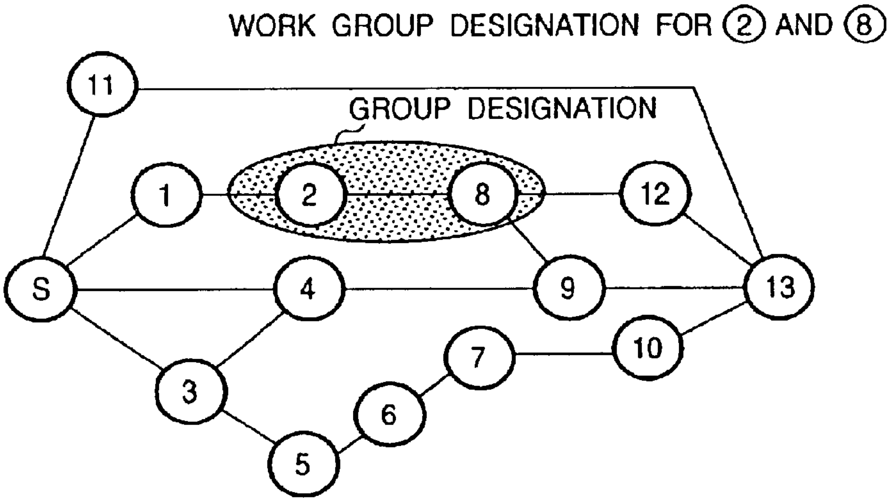
FIG. 93 is a view showing a user interface window for grouping a plurality of works in composing works.

In this system, to present a plurality of composition plans, a parallel work "group" designation function as shown in FIGS. 92 and 93 is set.

Group designation of works means that the same group code is given to a plurality of works to assign them to a single station. The group designation function is provided to designate works requiring the same tools to the same group or works using components on a single attachment surface to the same group to suppress the purchase cost for expensive tools, or designate works to the same group in order to put assembly works together to effectively use the machine manhour time for other works such that works having the same group code are prevented from being assigned to different stations.

Conventionally, the priority of assignment based on such a condition is processed by logic (rule or the like) However, since designating works using the same tools to the same group may be inconsistent to designating works using components on a single attachment surface to the same group, unique determination may result in an assignment error. In this system, a person experienced in work assignment can manually give a group code to works to be assigned to a single station before execution of automatic composition.

Figure 94:
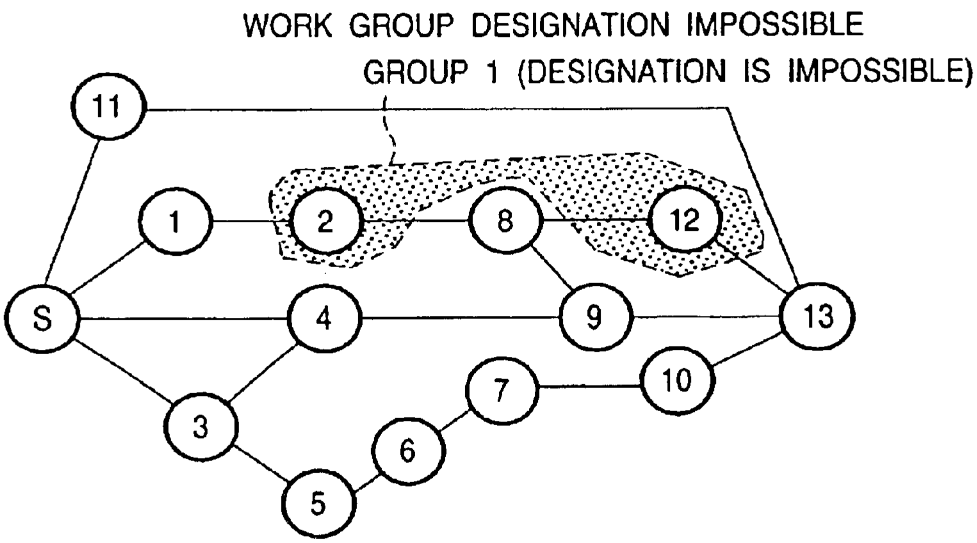
FIG. 94 is a view showing a user interface window for grouping a plurality of works in composing works.

However, group designation that impedes assignment based on the priority table is not allowed, as shown in FIG. 94.

As shown in FIG. 92, when works 2 and 3 are designated to a group, works 2 and 3 are assigned to a single station (composition plan 1 in FIG. 71).

On the other hand, as shown in FIG. 93, when works 2 and 8 are designated to a group, works 2 and 8 are assigned to a single station (composition plan 2 in FIG. 71).

As shown in FIG. 94, group 1 cannot be designated because work 8 outside the group is inserted between works 2 and 12. This is because work 8 must be executed after work 2 and before work 12 and cannot be executed when work 8 is assigned to a station different from that for works 2 and 12. To designate works 2 and 12 to the same group, work 8 inserted therebetween must also be designated to the same group.

As a result of such composition, according to composition plan 1, works Nos. 1, 2, and 3 are assigned to station 1 (St1), and works Nos. 4, 5, and 6 are assigned to station 2 (St2). On the other hand, according to composition plan 2, works Nos. 1, 2, and 8 are assigned to station 1 (St1), and works Nos. 3, 4, and 5 are assigned to station 2 (St2).

Figure 72:
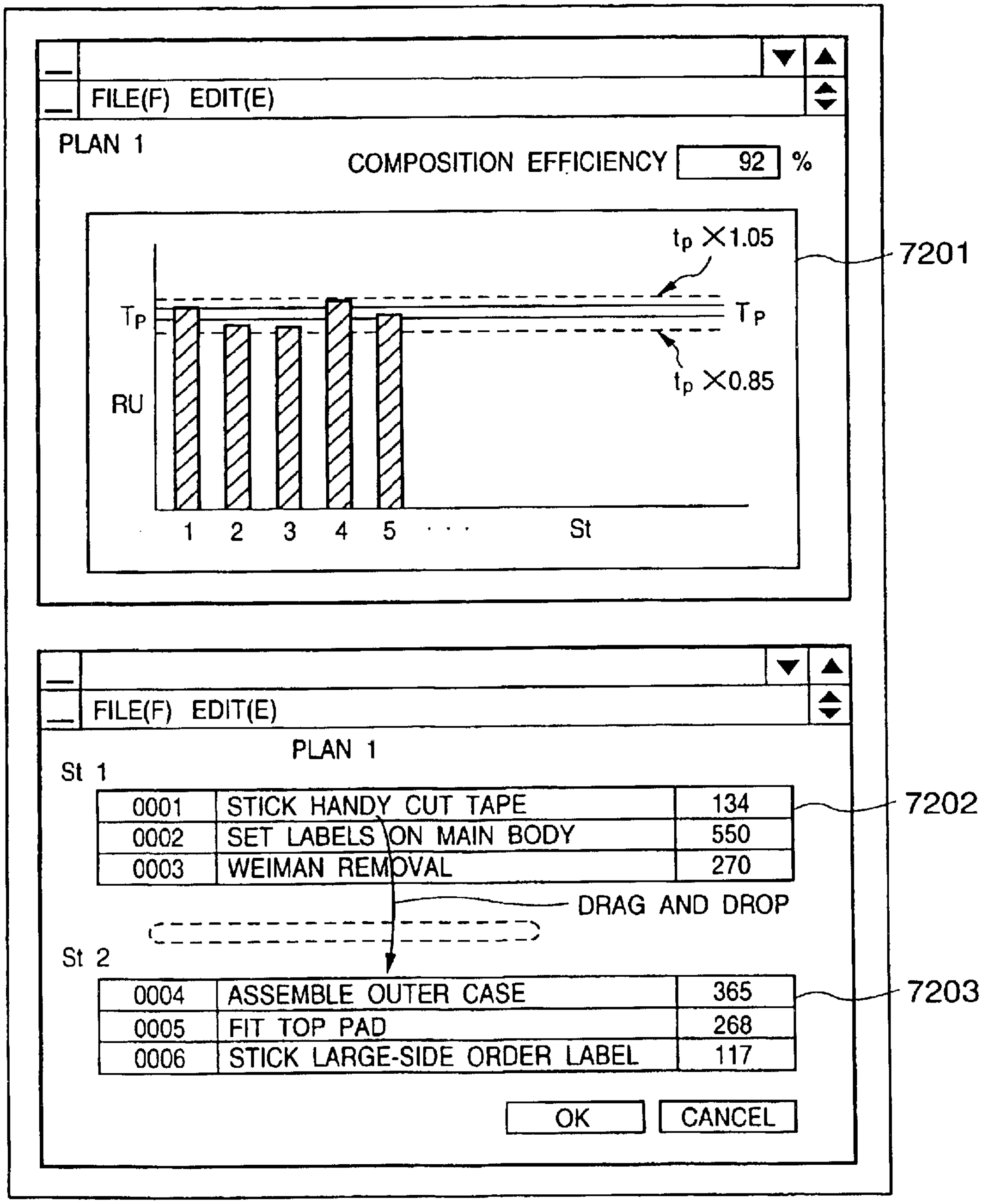
FIG. 72 is a view for explaining a user interface window in further editing composition plan 1 created by parallel division.
Figure 73:
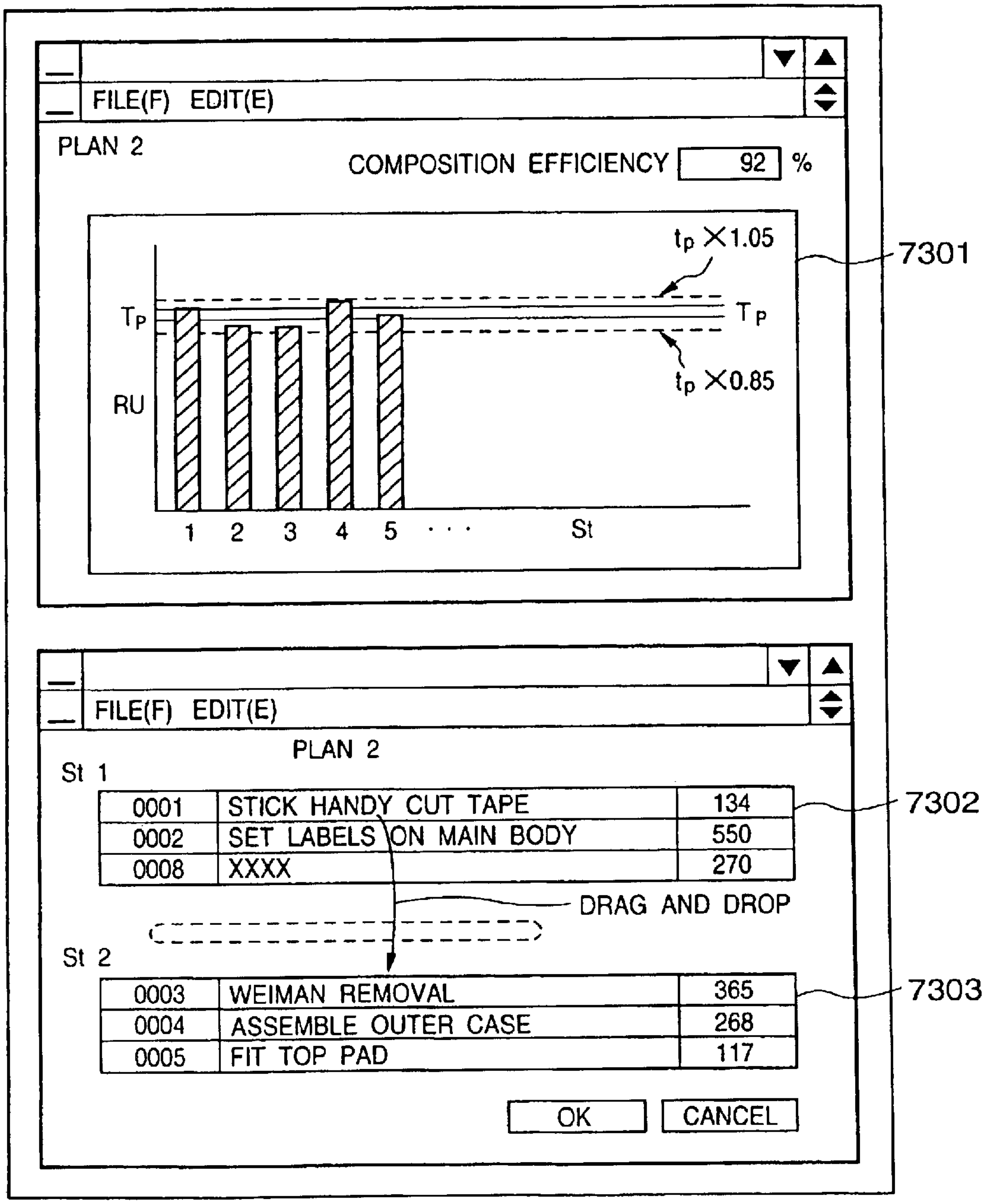
FIG. 73 is a view for explaining a user interface window in further editing composition plan 2 created by parallel division.

A user interface as a composition editing means as in simple composition as shown in FIG. 72 is prepared for each of the composition plans composed by parallel division. FIG. 72 shows a user interface for composition plan 1, and FIG. 73 shows a user interface for composition plan 2.

<Details of Control Procedure> . . . Work Assignment System

The work assignment system 2802 prepares two load sources of work data to be composed, i.e., the manhour setting file 3601 (standard manhour setting system 2801 side) and the composition table file 6400 (work assignment system 2802 side), as shown in FIG. 64. More specifically, when the work assignment system 2802 is activated, and the "load new file (N)" menu of the file menu is selected, data can be loaded from the manhour setting file 3601. When the "open (O)" menu of the file menu is selected, a target work file can be opened from the composition table file 6400.

Figure 74:
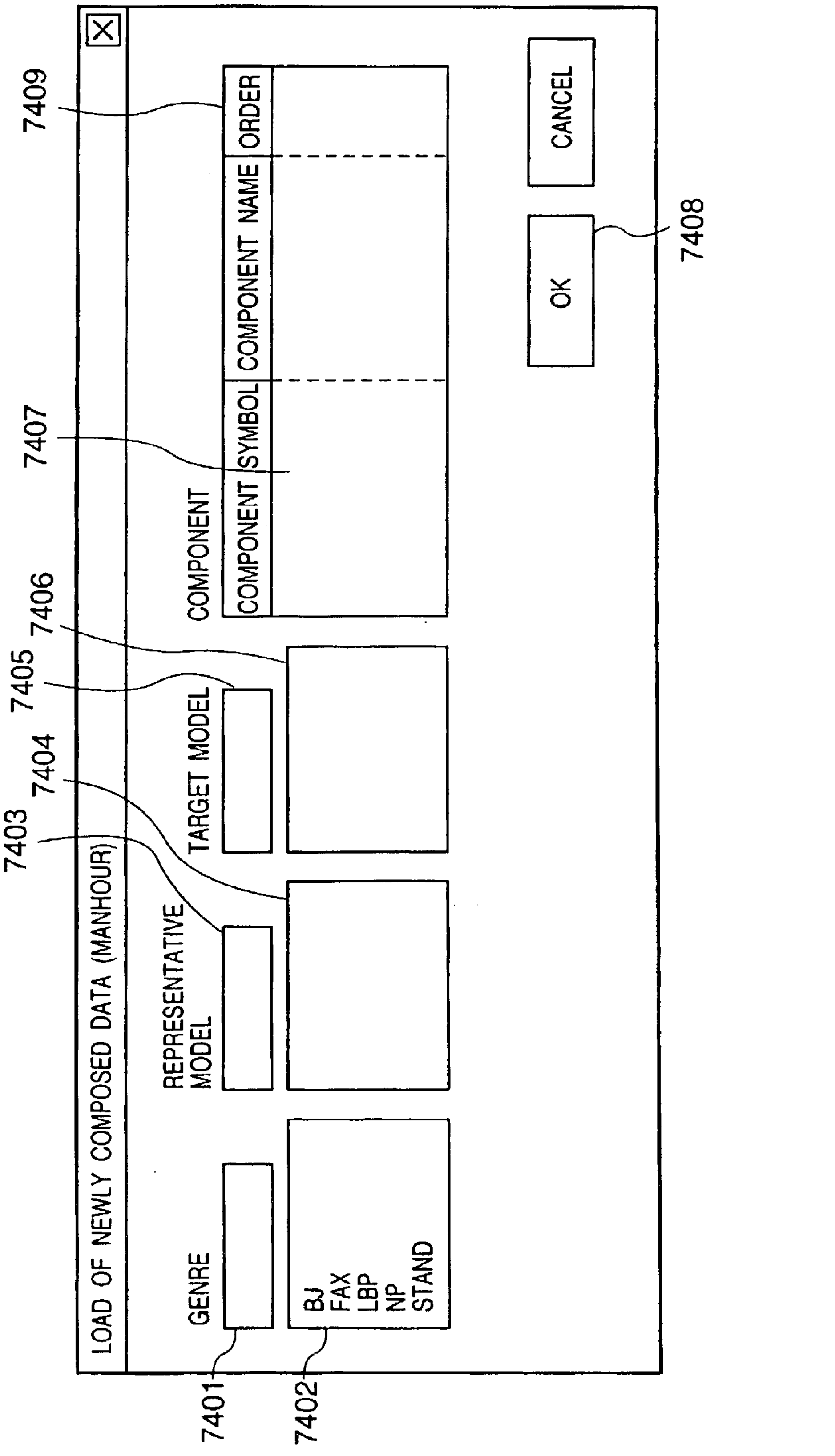
FIG. 74 is a view for explaining a user interface window for defining a load target in loading data from the standard manhour setting system 2801 in the work assignment system 2802.

FIG. 74 shows a user interface window for a data load when the "open new file (N)" menu is selected.

In this work assignment system 2802 as well, a set of work data linked by directories having a hierarchical relationship genre→representative model→target model→composition is defined, as in the work standard creation system 2800 and standard manhour setting system 2801. In other words, the set of work data linked to each other by the above hierarchical relationship defined by the work standard creation system 2800 is succeeded by the manhour setting file 3601 of the standard manhour setting system 2801 while holding the hierarchical relationship.

The hierarchical relationship and contents of work data succeeded by the manhour setting file 3601 are edited or worked by the standard manhour setting system 2801. Work data as the result must also be succeeded by the work assignment system 2802 from the standard manhour setting system 2801. For this purpose, the work assignment system 2802 has a user interface capable of designating one or more or all of the four layers as data load targets from the standard manhour setting system 2801.

As such a user interface, for example, to load data from the manhour setting file 3601 in units of genres, the name of the genre is input to a field 7401, as in the example shown in FIG. 74. In a field 7402, a set of all work data at the "genre" level present in the field 6301 of the standard manhour setting system 2801 is displayed.

In the example shown in FIG. 74, bubble-jet printer (BJ), facsimile apparatus (FAX), laser beam printer (LBP), and the like are displayed as genres. When one genre is selected in the field 7401, and an "OK" button 7408 is clicked, a set of all work data belonging to the genre is downloaded from the manhour setting file 3601.

If the user wants download in units of "representative models", the name of a genre to which the representative model belongs is input to the field 7401. Then, the names of all representative models belonging to the selected genre are displayed in a field 7404. When, of these displayed names, the name of a desired "representative model" is double-clicked, the name is copied to a field 7403, and then, the "OK" button 7408 is clicked.

If the user wants download at the "target model" level, the name of the target model is input to a field 7405, or a field 7406 is selected, and then, the "OK" button 7408 is clicked.

The work assignment system 2802 has a user interface capable of setting to download a plurality of "components" at the "component" level at once. In a field 7407 shown in FIG. 74, the names of all components belonging to a "target model" of a "representative model" in a "genre" are displayed, so a plurality of "components" can be selected while designating the download order thereof. To designate the download order, sequential numbers are input to an order column 7409 of the "components" selected by clicking of the mouse.

The user interface shown in FIG. 74 and, more particularly, arbitrary setting at the component level has the following advantage.

Figure 75:
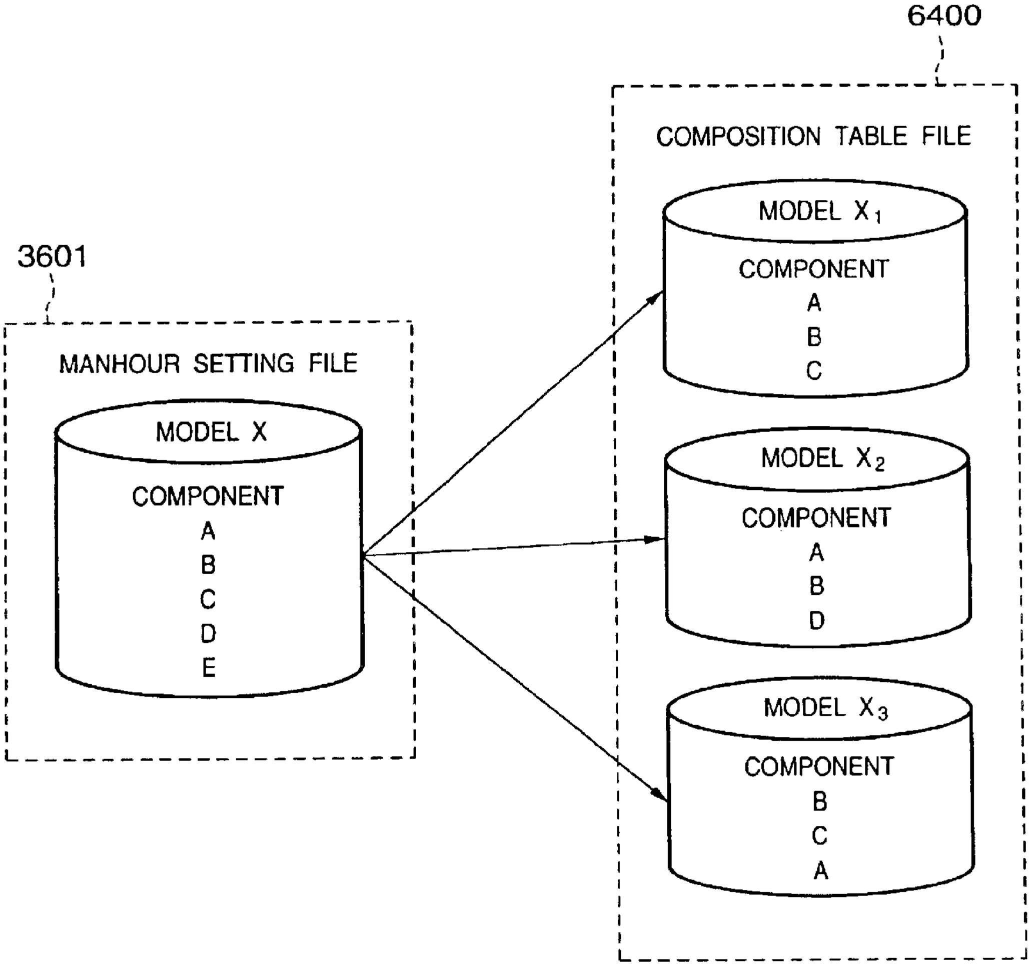
FIG. 75 is a view for explaining the reason why the data load range can be changed and defined in various ways in the work assignment system 2802.

For example, assume that work data of a model named "X" is stored in the manhour setting file 3601, and components "A", "B", "C", "D", "E", . . . belong to the model "X", as shown in FIG. 75. When the user interface shown in FIG. 74 is used, model "X1" (including the components "A", "B", and "C"), model "X2" (including the components "A", "B", and "D"), model "X3" (including the components "B", "C", and "A"), . . .

can be downloaded from the model "X", as shown in FIG. 75. When these new models "X1", "X2", and "X3" are downloaded, they are registered in the work assignment system 2802 as new directories. The reason for this is as follows. Since the work composing operation is close to the site of assembly, it is preferable to allow the user to determine work composition with components more appropriate to the site of assembly and also, even for the same model, define work composition whose components are easily changed.

To create a plurality of different "model" directories from one "model" directory, the work assignment system 2802 adds "?n" (n is a number) to the directory name of the original "model".

Figure 76:
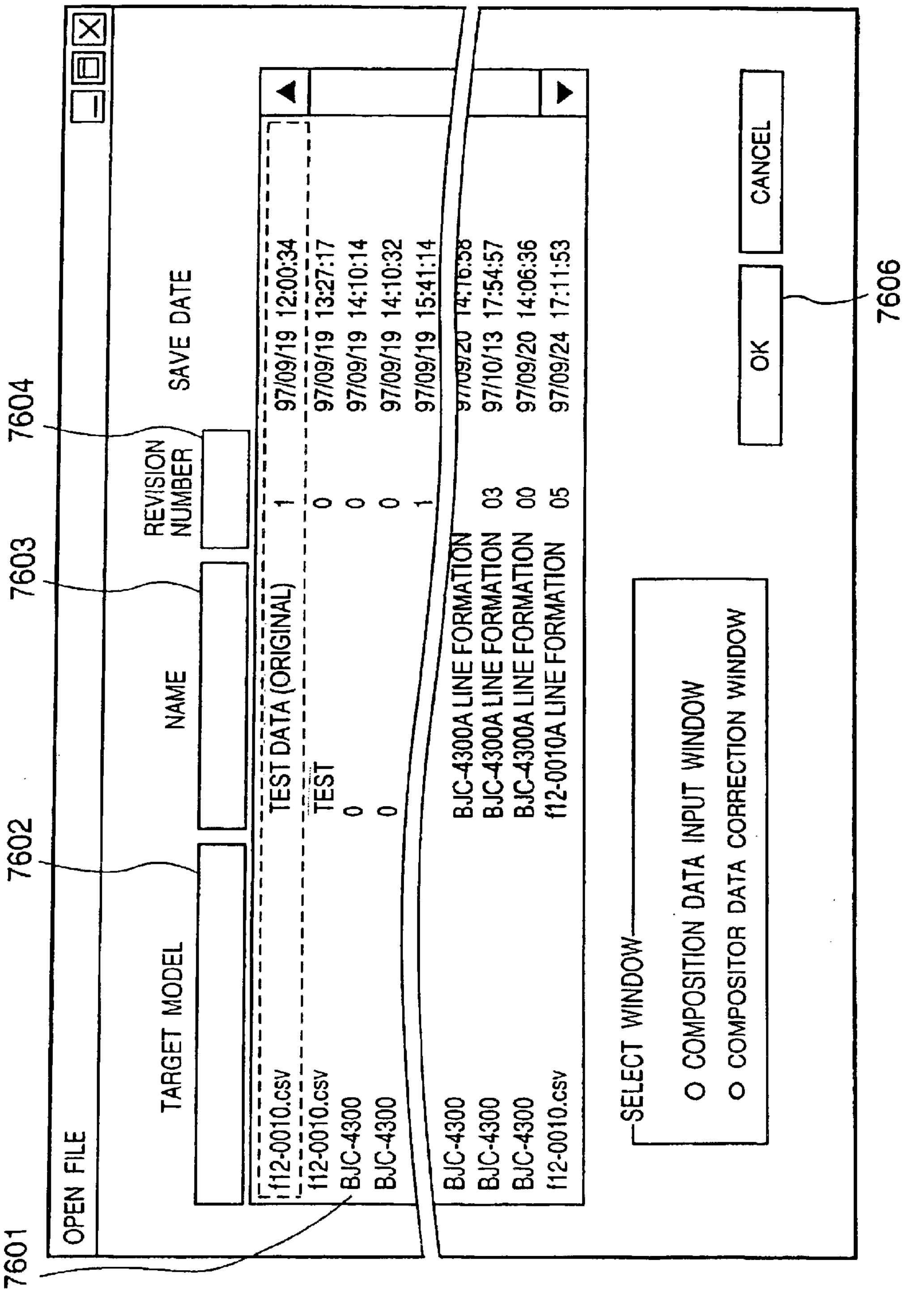
FIG. 76 is a view for explaining a user interface window in opening an existing file in a composition table file 6400.

FIG. 76 shows a user interface window for opening an existing file in the composition table file 6400. In the work assignment system 2802, to open an existing file, files are selected in units of "target models". The "target model" includes the "target model" defined in the field 7405 in FIG. 74 and the "target models" newly automatically defined in FIG. 75.

The user clicks on one of a plurality of "target models" displayed in the field 7601 using the mouse or inputs the name of a desired "target model" to a field 7602. The "revision number " of the selected "target model" is displayed in a field 7604. Whether the composition data input window or composition data editing window for the selected "target model" is to be displayed is selected by check buttons 7605.

Figure 77:
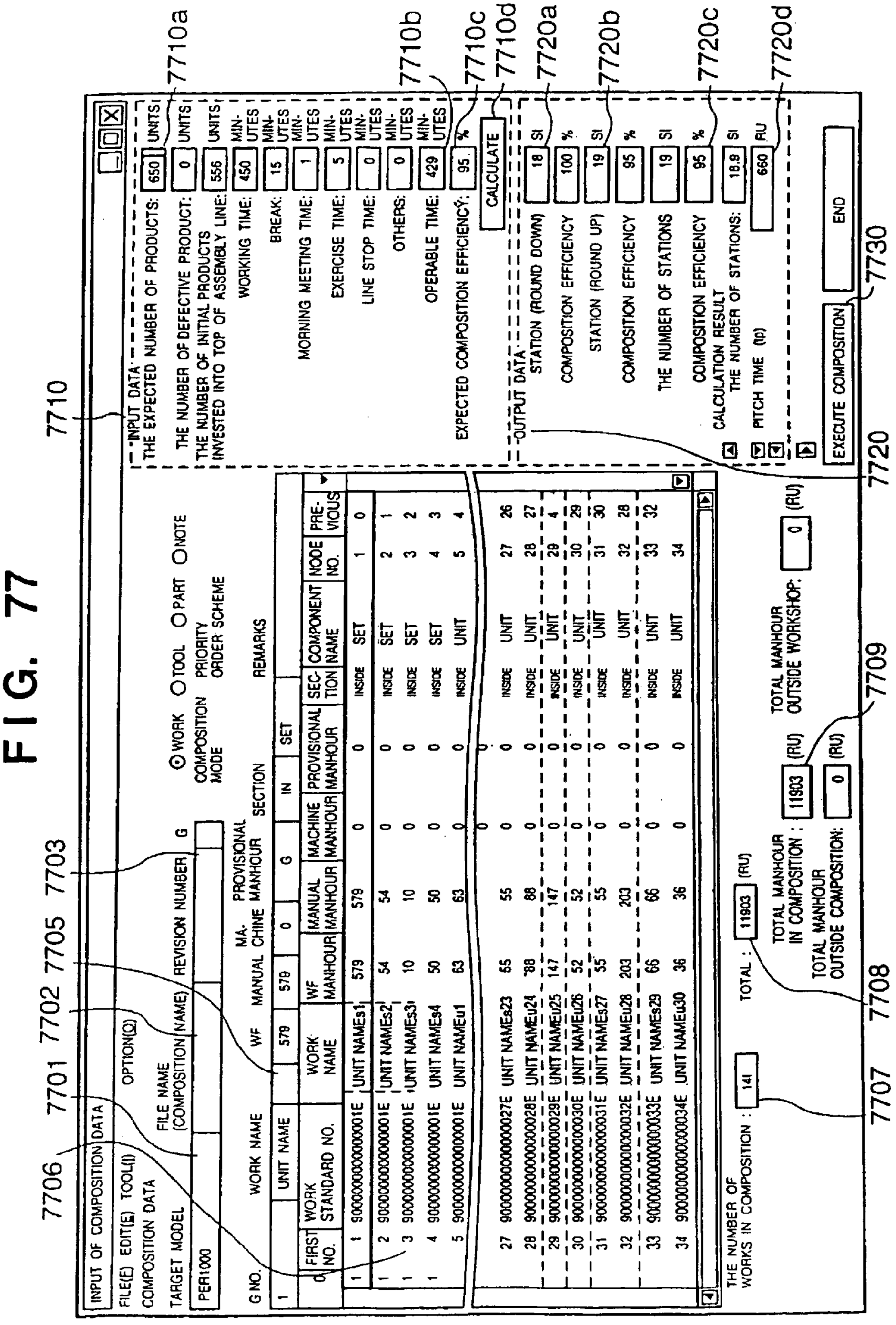
FIG. 77 is a view for explaining a state wherein the work data loaded in the memory of the work assignment system 2802 are displayed for each "target model"

Referring to FIG. 77, work data loaded to the memory of the work assignment system 2802 by the above-described download or file open operation are displayed in units of "target models".

More specifically, the work data are displayed as a list in a field 7706. The name of the target model is displayed in a field 7701, the file name is displayed in a field 7702, and the revision number is displayed in a field 7703. A "total work count" $N_{TW}$ for the "target model" is displayed in a field 7707, and the total manhour is displayed in a field 7708.

The number or name of a work selected in the field 7706 with the mouse is displayed in a field 7705. The total manhour in composition is displayed in a field 7709.

An input for defining conditions for composition is done in a window 7710. Bibliographic data of the composition result are displayed in a window 7720.

Data_related to the above-described equation (1) are input to the input window 7710. More specifically, the user inputs the number of units (the number of products) U to be produced by one crew as a set of a plurality of operators per day to a field 7710*a*, time (i.e., operation time of each station) H (unit: RU) obtained by subtracting an exclusive time such as a break from one-day working time of one crew (a set of a plurality of operators) to a field 7710*b*, and the target composition efficiency (i.e., expected composition efficiency) E to a field 7710*c*. As the total manhour in the composition, which is represented by equation (1), the total manhour (field 7709) not input by the user but calculated by the system is used, as described above.

When "calculate" button 7710*d* is clicked, the number of stations $N_{ST}$ is calculated in accordance with equation (1), and the pitch time $T_P$ is calculated in accordance with equation (2) on the basis of the conditions input to the window 7710.

The number of stations $N_{ST}$ is automatically calculated in accordance with $N_{ST}=(U\times WF)/(H\times E)$ (equation (2)) and displayed in a field 7720*a* when the value is rounded down or in a field 7720*b* when the value is rounded up, together with the composition efficiency. That is, when the number of stations $N_{ST}$ is rounded down, the composition efficiency becomes higher than the target composition efficiency (field 7710*c*), and when the number of stations $N_{ST}$ is rounded up, the composition efficiency becomes lower than the target composition efficiency.

The pitch time $T_P$ is displayed in a field 7720*d*.

The user can edit the composition in units of works while looking at the window shown in FIG. 77. The editing commands are "divide", "integrate", "insert before", "insert after", "delete", "change work order", "in composition", and "outside composition". These editing menus are done from the editing menu provided by the window system or by selecting a desired work with the mouse and clicking the right button of the mouse.

To "divide" a work means that one unit work is divided into two unit works. The manhour value of each divided unit work is "0". The number of each divided element work has a subnumber. The name of each divided element work has an indent.

To "integrate" works means that two element works are integrated to one unit work. The manhour of the integrated unit work corresponds to the sum of manhours of the respective element works as integration targets.

With the "insert before" menu for a work, a work designated by the dialog shown in FIG. 78 is inserted before a selected work. More specifically, the name of work to be inserted is written in a field 7801, and a temporary manhour value is written to a field 7802.

The "insert after" menu for a work is almost the same as the above "insert before" menu.

With the "change work order" menu, the positions of two works are exchanged.

With the "in composition" or "outside composition", it is determined whether a work is to be subjected to composition or excluded from the composition targets.

The operation of composing all works of the "target model" is started by clicking on an "execute composition" start button 7730.

Figure 79:
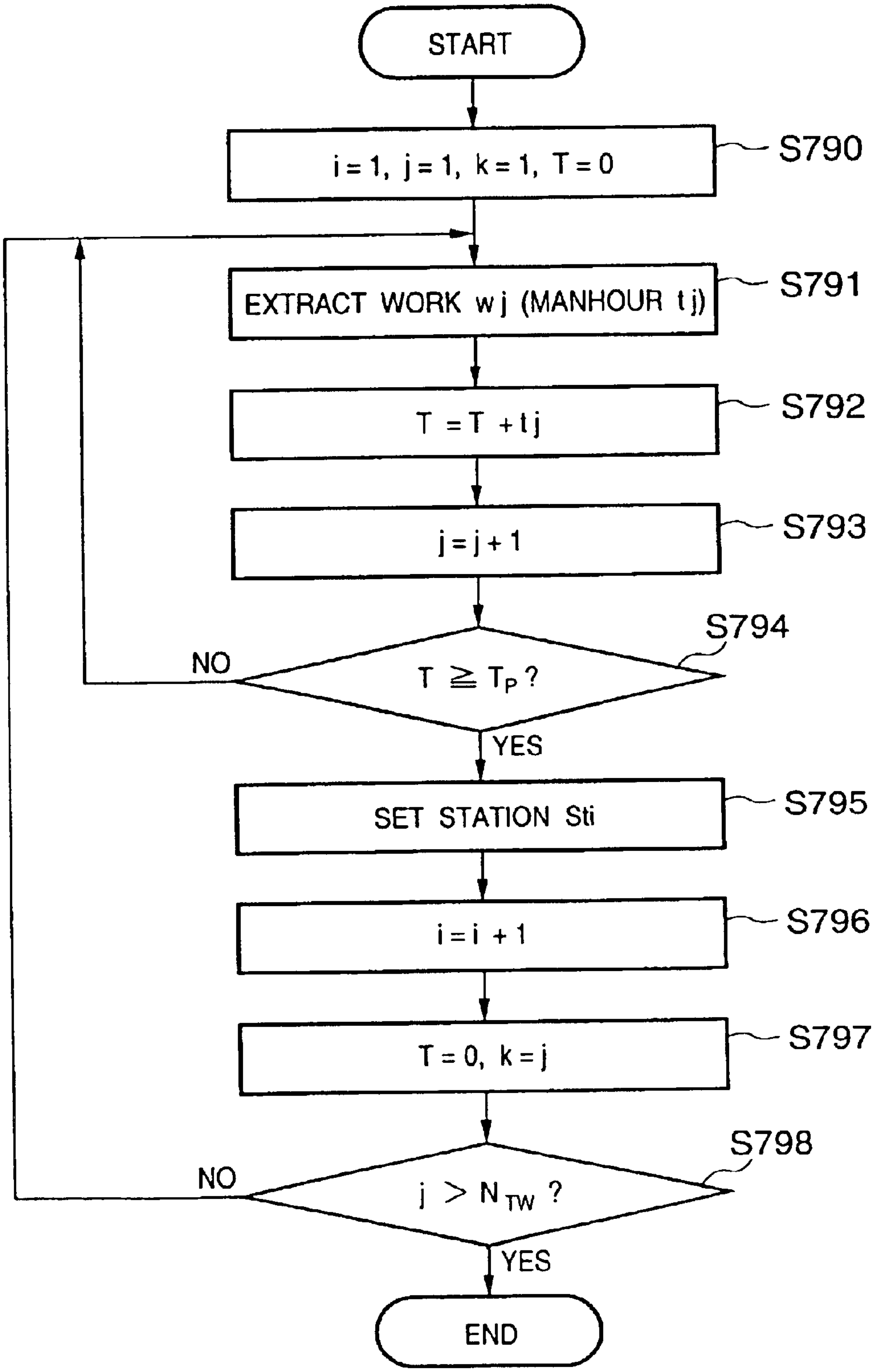
FIG. 79 is a flow chart for explaining the control procedure of simple division by the work assignment system 2802.

FIG. 79 is a flow chart for explaining the control procedure of composition. In step S790, counters i, j, and k for work are initialized to "1", and a register T for storing the accumulation time of manhours for each station is initialized to "0".

In step S791, data of a work wj (manhour tj) indicated by the counter j is extracted. In step S792, the manhour tj is accumulated to the time register T. In step S793, the counter j is incremented by one. In step S794, it is determined whether the manhour value accumulated in the time register T exceeds the pitch time $T_P$. If NO in step S794, the flow returns to step S791 to repeat the above-described operation.

That the accumulated manhour value T of manhours tk to tj exceeds the pitch time $T_P$ means that works wk to wj should belong to a station Sti, so the works wk to wj are assigned to the station Sti. In step S796, the counter i is incremented to prepare for setting the next station. In step S797, the counter k is returned to "j", and the time register T is initialized to "0".

In step S798, it is determined whether the counter value j representing the work number exceeds the total number of works $N_{TW}$. If YES in step S798, the processing is ended.

The control procedure shown in FIG. 79 determines assignment of works to stations with priority on the manhour. That is, assignment is determined that the accumulated manhour value T preferentially should not exceed the pitch time $T_P$. The number of assigned stations may eventually be larger than the number of stations $N_{ST}$ set as a target, and if so, the composition efficiency changes accordingly.

For work assignment, a determination method with priority on the number of stations (FIG. 95) or an assignment determination method based on the accumulated manhour value (FIG. 96) can be proposed as a modification.

Figure 95:
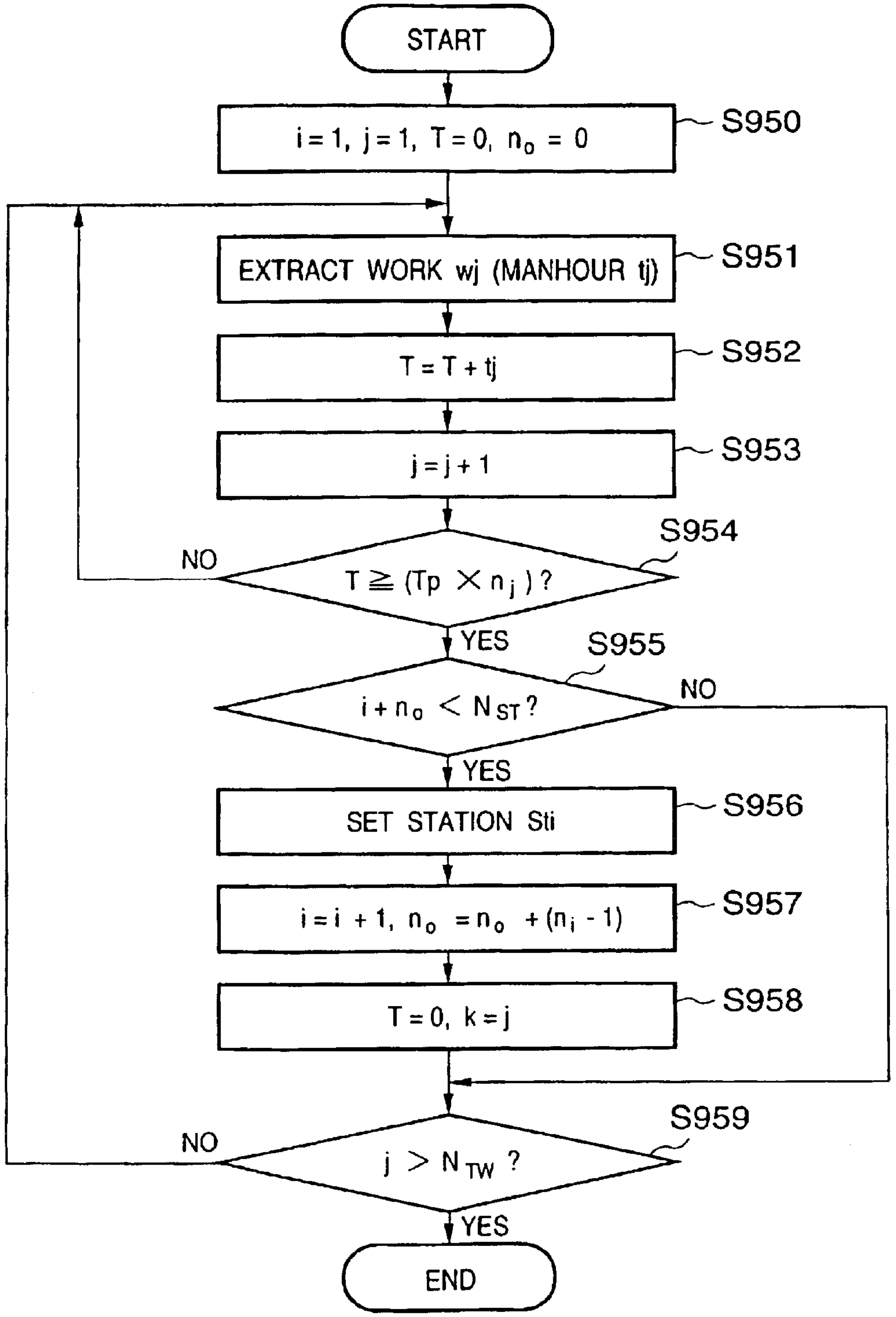
FIG. 95 is a flow chart for explaining a control procedure for work assignment as a modification to FIG. 79, i.e., a composition control procedure that the number of stations assigned works preferentially should not exceed the number of stations $N_{ST}$.

The assignment method shown in the flow chart of FIG. 95 gives priority on that the total number of stations to be assigned works should not exceed the upper limit value $N_{ST}$. For this purpose, variables, a parallel number ni and total accumulated parallel sum number n0, are newly introduced, unlike the control shown in FIG. 79. The parallel number ni is the number of stations that can be parallel-operated in the stations i.

In step S950, the counters i, j, and k for work are initialized to "1", the register T for storing the accumulated time of manhours for each station is initialized to "0", and the total accumulated parallel sum number n0 is initialized to "0". In step S951, data of the work wj (manhour tj) indicated by the counter j is extracted. In step S952, the manhour tj is accumulated to the time register T.

That is, the accumulated manhour value of the manhours tk to tj is stored in the time register T. In step S953, the counter j is incremented by one. In step S954, it is determined whether the manhour value for the station i exceeds the pitch time $T_P$. Since the station i is allowed to parallel-operate ni stations in advance, and the manhour that can be assigned to the station i is $T_P$×ni, more works can be assigned to the station i when $$T<T_P \times ni \tag{4}$$

When $$T \geqq T_P \times ni \tag{5}$$

no more works can be assigned to the station i. In step S954, such determination is done. In step S955, $$i+n0<N_{ST} \tag{6}$$

is determined to confirm that the total number of stations assigned works does not exceed the upper limit value $N_{ST}$. More specifically, when equation (5) holds for a certain station i (the assigned manhour T exceeds the pitch manhour ($T_P$×ni) considering parallel operation), the station Sti is newly set in step S956 unless the total number of stations (i+n0) set so far exceeds the upper limit value $N_{ST}$.

The purpose of step S955 is to prevent the number of assigned station from exceeding $N_{ST}$ by assigning works beyond the pitch manhour $T_P$ to the final station.

If YES in step S955, the counter i is incremented in step S957 to prepare for setting the next station, and the register n0 is updated in accordance with $$n0=n0+(ni-1) \tag{7}$$

where ni in (ni−1) is the parallel number defined in advance for incremented i, i.e., the station i to be taken into consideration next. Hence, n0 in equation (7) is the accumulated value of parallel numbers set for the first to (i−1)th stations. In step S958, the counter k is set to "j", and the time register T is initialized to "0".

In step S959, it is determined whether the counter value j representing the work number exceeds the total number of works $N_{TW}$. If YES in step S959, the processing is ended.

As described above, in the control procedure shown in FIG. 95, to prevent the number d of assigned stations St from exceeding the number of stations $N_{ST}$ set as a target, all works remaining at the time of end of assignment to the station (i−1) are assigned to the final station (i.e., station i). With this method, the number of assigned stations is prevented from exceeding $N_{ST}$ by assigning works beyond the pitch manhour $T_P$ to the final station.

However, in the method shown in FIG. 95, the load (manhour) may be concentrated to the final station. To prevent this, the assignment method shown in the flow chart of FIG. 96 has as its object to keep the number of stations $N_{ST}$ set as a target and distribute the load (manhour) without concentrating the load to the final station such that the variation in manhour between the stations is easily evened. To do this, unlike the control shown in FIG. 95, let Ti be the manhour to be assigned to the station i, and T0 be the accumulated manhour assigned to all stations assigned works. Additionally, a new variable, station manhour $T_A$ is introduced.

The station manhour average value $T_A$ is defined by $$T_A=WF/N_{ST} \tag{8}$$

When equations (1) and (2) are taken into consideration.

$$T_A=E \times T_P \tag{9}$$

In the control procedures shown in FIGS. 79 and 95, the pitch time $T_P$ defined by equations (1) and (2) is used as a reference for determination whether the station Sti is to be set. However, the control procedure shown in FIG. 96, the station manhour average value $T_A$ defined by equation (8) is used as data for determination whether the station Sti is to be set.

Figure 96:
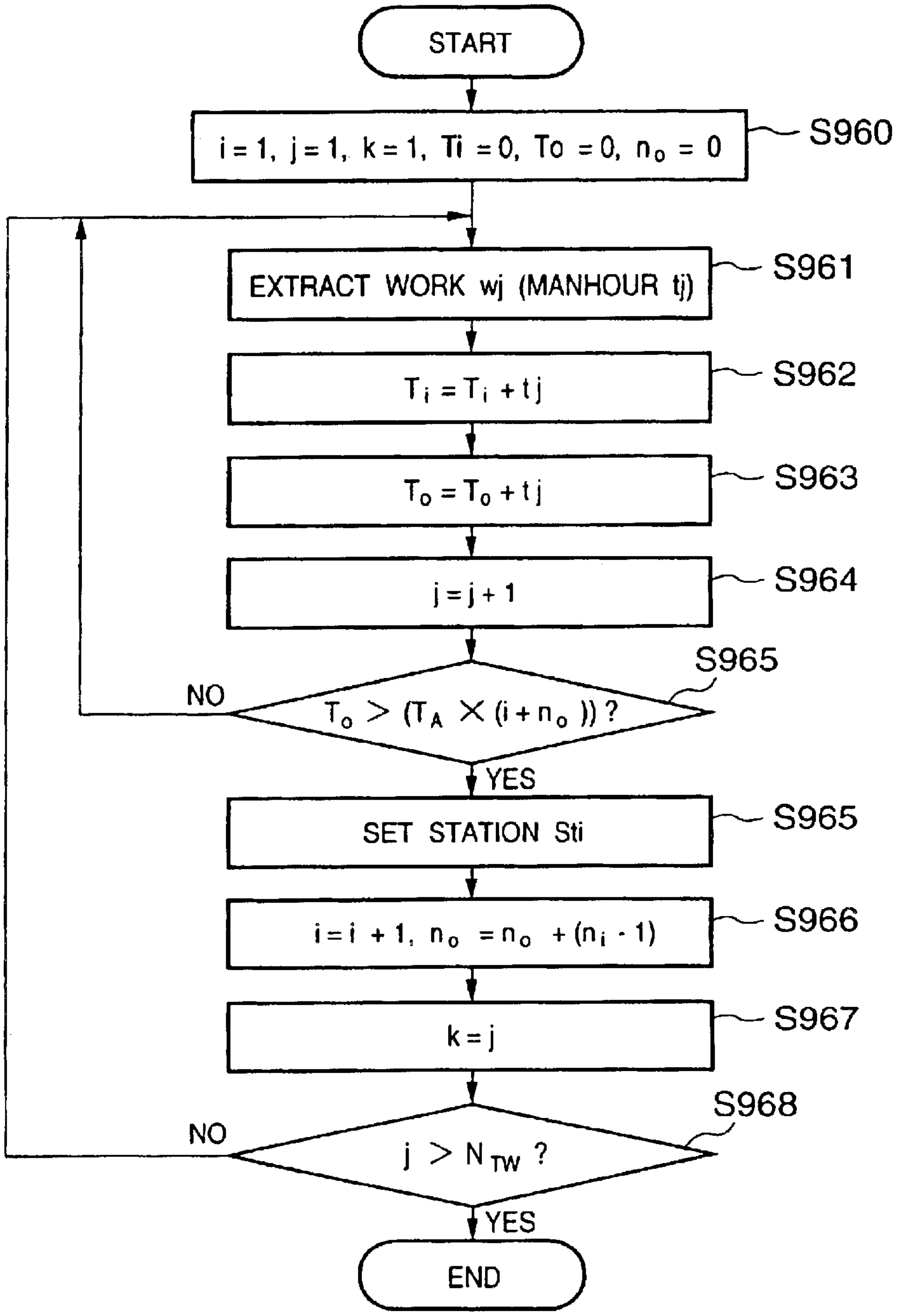
FIG. 96 is a flow chart for explaining a control procedure for work assignment as another modification to FIG. 79, i.e., a composition control procedure for preferentially averaging the manhours of works assigned to stations.

In step S960 of FIG. 96, the counters i, j, and k for work are initialized to "1", the register T for storing the accumulated time of manhours for the station i is initialized to "0", the total accumulated manhour T0 is initialized to "0", and the total accumulated parallel sum number n0 is initialized to "0". In step S961, data of the work wj (manhour tj) indicated by the counter j is extracted.

In step S962, the manhour tj is accumulated to the time register T. That is, the accumulated manhour value of the manhours tk to tj for the station i is stored in the time register T. In step S963, the manhour tj is accumulated to the time register T0 to update the total accumulated manhour T0. In step S964, the counter j is incremented by one. In step S964, it is determined whether $$T0>T_A \times (i+n0) \tag{10}$$

As described above, (i+n0) is the total number of stations assigned works so far in determining whether the ith station is to be set. For this reason, when equation (10) holds, all works corresponding to the accumulated manhour Ti can be assigned to the station Sti in step S965.

In the method shown in FIG. 95, assignment is determined on the basis of the pitch time $T_P$ that is uniform to all stations. However, in the method shown in FIG. 96, the accumulated value based on the manhour average value $T_A$ is used as a reference. Hence, works are prevented from being excessively assigned to a specific station.

Figure 80:
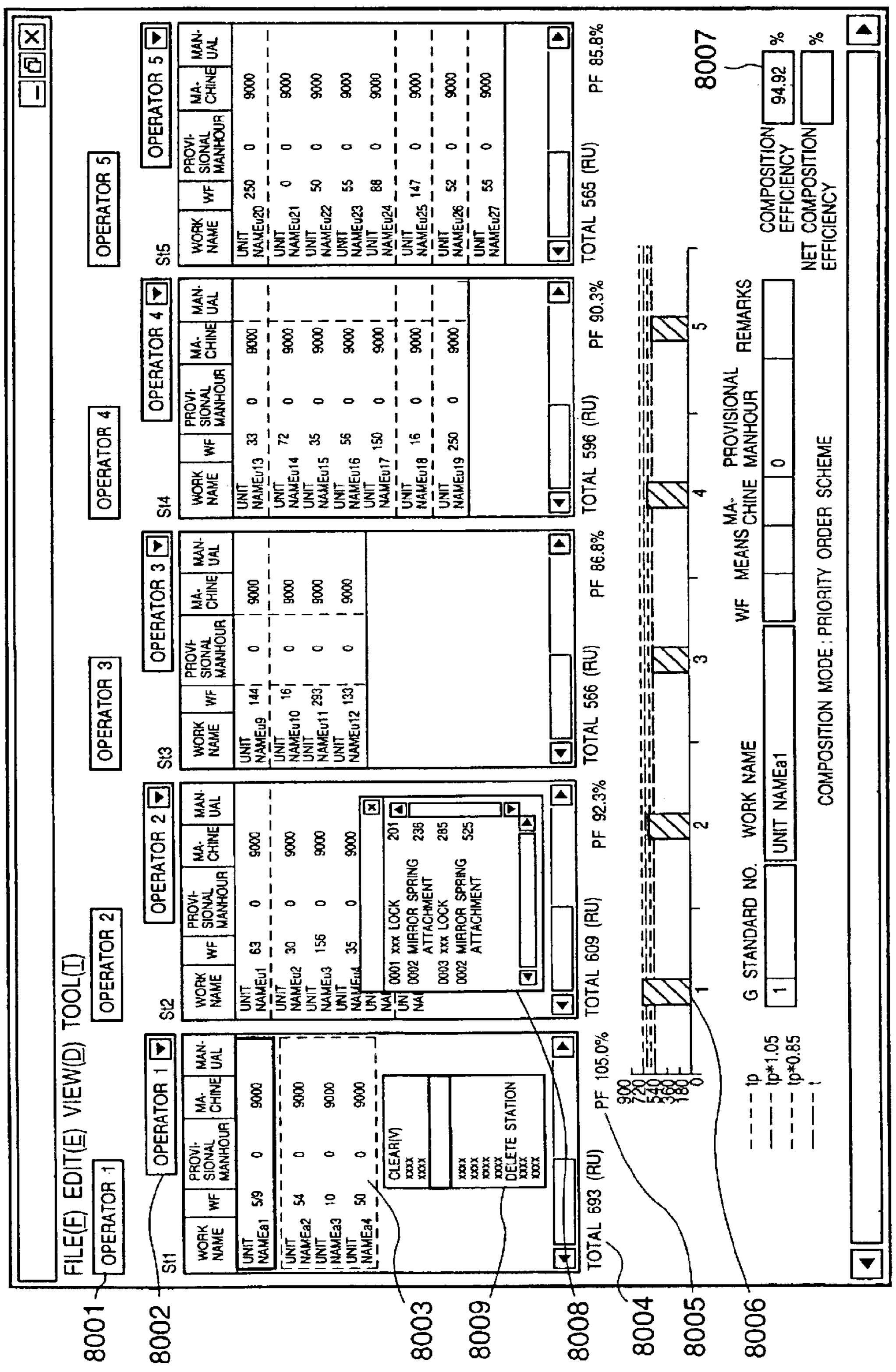
FIG. 80 is a view for explaining the states of five stations divided by simple division by the work assignment system 2802.

FIG. 80 shows an example in which the composition created by the control procedure shown in FIG. 79 is displayed. As characteristic features of the work assignment system 2802, composition can be easily corrected, as described in association with FIG. 69, and also, correction can be done while confirming the correction process in real time. Referring to FIG. 80, the work assignment states of five out of the total of $N_{ST}$ stations are displayed.

The number of stations for display is limited to five due to a limitation on the screen size of the display unit. The total manhour value of each station is stored and displayed in a field 8004.

The total manhour of each station is displayed in a bar graph (8006). The composition efficiency is displayed in a field 8007.

Reference numeral 8008 denotes a display window of works outside the composition; and 8009, a display example of a menu displayed by clicking the right button of the mouse. The work outside the composition and the works listed for the station can be exchanged.

The editing commands "divide", "integrate", "insert before", "insert after", "delete", "change work order", "in composition", and "outside composition" are allowed for works displayed in the composition target definition window shown in FIG. 77. As in this window, editing commands "divide", "integrate", "insert before", "insert after", "delete", "change work order", "in composition", and "outside composition" are also prepared for the works listed for the five stations displayed on the window shown in FIG. 80. In the compositor data correction window, the "change work order" menu is displayed as a "move" menu.

The function of "dividing" a work in the composition result will be described first.

This function is necessary when the user looks at the graph in FIG. 80, finds that the manhour of a specific station is particularly larger than that of the remaining stations, and wants to divide the specific work. In this case, one of the divided subworks is left to the station, and the other subwork is moved to another station. "Divide" and "move" in this example will be described with reference to FIGS. 81 to 83.

Figure 81:
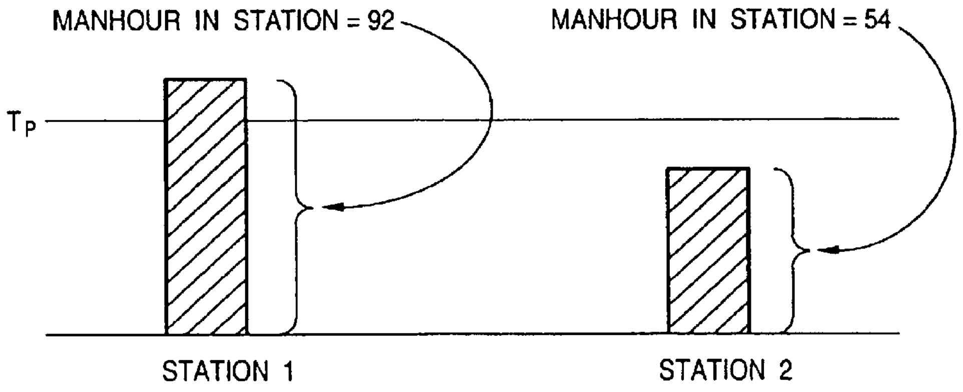
FIG. 81 is a view for explaining work division in the stations in the work assignment system 2802.

Assume that a plan as shown in FIG. 81 is obtained by a composing operation. As is apparent from the example shown in FIG. 81, the total manhour of station 1 is larger than that of station 2 by 38 RU. The cause for this is the work "A4" assigned to station 1, as is known from the work table.

Figure 82:
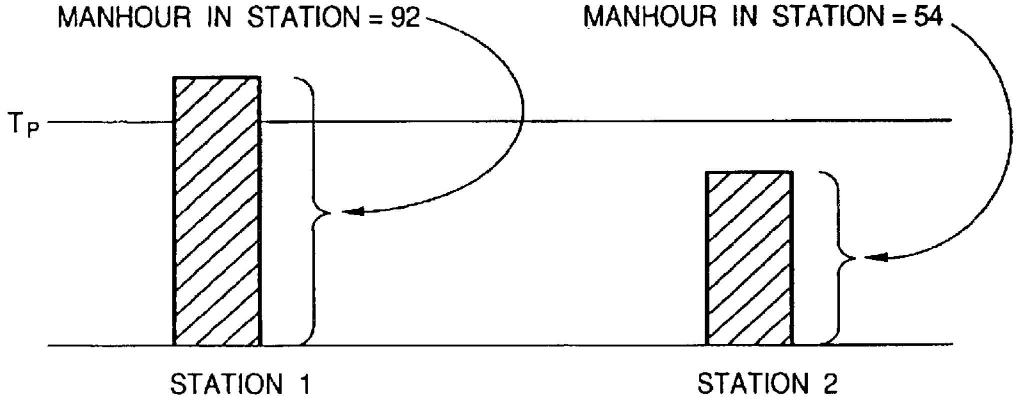
FIG. 82 is a view showing a state wherein a work having a large manhour is assigned to station 2 to be parallel-operated in the workshop having five stations so as to explain work assignment.
Figure 83:
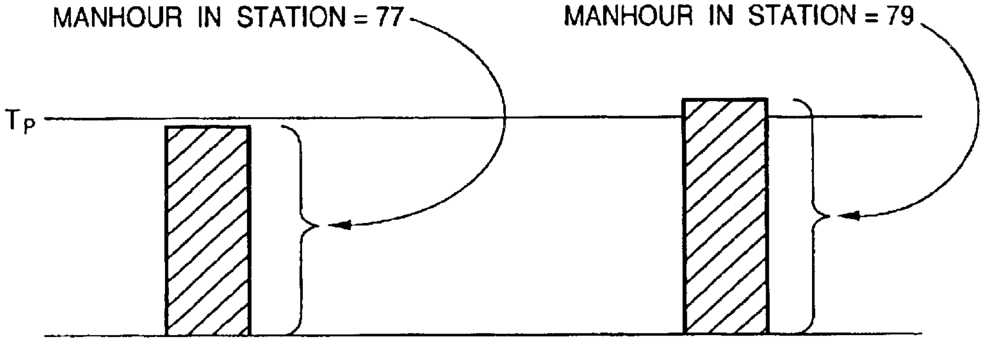
FIG. 83 is a view for explaining the work division result in the stations in the work assignment system 2802.

The user selects the work "A4" with the mouse, displays the menu by clicking the right button of the mouse, and selects the "divide" menu (or double-clicks). The work "A4" is divided into works "A4-1" and "A4-2" each having a ½ manhour, as shown in FIG. 82. The user selects the "move" menu to move the work "A4-2" from station 1 to station 2. The result of movement is reflected to the graph, as shown in FIG. 83.

For the remaining functions, e.g., "integrate", "insert", and "delete" of a work as well, a desired work is selected with the mouse, and the menu is selected (for "integrate", the menu can also be double-clicked), thereby reflecting the editing result to the graph.

The editing function in the work assignment system 2802 includes not only editing in units of work but also editing in units of stations. The functions are "delete", "insert", "add", and "parallel integrate" of a station.

With "delete" of a station, a station which has become empty as a result of "move" of works is deleted. As a detailed user's operation, an empty station is selected in the window shown in FIG. 80. The right button of the mouse is clicked to display the "delete" menu of the station, and the menu is selected, thereby deleting the station. A station can also be added to add a work.

With "insert station ", an empty station is inserted between two stations. As a detailed user's operation, an arbitrary work in the station located on the front side is selected with the mouse. Next, the right button of the mouse is clicked to display the "insert station" menu, and the menu is selected. With this operation, an empty station is inserted.

With "add station", a station is added next to the station as an addition target. As a detailed user's operation, an arbitrary work in the station as an addition target is selected with the mouse. Next, the right button of the mouse is clicked to display the "add station" menu, and the menu is selected. With this operation, an empty station is added. The newly created station is additionally displayed after the station as the addition target. Since the added station has no work, a work is moved from another station.

Figure 84:
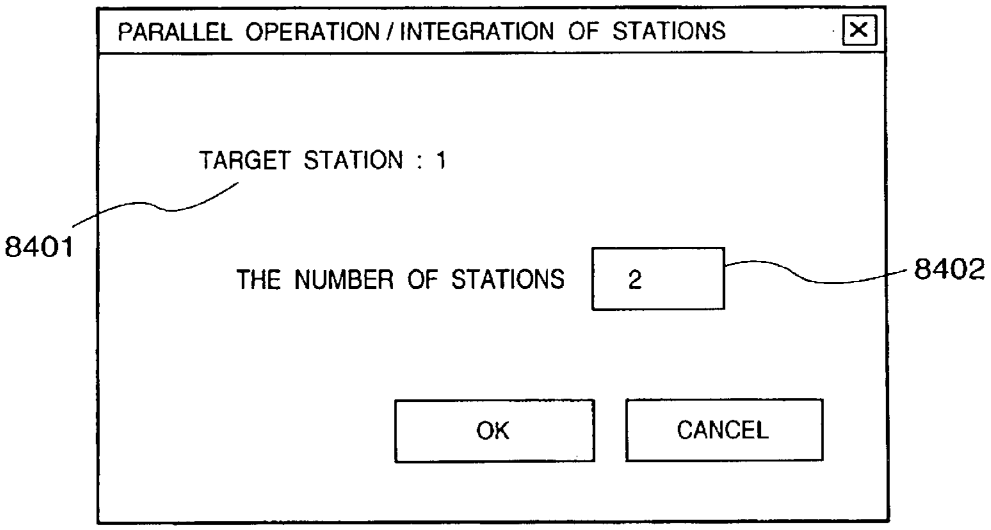
FIG. 84 is a view for explaining a user interface window for station division in the work assignment system 2802.

With "parallel-operate stations", to allow work by a plurality of operators, a work in a station is divided into stations equal in number to the plurality of operators. As a detailed user's operation, a desired station is selected with the mouse, the right button of the mouse is clicked to display the "parallel integrate" menu, and the menu is selected. Then, a dialog shown in FIG. 84 is displayed. The number of stations to be divided is written in a field 8402.

Figure 85:
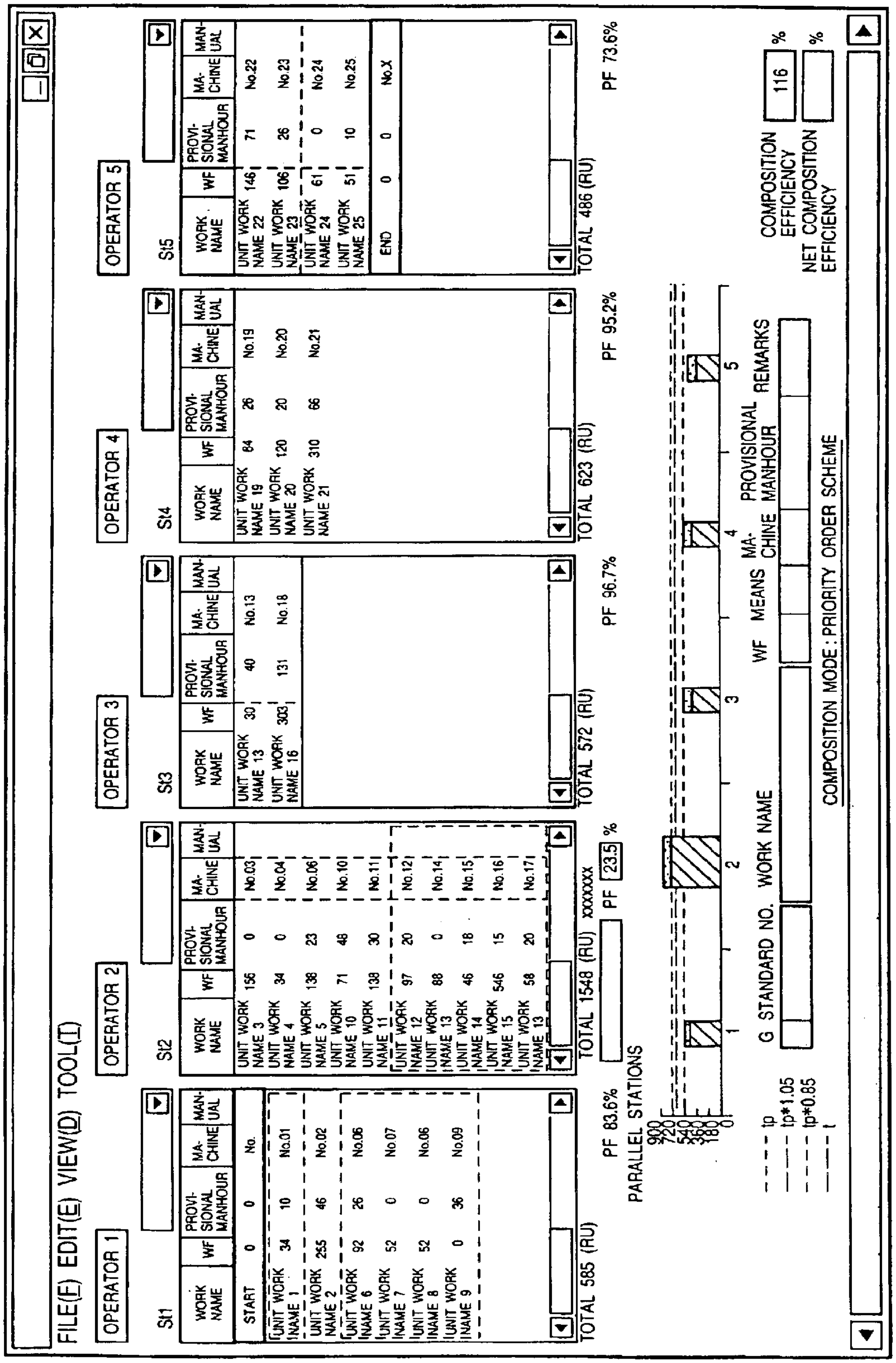
FIG. 85 is a view for explaining a user interface window for adding or inserting a station in the work assignment system 2802.

FIG. 85 shows an example of station division before parallel operation. In this example, the number of works assigned to the station St2 displayed as "operator 2" is large, and the time is also long. With the above parallel operation, station 2 is divided into stations St2-1 and St2-2, as shown in FIG. 97.

Figure 97:
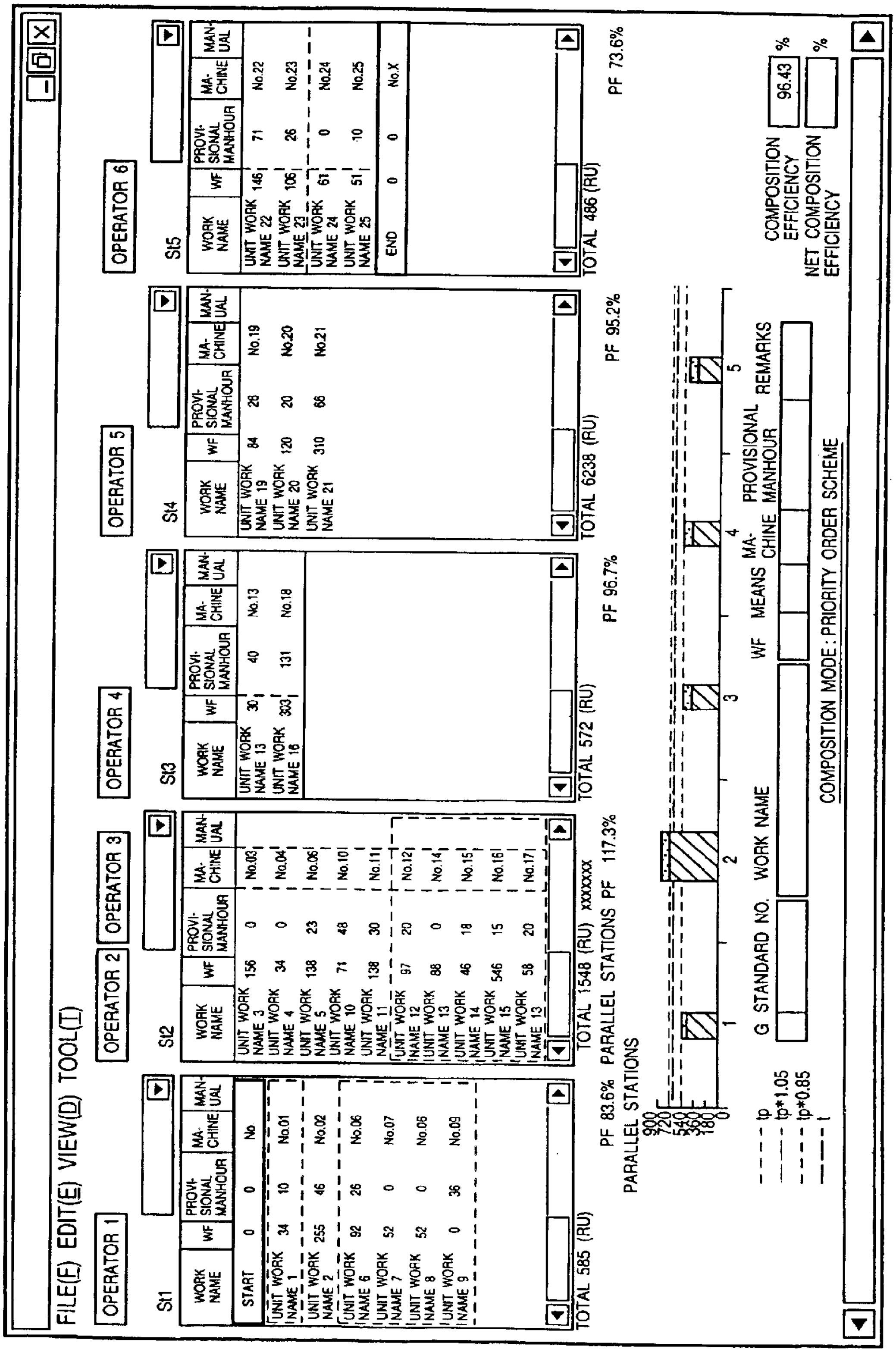
FIG. 97 is a view showing the state of parallel-operated station 2 in the workshop of the example shown in FIG. 85.

For the illustrative convenience, St1 expressed as "operator 1" in FIG. 85 corresponds to St1 expressed as "operator 1" in FIG. 97. However, St3 expressed as "operator 3" in FIG. 85 corresponds to St3 expressed as "operator 4" in FIG. 97. In addition, St4 expressed as "operator 4" in FIG. 85 corresponds to St4 expressed as "operator 5" in FIG. 97, and St5 expressed as "operator 5" in FIG. 85 corresponds to St5 expressed as "operator 6" in FIG. 97.

Addition of a station (or addition of a work) at the time of composition is effective when a station (or work) for check (inspection) is to be added. Whether the inspection process is necessary can hardly be determined by the work standard creation system 2800 for defining the work or the standard manhour setting system 2801 for defining the manhour. Such determination is necessary and possible when the work assignment system 2802 is operated. When a previous or subsequent station as an addition target is designated with the mouse, and the "add" station menu is selected, a newly created empty station is displayed after the addition target station.

<Modification to Composition>

The form of composition is not limited to the above examples.

For example, there may be a single work requiring a large manhour. Even when such a work is present, composition can be theoretically executed in accordance with equations (1) and (2). However, the time for the single work having a large manhour exceeds the pitch time $T_P$. For example, one station is assigned to the single work, like station 2 shown by 8601 in FIG. 86.

Figure 86:
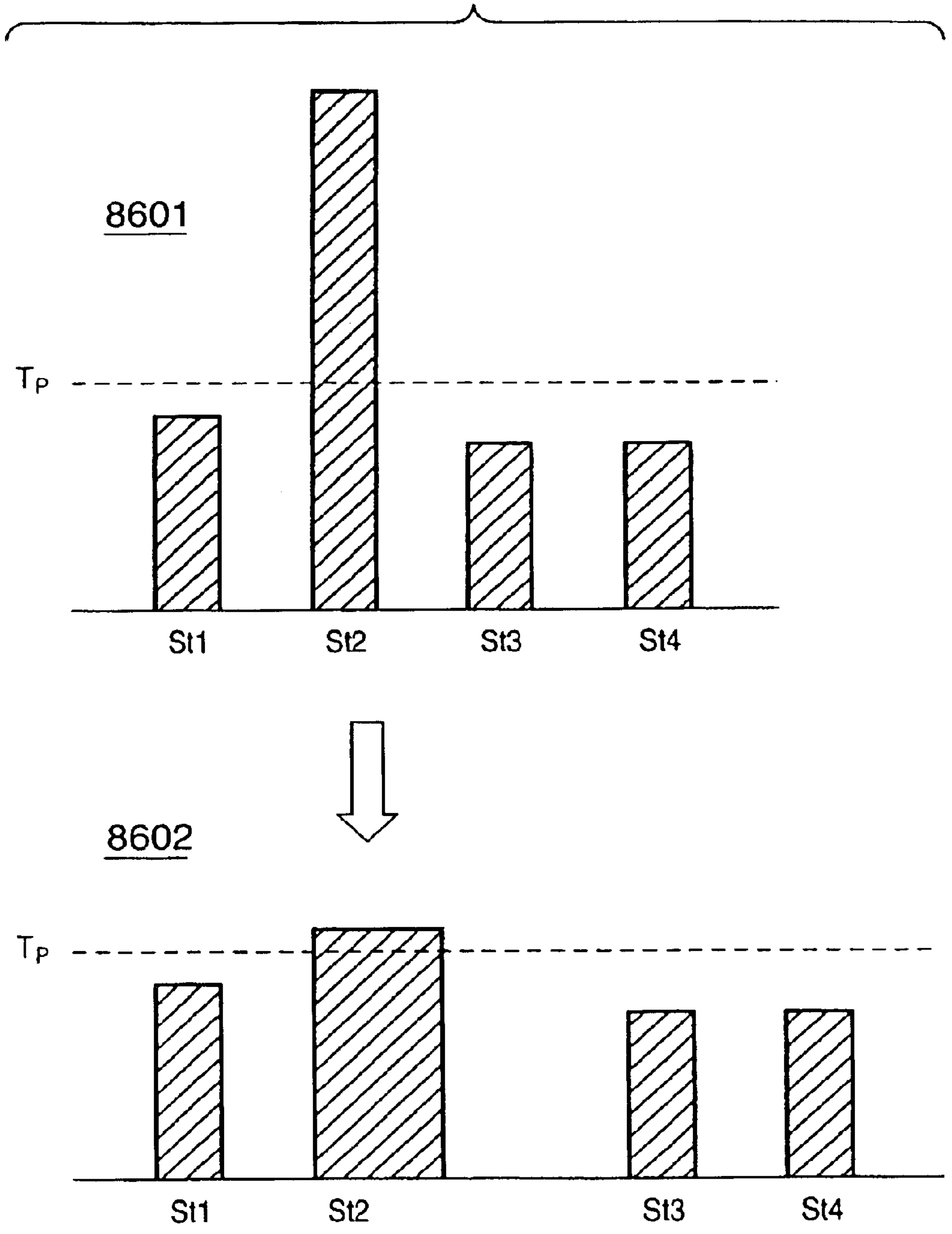
FIG. 86 is a view for explaining a method of displaying a station to which a work having a large manhour is assigned by the work assignment system 2802.

The display shown on the upper side (8601) of FIG. 86 is not preferable because the window is inefficiently occupied. In the work assignment system 2802, letting n be a value obtained by dividing the total manhour in the station assigned such a single work having a large manhour by a number (to be referred to as a unit manhour hereinafter) obtained by multiplying the pitch time $T_P$ by a predetermined value (a constant can be used), and rounding up the quotient, n operators are assigned to the station. The graph display of the manhour of such a station has a width n times the normal bar width. The width of the station 2 bar in FIG. 86 is doubled (8602 in FIG. 86). With this display, the user can understand at a glance that the station has a single work with a large manhour, and its manhour represented by a multiple of the above "unit manhour".

Figure 87:
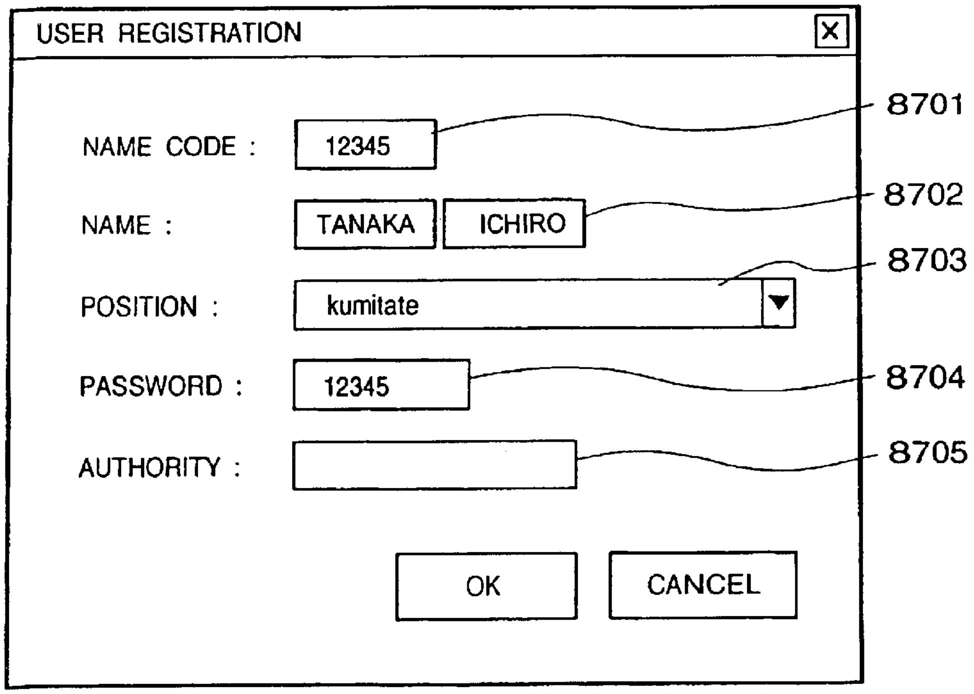
FIG. 87 is a view for explaining an authentication window for authenticating a user who will compose works.

Only a specific user can perform the composing operation. The user interface window shown in FIG. 87 is an input window for checking the operator has a right for composition. The operator code is input to a person name code column 8701, the name of the operator is input to a column 8702, the position is input to a column 8703, the password is input to a column 8704, and the authority is input to a column 8705. The input data are collated with a personnel database, and only when the data match, an access right is given.

Figure 88:
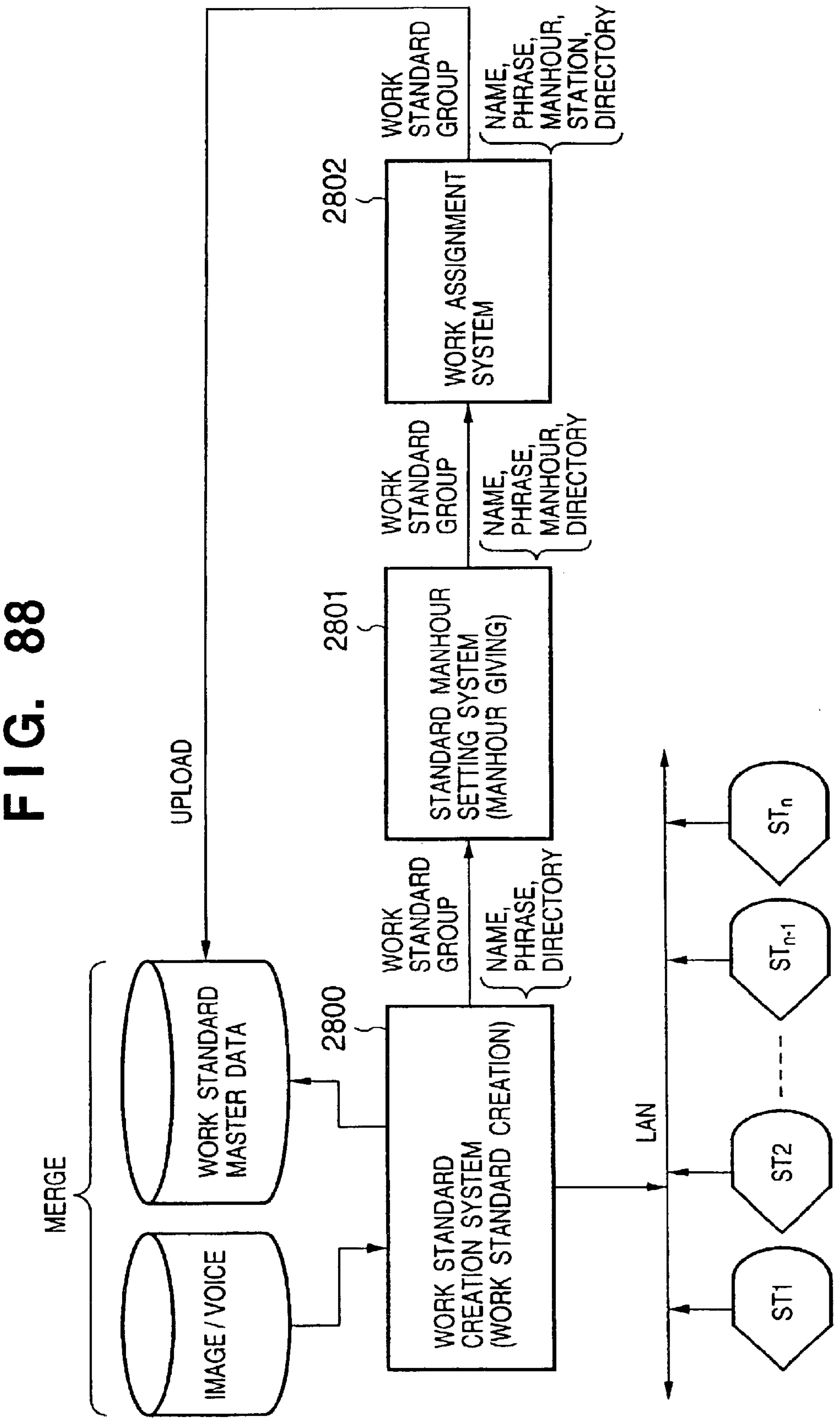
FIG. 88 is a block diagram for explaining the overall arrangement of a system according to a modification in which each subsystem has a standalone structure.

FIG. 88 shows the data upload from the work assignment system 2802 to the work standard creation system 2800 when the work standard creation system 2800, standard manhour setting system 2801, and work assignment system 2802 have standalone structures.

As described above, the work standard creation system 2800 of this embodiment can attach voice or image data to a work standard. In the above embodiment, the work standard creation system 2800, standard manhour setting system 2801, and work assignment system 2802 build a client/server database system, as shown in FIG. 1. For this reason, the download or upload by batch operation of work standard data is unnecessary between the work standard creation system 2800, standard manhour setting system 2801, and work assignment system 2802.

However, when work standard creation system 2800, standard manhour setting system 2801, and work assignment system 2802 have standalone structures, as shown in FIG. 88, the data download or upload between the subsystems is necessary. In this case, it is inefficient to download or upload image data or voice data created by the work standard creation system 2800.

In the modification shown in FIG. 88, download or upload is limited to download or upload of minimum necessary data. Merging between image data or voice data and work standard data composed by the work assignment system 2802 is executed by the work standard creation system 2800. This shortens the time required for the download or upload.

In addition, the work standard creation system 2800 can be connected to each station in the workshop through a LAN (communication network), so work standard data, including image data or voice data, can be downloaded to the workstation of each station through the LAN.

<Other Modifications>

M-1: The above-described embodiment is constructed under the client/server environment, as shown in FIG. 1. However, the present invention can also be applied to a standalone environment in a single computer system. In this case, the work standard creation system 2800, standard manhour setting system 2801, and work assignment system 2802 operate in the computer system.

M-2: In the above-described embodiment, various files are created in each system, and the formats of these files can be set in various ways. For example, these files need not always be so-called permanent files always stored in an external auxiliary storage device such as a disk and can be so-called view files which are present only on the main memory. This is because many files are temporarily created for the purpose of display (view).

[Other Embodiment]

The object of the present invention can also be achieved by supplying a storage medium (or recording medium) in which software program codes for realizing the functions of the above-described embodiment are recorded to an apparatus which operates as the above-described subsystem or the server/client, and causing the computer (or a CPU or an MPU) of the system or apparatus to read out and execute the program codes stored in the storage medium. In this case, the program codes read out from the storage medium realize the functions of the above-described embodiment by themselves, and the storage medium storing the program codes constitutes the present invention. The functions of the above-described embodiment are realized not only when the readout program codes are executed by the computer but also when the OS (Operating System) running on the computer performs part or all of actual processing on the basis of the instructions of the program codes.

The functions of the above-described embodiment are also realized when the program codes readout from the storage medium are written in the memory of a function expansion board inserted into the computer or a function expansion unit connected to the computer, and the CPU of the function expansion board or function expansion unit performs part or all of actual processing on the basis of the instructions of the program codes.

As has been described above, according to the assembly information management system of the above-described embodiment, management can be more efficiently executed using work standard data suitable for computer processing.

In addition, according to the work standard creation system of the above-described embodiment, work standard data suitable for computer processing can be created.

Furthermore, according to the automatic manhour setting system of the above-described embodiment, the manhour can be quickly set for a work standard by computer processing.

As many apparently widely different embodiments of the present invention can be made without departing from the spirit and scope thereof, it is to be understood that the invention is not limited to the specific embodiments thereof except as defined in the appended claims.

What is claimed is:

1. An automatic work standard setting system which gives manhour data to a target work standard, comprising:

a first storage unit which stores a standard manhour database designed to be readable by a computer, in which a number of groups each constituted by a work standard described by a standard expression and manhour corresponding to the work standard are registered in advance;

a second storage unit, designed to be readable by a computer, which stores a graphic file of an image for graphically showing a procedure of a work standard;

a setting unit adapted to, for each of target work standards to which manhours are to be given, match an expression of target work standard with the standard expressions of the work standards in said standard manhour database and set a link to a graphic file corresponding to a matching work standard and a standard manhour, as a manhour of the target work standard, corresponding to the matching work standard in said database; and a manhour file unit adapted to store a file of manhours and links of the target work standards set by said setting unit, wherein said setting unit preferentially executes a search based on complete matching between the expression of the target work standard and the standard expression of the work standard in said standard manhour database and, a search based on partial matching for the target work standard for which the search based on complete matching to the standard expression of the work standard in said standard manhour database fails.

2. The system according to claim 1, wherein the target work standard to which the manhour is to be given is described by an operation phrase representing an operation of a work, an object phrase representing a target of the operation, and a comment phrase representing auxiliary information related to the operation and/or object, and each of the work standards in said database is also described by an operation phrase, object phrase, and comment phrase.

3. The system according to claim 2, wherein for the target work standard to which the manhour is to be given, a first comment related to an object of an operation, an object phrase representing the object of the operation, a second comment related to the operation, and an operation phrase representing the operation of the work are described in a predetermined order, and for each of the work standards in said database, a first comment, object phrase, second comment, and operation phrase are also described in the predetermined order.

4. The system according to claim 1, wherein for the target work standard to which the manhour is to be given, a first comment related to an object of an operation, an object phrase representing the object of the operation, a second comment related to the operation, and an operation phrase representing the operation of the work are described in a predetermined order, and for each of the work standards in said database, a first comment, object phrase, second comment, and operation phrase are also described in the predetermined order.

5. The system according to claim 1, wherein, when the search of the expression of the target work standard in said standard manhour database fails, said setting unit executes a search in a second manhour database whose degree of standardization is lower than that of said standard manhour database.

6. The system according to claim 5, further comprising an analysis unit adapted to analyze the work standard to assign the manhour when no matching is obtained by searching the second manhour database.

7. The system according to claim 5, further comprising an analysis unit adapted to analyze the work standard to assign the manhour when no matching is obtained by searching said standard manhour database.

8. The system according to claim 6, wherein said analysis unit uses a creation tool with the same reference as that in creating contents of said standard manhour database.

9. The system according to claim 7, wherein said analysis unit uses a creation tool with the same reference as that in creating contents of said second manhour database.

10. The system according to claim 1, wherein the expression included in the target work standard includes an expression by a wild card.

11. The system according to claim 10, wherein, when a plurality of standard work standards which match a work standard including an expression including a wild card symbol are present, candidates are displayed in a descending order of the degrees of matching to cause the user to select any one of the candidates.

12. The system according to claim 1, wherein standard manhour data in said standard manhour database contains a manhour value and data related to a set condition when the manhour value is set.

13. The system according to claim 12, wherein the condition data is referred to by a directory in a memory space of said automatic work standard setting system, and said setting unit sets a directory value of the searched set condition data of the work standard as the manhour of the target work standard.

14. The system according to claim 1, further comprising a download unit adapted to download a plurality of work standard data to which manhours are to be given.

15. A distributed client/server database system comprising:

a server including said automatic work standard setting system; and a plurality of clients each having said setting unit of claim 1.

16. The system according to claim 1, wherein the manhour file has, for each work standard, a field where a log of addition and correction related to the manhour is recorded.

17. The system according to claim 16, further comprising a unit adapted to refer to the log field.

18. An automatic work standard setting system which gives manhour data to a target work standard, comprising;

a first storage unit which stores a standard manhour database designed to be readable by a computer, in which a number of groups each constituted by a work standard described by a standard expression and manhour corresponding to the work standard are registered in advance;

a second storage unit, designed to be readable by a computer, which stores a graphic file of an image for graphically showing a procedure of a work standard;

a setting unit adapted to, for each of target work standards to which manhours are to be given, match an expression of target work standard with the standard expressions of the work standards in said standard manhour database and set a link to a graphic file corresponding to a matching work standard and a standard manhour, as a manhour of the target work standard, corresponding to the matching work standard in said database;

a manhour file unit adapted to store a file of manhours and links of the target work standards set by said setting unit; and download unit adapted to download a plurality of work standard data to which manhours are to be given, wherein the plurality of downloadable work standard are stored in an external database, and said download unit comprises:

a visualizing unit adapted to download directories of the downloadable work standards from the external database and display the directories, and selection unit adapted to select an arbitrary one of the displayed directories, thereby selecting the target work standard to which the manhour is to be given, and wherein the external database stores the downloadable work standards having a hierarchical structure according to the degree of assembly, said visualizing unit downloads upper directories to said automatic work standard setting system together with the directories of the downloadable work standards and displays the downloaded work standard directories and upper directories together, and said selection unit can designate to select the displayed work standard directories or upper directories.

19. An automatic work standard setting method of giving manhour data to a target work standard, comprising:

registering a number of groups each constituted by a work standard described by a standard expression and manhour corresponding to the work standard in advance in a standard manhour database designed to be readable by a computer;

registering a graphic file of an image for graphically showing a procedure of a work standard;

matching, for each of target work standards to which manhours are to be given, an expression of target work standard with the standard expressions of the work standards in the standard manhour database;

setting a link to a graphic file corresponding to a matching work standard and a standard manhour, as a manhour of the target work standard, corresponding to the matching work standard in the database; and storing a file of manhours and links of the target work standards set in said setting step, wherein in said setting step, a preferential search based on complete matching between the expression of the target work standard and the standard expression of the work standard in the standard manhour database is executed and, a search based on partial matching for the target work standard for which the search based on complete matching to the standard expression of the work standard in the standard manhour database fails is executed.

20. The method according to claim 19, wherein the target work standard to which the manhour is to be given is described by an operation phrase representing an operation of a work, an object phrase representing a target of the operation, and a comment phase representing auxiliary information related to the operation and/or object, and each of the work standards in the database is also described by an operation phrase, object phrase, and comment phrase.

21. The method according to claim 20, wherein for the target work standard to which the manhour is to be given, a first comment related to an object of an operation, an object phrase representing the object of the operation, a second comment related to the operation, and an operation phrase representing the operation of the work are described in a predetermined order, and for each of the work standards in the database, a first comment, object phase, second comment, and operation phrase are also described in the predetermined order.

22. The method according to claim 19, wherein for the target work standard to which the manhour is to be given, a first comment related to an object of an operation, an object phase representing the object of the operation, a second comment related to the operation, and an operation phrase representing the operation of the work are described in a predetermined order, and for each of the work standards in the database, a first comment, object phrase, second comment, and operation phrase are also described in the predetermined order.

23. The method according to claim 19, wherein, when the search of the expression of the target work standard in the standard manhour database fails, executing a search in a second manhour database whose degree of standardization is lower than that of the standard manhour database is executed in said setting step.

24. The method according to claim 23, further comprising analyzing the work standard to assign the manhour when no matching is obtained by searching the second manhour database.

25. The method according to claim 24, wherein, in said analysis step, a creation tool is used with the same reference as that in creating contents of the standard manhour database.

26. The method according to claim 23, further comprising analyzing the work standard to assign the manhour when no matching is obtained by searching the standard manhour database.

27. The method according to claim 26, wherein, in said analysis step, a creation tool is used with the same reference as that in creating contents of the second manhour database.

28. The method according to claim 19, wherein the expression included in the target work standard includes an expression by a wild card.

29. The method according to claim 28, when a plurality of standard work standards which match a work standard including an expression including a wild card symbol are present, candidates are displayed in a descending order of the degrees of matching to cause the user to select any one of the candidates.

30. The method according to claim 19, wherein standard manhour data in the standard manhour database contains a manhour value and data related to a set condition when the manhour value is set.

31. The method according to claim 30, wherein the condition data is referred to by a directory in a memory space of the automatic work standard setting system, and in said setting step, a directory value of the searched set condition data of the work standard is set as the manhour of the target work standard.

32. The method according to claim 19, further comprising downloading a plurality of work standard data to which manhours are to be given.

33. The method according to claim 19, wherein the manhour file has, for each work standard, a field where a log of addition and correction related to the manhour is recorded.

34. A computer program storage medium which stores program codes of said automatic work standard setting method to realize said automatic work standard setting method of claim 19 by a computer system.

35. An automatic work standard setting method of giving manhour data to a target work standard, comprising:

registering a number of groups each constituted by a work standard described by a standard expression and manhour corresponding to the work standard in advance in a standard manhour database designed to be readable by a computer;

registering a graphic file of an image for graphically showing a procedure of a work standard;

matching, for each of target work standards to which manhours are to be given, an expression of target work standard with the standard expressions of the work standards in the standard manhour database;

setting a link to a graphic file corresponding to a matching work standard and a standard manhour, as a manhour of the target work standard, corresponding to the matching work standard in the database;

storing a file of manhours and links of the target work standard set in said setting step;

storing a plurality of downloadable work standards in an external database;

a download step of downloading said downloadable work standards to which manhours are to be given which step comprises;

downloading directories of the downloadable work standards from the external database and displaying the directories, and selecting an arbitrary one of the displayed directories, thereby selecting the target work standard to which the manhour is to be given, and wherein the external database stores the downloadable work standards having a hierarchical structure according to the degree of assembly, in said downloading of directories, upper directories are downloaded to the automatic work standard setting system together with the directories of the downloadable work standards, in said displaying, the downloaded work standard directories and upper directories are displayed together, and in said selection step, the displayed work standard directories or upper directories is selected.

36. The method according to claim 35, wherein the hierarchical structure according to the degree of assembly is formed by putting the plurality of work standards together into an upper work group and giving a group identifier to each of the groups put together.

37. The method according to claim 36, wherein the work group is classified into one of a component group formed from a plurality of work standards, a model group formed from a plurality of components, and a genre group formed from a plurality of models.

* * * * *